(12) United States Patent
Ogikubo et al.

(10) Patent No.: US 8,437,408 B2
(45) Date of Patent: May 7, 2013

(54) DECODING WITH REFERENCE IMAGE STORED IN IMAGE MEMORY FOR RANDOM PLAYBACK

(75) Inventors: Junichi Ogikubo, Kanagawa (JP); Sayoko Shibata, Kanagawa (JP); Taro Shigata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1633 days.

(21) Appl. No.: 11/403,969

(22) Filed: Apr. 14, 2006

(65) Prior Publication Data
US 2006/0245504 A1  Nov. 2, 2006

(30) Foreign Application Priority Data

Apr. 15, 2005  (JP) .................................. 2005-119046
Apr. 15, 2005  (JP) .................................. 2005-119047

(51) Int. Cl.
*H04N 7/12*  (2006.01)

(52) U.S. Cl.
USPC ................................................... 375/240.25

(58) Field of Classification Search .............. 375/240.25
See application file for complete search history.

(56) References Cited

U.S. PATENT DOCUMENTS

| 7,020,382 | B2 | 3/2006 | Lin et al. | |
|---|---|---|---|---|
| 2004/0067043 | A1* | 4/2004 | Duruoz et al. | 386/68 |
| 2004/0190867 | A1* | 9/2004 | Roelens | 386/68 |
| 2006/0008248 | A1* | 1/2006 | Agrahara | 386/68 |

FOREIGN PATENT DOCUMENTS

| JP | 7-78453 | 3/1995 |
|---|---|---|
| JP | 8-130707 | 5/1996 |
| JP | 8-279979 | 10/1996 |
| JP | 11-313283 | 11/1999 |
| JP | 11-341437 | 12/1999 |
| JP | 2002-158969 | 5/2002 |
| JP | 2004-104361 | 4/2004 |
| JP | 2005-508586 | 3/2005 |

\* cited by examiner

*Primary Examiner* — Richard Torrente
(74) *Attorney, Agent, or Firm* — Oblon, Spivak, McClelland, Maier & Neustadt, L.L.P.

(57) ABSTRACT

With a decoding method for decoding an encoded stream using a predetermined storage region where input of reproduction information indicating an reproduction state of the encoded stream is received, reference picture information indicating a reference picture necessary for performing decoding processing of a relevant picture in the encoded stream is obtained, based on the reproduction information input by the reproduction information input processing, whether the reference picture is stored in a predetermined storage region is determined, based on the reference picture information obtained by the reference picture information obtaining processing, the reference picture not stored in the storage region is obtained from the encoded stream and decoded, and storage thereof to the storage region is controlled, and the reference picture stored in the storage region is used to perform decoding processing of the relevant picture in the encoded stream, thereby generating image data which is stored in the storage region.

13 Claims, 32 Drawing Sheets

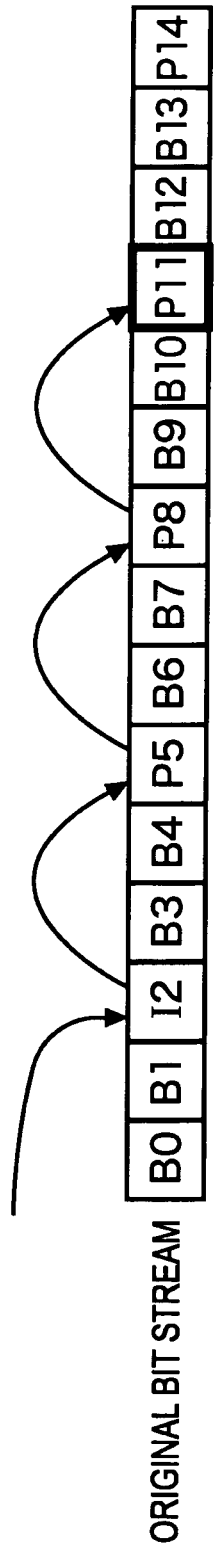
FIG. 20A
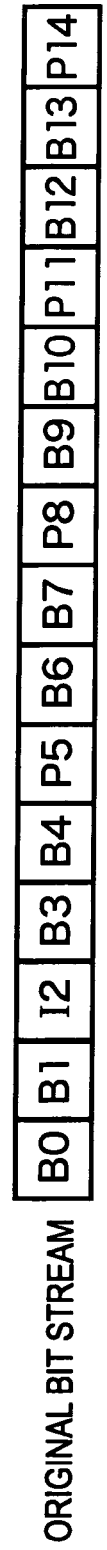
FIG. 20B
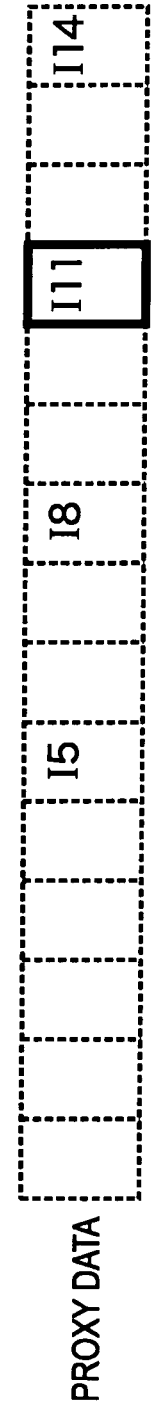

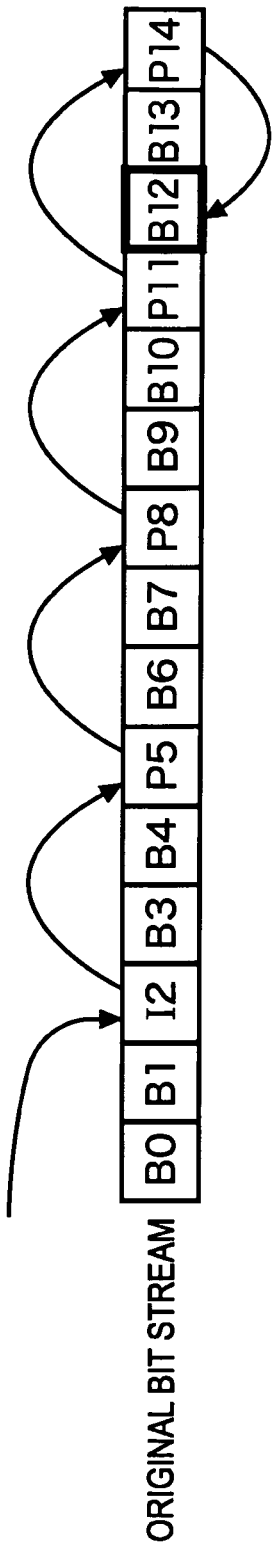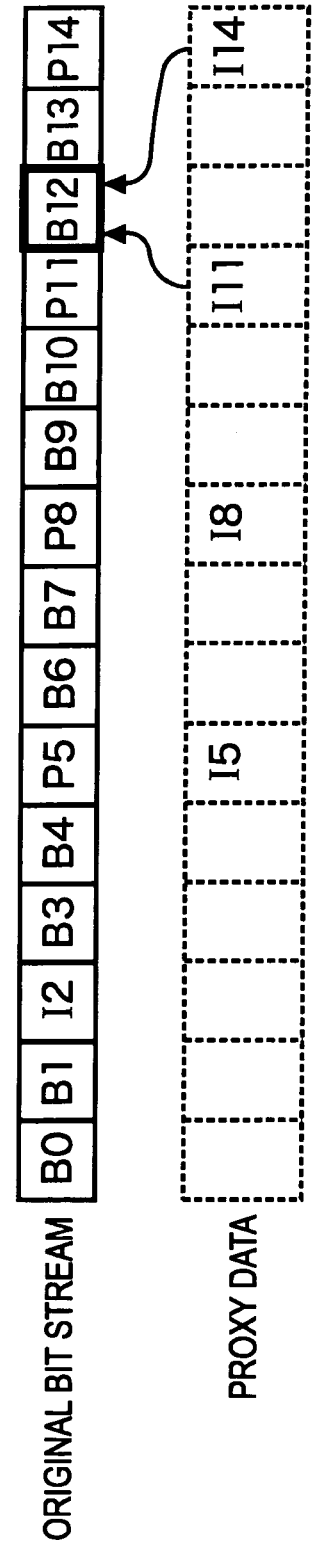

FIG. 24

| NUMBER OF PI CONVERSIONS (N=4) | LONGEST DECODING TIME | VALID SEQUENCE |
|---|---|---|
| NO PI CONVERSION | TIME FOR DECODING ONE PICTURE × 7 | IPPPP |
| ONE PICTURE | TIME FOR DECODING ONE PICTURE × 5, TWO PATTERNS | IPIPP<br>IPPIP |
| TWO PICTURES | TIME FOR DECODING ONE PICTURE × 4, FOUR PATTERNS | IPIIP<br>IIPIP<br>IPIPI |
| FOUR PICTURES | TIME FOR DECODING ONE PICTURE × 3 | IIIII |

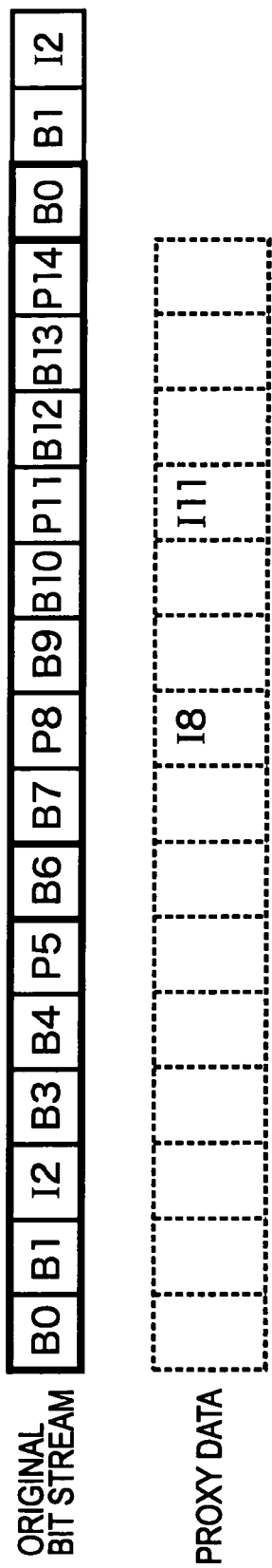
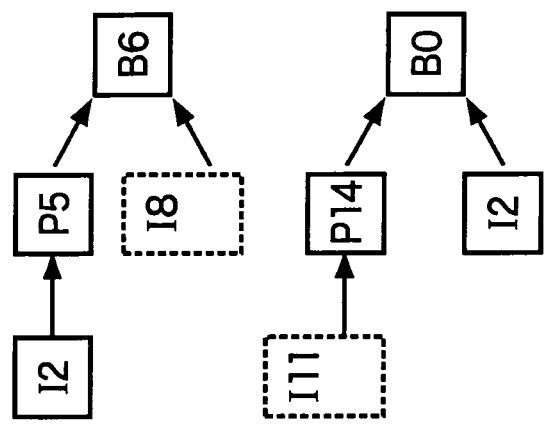
FIG. 27A
FIG. 27B

FIG. 29A
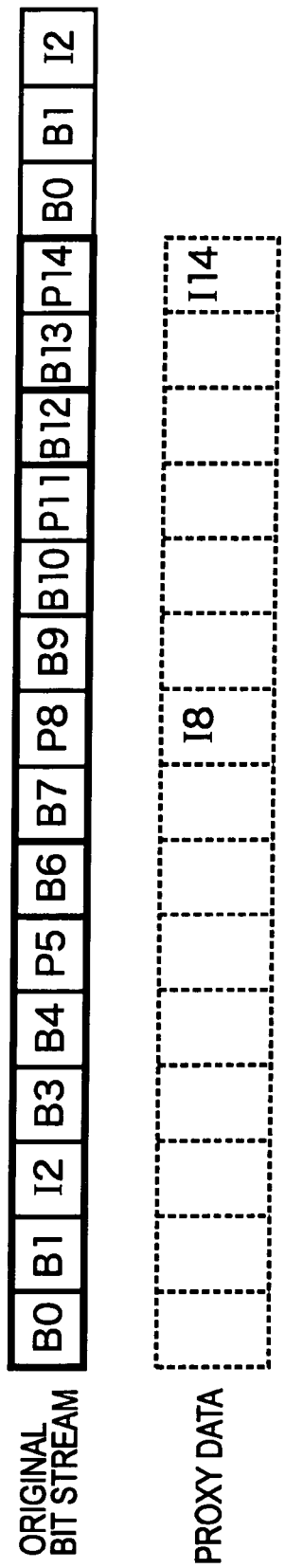
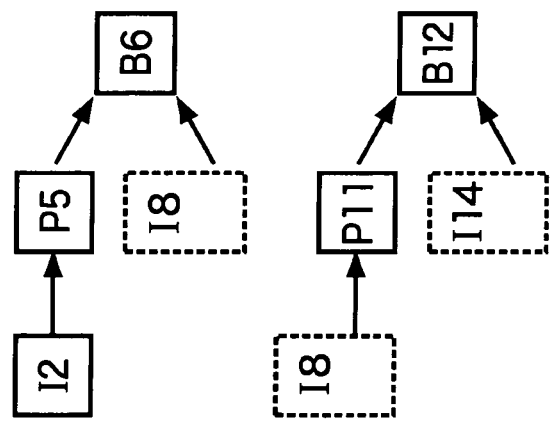
FIG. 29B

FIG. 31

$$\left\{\begin{array}{l}\underline{N=11}\\\\X=4,\ S=1\quad\text{I}\quad\text{P}\quad\boxed{\text{P}}\quad\text{P}\quad\boxed{\text{P}}\quad\text{P}\quad\boxed{\text{P}}\quad\text{P}\quad\boxed{\text{P}}\quad\text{P}\quad\boxed{\text{P}}\quad\text{P}\\\qquad\qquad\qquad\qquad\quad\ \ \downarrow\qquad\ \ \downarrow\qquad\ \ \downarrow\qquad\ \ \downarrow\qquad\ \ \downarrow\\\qquad\qquad\qquad\qquad\quad\ \ \text{I}\qquad\ \ \text{I}\qquad\ \ \text{I}\qquad\ \ \text{I}\qquad\ \ \text{I}\\\\X=5,\ S=2\quad\text{I}\quad\text{P}\quad\text{P}\quad\boxed{\text{P}}\quad\text{P}\quad\text{P}\quad\boxed{\text{P}}\quad\text{P}\quad\text{P}\quad\boxed{\text{P}}\quad\text{P}\quad\text{P}\\\\X=6,\ S=3\quad\text{I}\quad\text{P}\quad\text{P}\quad\text{P}\quad\boxed{\text{P}}\quad\text{P}\quad\text{P}\quad\text{P}\quad\boxed{\text{P}}\quad\text{P}\quad\text{P}\quad\text{P}\\\\X=7,\ S=4\quad\text{I}\quad\text{P}\quad\text{P}\quad\text{P}\quad\text{P}\quad\boxed{\text{P}}\quad\text{P}\quad\text{P}\quad\text{P}\quad\text{P}\quad\boxed{\text{P}}\quad\text{P}\\\\X=8,\ S=5\quad\text{I}\quad\text{P}\quad\text{P}\quad\text{P}\quad\text{P}\quad\text{P}\quad\boxed{\text{P}}\quad\text{P}\quad\text{P}\quad\text{P}\quad\text{P}\quad\text{P}\\\\X=9,\ S=5\quad\text{I}\quad\text{P}\quad\text{P}\quad\text{P}\quad\text{P}\quad\text{P}\quad\boxed{\text{P}}\quad\text{P}\quad\text{P}\quad\text{P}\quad\text{P}\quad\text{P}\end{array}\right.$$

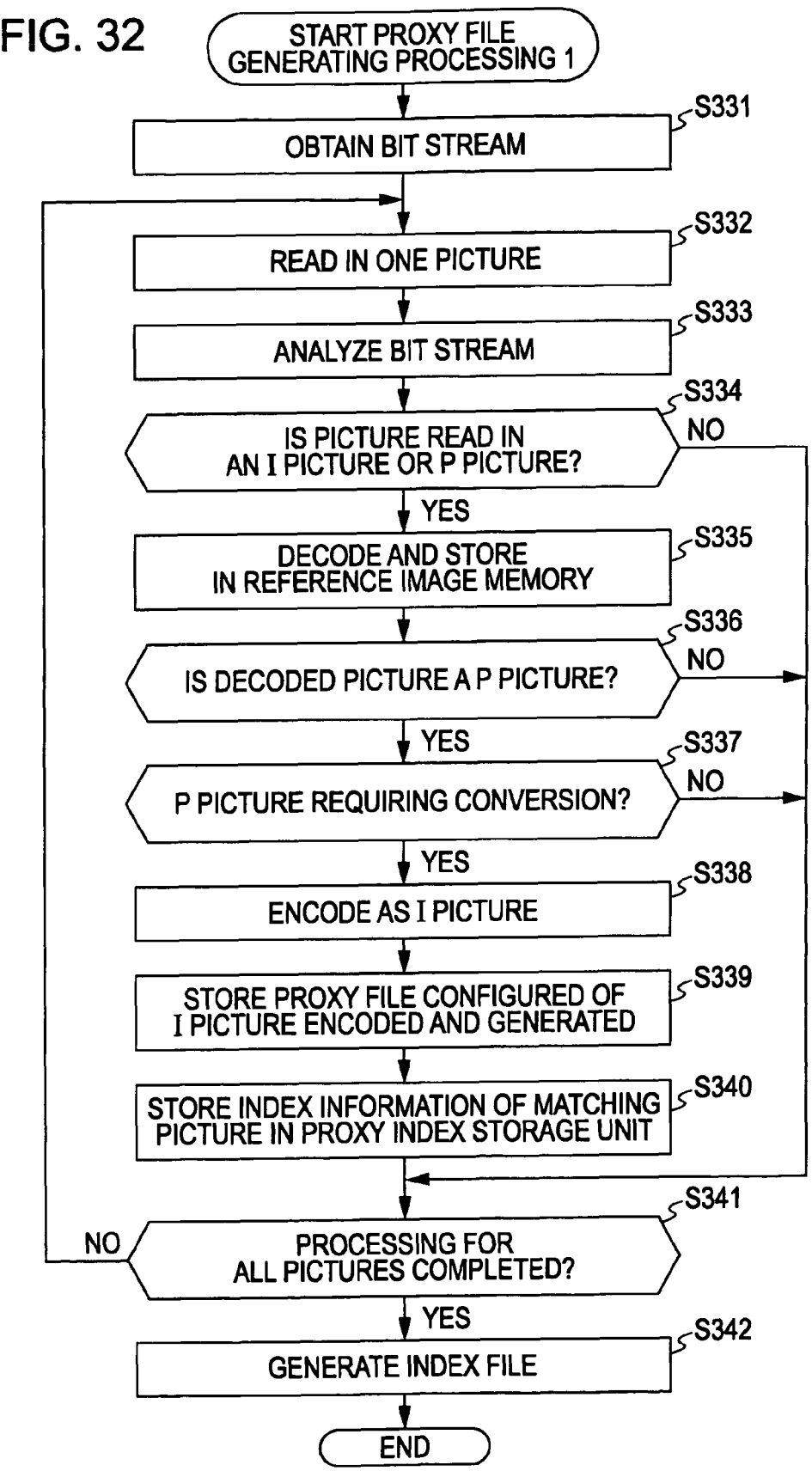

DECODING WITH REFERENCE IMAGE STORED IN IMAGE MEMORY FOR RANDOM PLAYBACK

CROSS REFERENCES TO RELATED APPLICATIONS

The present invention contains subject matter related to Japanese Patent Application JP 2005-119046 filed in the Japanese Patent Office on Apr. 15, 2005 and Japanese Patent Application JP 2005-119047 filed in the Japanese Patent Office on Apr. 15, 2005, the entire contents of which are incorporated herein by reference.

BACKGROUND OF THE INVENTION

1. Field of the Invention

The present invention relates to a program, a decoding device, a decoding method, and a recording medium, and particularly relates to a program, a decoding device, a decoding method, and a recording medium, suitable for performing scrub reproduction.

2. Description of the Related Art

There is known a technique wherein MPEG moving picture data is encoded such that not only is compressed data is generated but also sub-data such as index data is generated, which enables special playing to be performed wherein playing is started from a predetermined screen at the time of decoding and playing the compressed data, by making reference to the sub-data (e.g., see Japanese Unexamined Patent Application Publication No. 11-341437).

A player device 1 according to the related art, which is capable of decoding stream data encoded with MPEG2 Long-GOP using index data, will be described with reference to FIG. 1.

An operating input obtaining unit 21 obtains user operation input. The operating input obtaining unit 21 receives selection of a stream to be decoded and specification of a play start position from the user, and supplies this to a stream decoding position detection processing unit 22.

The stream decoding position detection processing unit 22 obtains the Stream No. of the stream to be played and the Frame No. of the position to start playing, based on the selection of the stream to be decoded that is supplied from the operation input obtaining unit 21 and the specification of the play start position, and supplies these to a stream supply control unit 23.

The stream supply control unit 23 obtains various types of information necessary for decoding the corresponding stream stored in an index managing unit 24, based on the Stream No. of the stream to be played and the Frame No. of the position to start playing, and detects a reference image frame necessary for decoding the frame of the specified start playing position. The stream supply control unit 23 requests a stream memory control unit 25 for stream data necessary for decoding, and supplies the stream data supplied from stream memory 26 via the stream memory control unit 25, to a decoder 28. Also, the stream supply control unit 23 supplies the Frame No. of the output frame to a later-described base band signal processing unit 32.

The stream memory control unit 25 is for controlling storage at the stream memory 26, and reads out the stream data request by the stream supply control unit 23 from the stream memory, and outputs this to the stream supply control unit 23.

The stream memory 26 stores the stream data, and outputs predetermined stream data under the control of the stream memory control unit 25.

The decoder 28 has a memory control unit 41 built in, this memory control unit 41 being used to control reference base band image memory 29 so as to decode stream data supplied form the stream supply control unit 23 and supply the decoded base band image data to a base band image data memory control unit 30.

Specifically, in the event that the supplied compressed stream is a compressed stream compressed by inner-frame reference, the decoder 28 decodes the compressed stream by causing the reference base band image memory 29, under control of the memory control unit 41, to hold a reference image necessary for subsequent decoding.

The base band image data memory control unit 30 supplies the decoded base band image data supplied form the decoder 28 to base band image data memory 31, reads the base band image data of the frame indicated by the Stream No. and Frame No. requested by the base band signal processing unit 32 from the base band image data memory 31, and supplies this to the base band signal processing unit 32.

The base band signal processing unit 32 performs various types of correction on the supplied base band image data, such as color correction and size correction, field control for slow playback and so forth, for example, such that the decoded image will be properly output, and outputs the generated output base band image data.

Next, the playback processing executed at the player device 1 shown in FIG. 1 in the related art will be described with reference to FIG. 2.

In step S1, the stream decoding position detection processing unit 22 receives input of play position specification (Stream No. and Frame No.) from the operating input obtaining unit 21, and supplies this to the steam supply control unit 23.

In step S2, the stream supply control unit 23 obtains an index table corresponding to the supplied Stream No. from the index managing unit 24.

In step S3, the stream supply control unit 23 extracts information necessary for decoding, such as picture type, information relating to reference image, data length and so forth, for example from the index table.

In step S4, the stream supply control unit 23 obtains the Frame No. of frames necessary as a reference images for decoding the frame of the specified Frame No. (in the event that the frame specified as the frame to be decoded is not an I picture, at least one frame including the immediately preceding I picture), and information for decoding these.

In step S5, the stream supply control unit 23 requests the stream memory control unit 25 for reference images and frames necessary as images to be decoded. The stream memory control unit 25 reads out reference images and frames necessary as images to be decoded from stream memory 26, and supplies these to the stream supply control unit 23.

In step S6, the stream supply control unit 23 supplies the supplied frame data to the decoder 28. The decoder 28 decodes the supplied data. Specifically, upon decoding a reference image necessary in subsequent decoding, the decoder 28 causes the reference base band image memory 29, under control of the memory control unit 41, to hold the base band image data generated by decoding, and uses this as a reference image, thereby decoding a compressed stream. At this time, in the event that the decoder 28 receives an unneeded B frame, decoding of the B picture is skipped (in the event that the necessary frame can be decoded without decoding the supplied B picture).

Next, in step S7, the decoder 28 supplies the decoded base band image data to the base band image data memory control unit 30. The base band image data memory control unit 30 supplies the decoded base band image data supplied from the decoder 28 to the base band image data memory 31, and reads out the base band image data from frame indicated by the Stream No. and Frame No. requested by the base band signal processing unit 32, to the base band signal processing unit 32. The base band signal processing unit 32 performs various types of correction on the supplied base band image data, such as color correction and size correction, field control for slow playback and so forth, for example, such that the decoded image will be properly output, and outputs the generated output base band image data.

Next, scrub playback (also called "random playback") for playing a predetermined frame specified by a user will be described with reference to FIG. 3, using an example wherein frame B13 and frame B3 are output in that order with the player device 1 which has been described with reference to FIGS. 1 and 2.

The stream decoding position detection processing unit 22 receives input from the operating input obtaining unit 21 of the Stream No. of the stream to be decoded and the Frame Nos. of B13 and B3 which have been specified as frames to be played (output), and supplies these to the stream supply control unit 23.

The stream supply control unit 23 first requests the stream memory control unit 25 for a stream in temporal order including I2, P5, P8, P11, and P14, which are frames necessary as reference images for decoding B13 which is to be output first, and B13 which is the frame to be played (output). The stream supply control unit 23 supplies these to the decoder 28.

The decoder 28 decodes the supplied data in order (decoding of B pictures can be skipped as necessary), sets P11 and P14 in the reference base band image memory 29, under control of the memory control unit 41, and uses these as reference images to decode B13. The decoder 28 supplies base band image data corresponding to the decoded B13 to the base band image data memory control unit 30, and holds in the base band image data memory 31 (i.e., copies to the memory). Various types of correction are performed at the base band signal processing unit 32 (base band processing), and output base band image data is output.

The stream supply control unit 23 then requests the stream memory control unit 25 for a stream in temporal order including I2 and P5, which are frames necessary as reference images for decoding B3 which is to be output secondly, and B3 which is the frame to be played (output). The stream supply control unit 23 supplies these to the decoder 28.

The decoder 28 decodes the supplied data in order, sets I2 and P5 in the reference base band image memory 29, under control of the memory control unit 41, and uses these as reference images to decode B3. The decoder 28 supplies base band image data corresponding to the decoded B3 to the base band image data memory control unit 30, and holds in the base band image data memory 31 (memory copy). Various types of correction are performed at the base band signal processing unit 32 (base band processing), and output base band image data is output.

This sort of processing has been used to perform scrub playback with the player device 1 according to the related art.

SUMMARY OF THE INVENTION

With the player device 1 described with reference to FIG. 1, a compressed stream is supplied to the decoder 28 in time sequence, decoding is performed, and the decoded and generated base band image data is output. In the event that the supplied compressed stream is a compressed stream which has been compressed by inter-frame reference, the decoder 28 causes the reference base band image memory 29, under control of the memory control unit 41, to hold the reference images necessary for subsequent decoding, thereby decoding the compressed stream.

Specifically, in the event that the supplied compressed stream has been encoded with MPEG2 LongGOP, an I picture is decoded, held in the reference base band image memory 29, this I picture is reference to decode a P picture, which is held in the reference base band image memory 29, and the I picture or P picture being held is reference to decode a B picture. Also, the reference image data held in the reference base band image memory 29 is discarded following decoding of the frame to be referenced.

That is to say, the reference base band image memory 29 is controlled by the memory control unit 41 of the decoder 28, and is used only for temporary storage of reference image data in the event of decoding compressed data where inter-frame reference is performed.

With such a method, decoding temporally random images a high speed has been difficult. For example, in the event an image decoded several frames ago needs to be used as a reference image, but does not remain in the reference base band image memory 29 referable by the decoder 28, the base band image frame necessary as a reference image has to be supplied to the decoder 28 again, decoded, and set to the reference base band image memory 29. only then can the base band image frame to be played for output be decoded by the decoder 28, so decoding temporally random images a high speed has been difficult.

Accordingly, with the method according to the related art, following scrub playback (random playback) commands at high speed for playback and output has been difficult. Also, playback at high speed of random-positioned frames being difficult means that jog playback wherein frame feed is performed at a number of frames proportionate to the amount of operation (e.g., in the event that the operating input device is a dial, the amount of rotation of the dial, or the like), shuttle playback wherein search playback is performed at a speed proportionate to the amount of operation, and further, reverse playback, pause, frame feed, frame reverse, and other such types of playback, variable-speed playback, reverse playback, trick playback, and so forth, cannot be performed with playback and output following at high speed.

Accordingly, the present inventors have recognized a need for the ability to follow commands for scrub playback (random playback) with playback and output at high speed, an issue with is addressed by the present invention.

According to an embodiment of the present invention, there is provided a program for causing a computer to execute processing including the steps of inputting reproduction information, in which input of reproduction information indicating an reproduction state of an encoded stream is received, obtaining reference picture information, in which reference picture information indicating a reference picture necessary for performing decoding processing of a relevant picture in the encoded stream is obtained, based on the reproduction information input by the reproduction information input processing, determining whether the reference picture is stored in a predetermined storage region, based on the reference picture information obtained by the reference picture information obtaining processing, obtaining and decoding the reference picture not stored in the storage region from the encoded stream, in the event that determination is made that the reference picture is not stored in the storage region by the determining processing, and controlling storage thereof to the storage region, and using the reference picture stored in the storage region to perform decoding processing of the relevant picture in the encoded stream, thereby generating image data which is stored in the storage region.

Decoding processing may be executed by a plurality of decoding methods in the reference picture decoding processing and the decoding processing, with the processing of the program further comprising the step of first determining for determining the decoding order and decoding method of the encoded stream based on the reproduction information input by the reproduction information input processing, wherein the reference picture decoding step and the decoding processing are executed based on the decoding order and decoding method determined by the processing of the first determining.

Determination may be made in the determining processing regarding whether or not the reference picture decoded by the decoding method determined by the first determining processing is stored in the storage region.

In the reference picture decoding processing and the decoding processing, one of a plurality of decoding processes with different resolution may be executable based on the determination made by the first determining.

In the reference picture decoding processing and the decoding processing, one of a plurality of decoding processes corresponding to a plurality of encoding methods may be executable based on the determination made by the first determining.

The encoded stream may include I pictures, P pictures, and B pictures, wherein, in the event that the relevant picture in the encoded stream is a B picture, an I picture or a P picture which is temporally in the proximity of the relevant picture is decoded.

The encoded stream may include intra-frame encoded pictures and inter-frame prediction-encoded pictures, wherein, in the event that the relevant picture in the encoded stream is an inter-frame prediction-encoded picture in the decoding processing, an intra-frame encoded picture which is temporally in the proximity of the relevant picture is decoded.

The processing of the program may further include a step of second determining, with the decoding method of the encoded stream being determined based on the number of reference frames on the past side included in the reference picture information, and the number of frames regarding which decoding processing can be performed during display of an image corresponding to one frame.

The processing of the program may further include a step of calculating the number of frames regarding which decoding processing can be performed during the display time of an image corresponding to one frame.

The processing of the program may further include a step of calculating the number of reference frames on the past side included in the reference picture information.

According to another embodiment of the present invention, there is provided a decoding device for performing decoding processing of an encoded stream, the device comprising inputting means for inputting reproduction information, in which input of reproduction information indicating an reproduction state of an encoded stream is received, reference picture information managing means for managing reference picture information indicating a reference picture necessary for performing decoding processing of a relevant picture in the encoded stream, decoding means for performing decoding processing of the encoded stream and generating image data, storing means for storing the image data generated by the decoding means, storage managing means for managing the stored state of the image data stored by the storing means, and decoding control means for controlling decoding processing by the decoding means, by referencing the reference picture information managed by the reference picture information managing means, and the stored state managed by the storage managing means, wherein the decoding means performs decoding processing of the encoded stream by taking one of the image data stored by the storing means as a reference picture, and supplying the relevant picture that has been decoded to the storing means for storage.

According to another embodiment of the present invention, there is provided a decoding method of a decoding device for decoding an encoded stream using a predetermined storage region where image data is stored, the method including the steps of, inputting reproduction information, in which input of reproduction information indicating an reproduction state of the encoded stream is received, obtaining reference picture information, in which reference picture information indicating a reference picture necessary for performing decoding processing of a relevant picture in the encoded stream is obtained, based on the reproduction information input by the reproduction information input processing, determining whether the reference picture is stored in a predetermined storage region, based on the reference picture information obtained by the reference picture information obtaining processing, obtaining and decoding the reference picture not stored in the storage region from the encoded stream, in the event that determination is made that the reference picture is not stored in the storage region by the determining processing, and controlling storage thereof to the storage region, and using the reference picture stored in the storage region to perform decoding processing of the relevant picture in the encoded stream, thereby generating image data which is stored in the storage region.

According to another embodiment of the present invention, there is provided a storage medium storing the program.

According to another embodiment of the present invention, there is provided a decoding device for performing decoding processing of an encoded stream, the device comprising an operation input obtaining unit for inputting reproduction information, in which input of reproduction information indicating an reproduction state of an encoded stream is received, an index managing unit for managing reference picture information indicating a reference picture necessary for performing decoding processing of a relevant picture in the encoded stream, a decoding processing unit for performing decoding processing of the encoded stream and generating image data, a storage unit for storing the image data generated by the decoding processing unit, a base band memory managing unit for managing the stored state of the image data stored by the storage unit, and a decoding control unit for controlling decoding processing by the decoding processing unit, by referencing the reference picture information managed by the index managing unit, and the stored state managed by the base band memory managing unit, wherein decoding processing unit performs decoding processing of the encoded stream by taking one of the image data stored by the storage unit as a reference picture, and supplying the relevant picture that has been decoded to the storage unit for storage.

Thus, according to embodiments of the present invention, stream image data is decoded, and particularly a reference frame and a frame which is played and output following decoding are stored in the same storage region, so scrub playback can be performed at high speed.

BRIEF DESCRIPTION OF THE DRAWINGS

FIGS. 20A and 20B are diagrams describing a case of P picture random reproduction.

FIGS. 21A and 21B are diagrams describing a case of B picture random reproduction.

FIG. 24 is a chart for describing a case of changing the number of PI conversions;

FIGS. 27A and 27B are diagrams for describing minimal decoding;

FIGS. 29A and 29B are diagrams for describing minimal decoding;

FIG. 31 is a diagram for describing setting of a P picture to be converted; and

FIG. 32 is a flowchart for describing proxy file generating processing 2.

DESCRIPTION OF THE PREFERRED EMBODIMENTS

Figure 1:
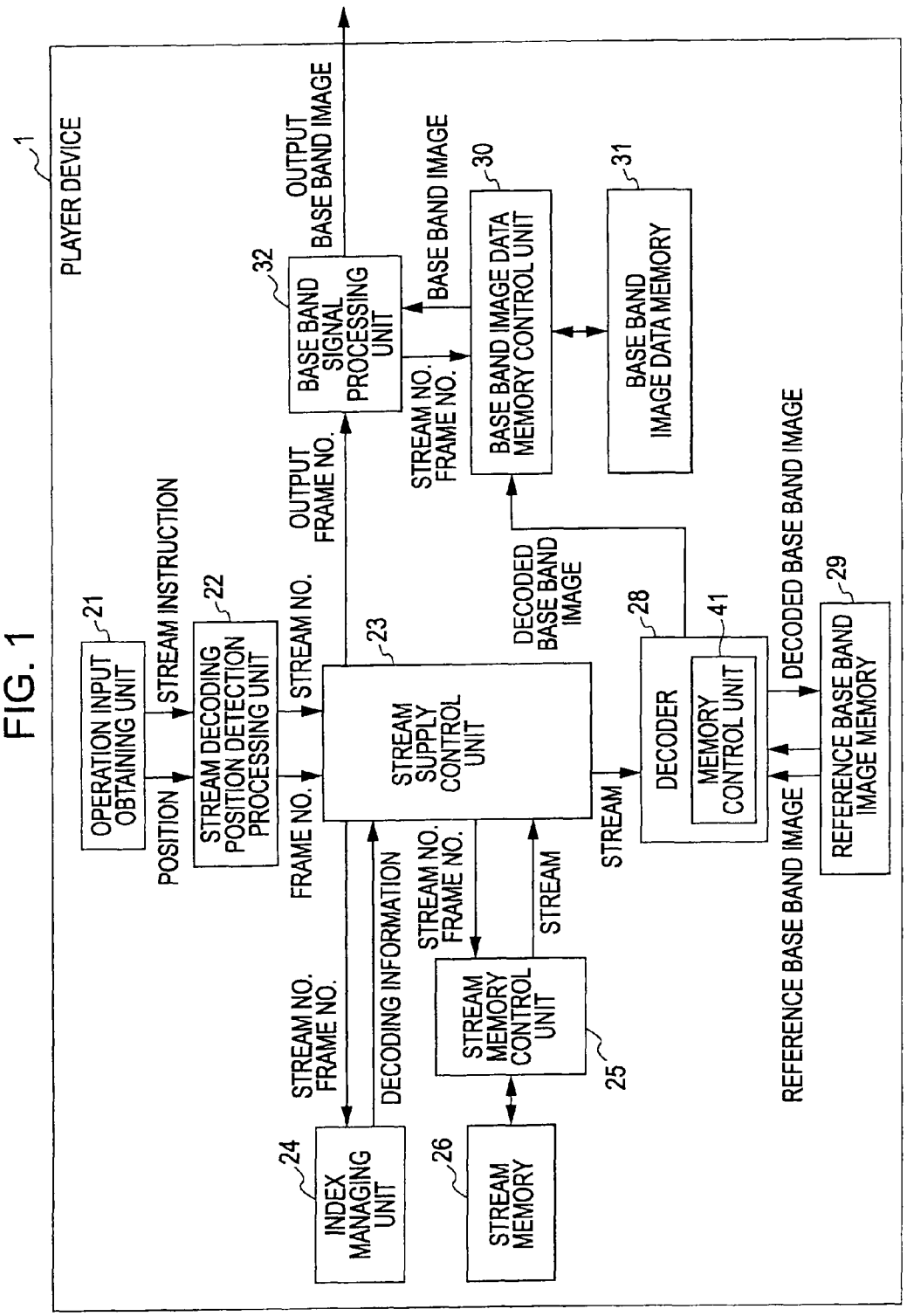
FIG. 1 is a block diagram illustrating the configuration of a player device according to the related art.
Figure 2:
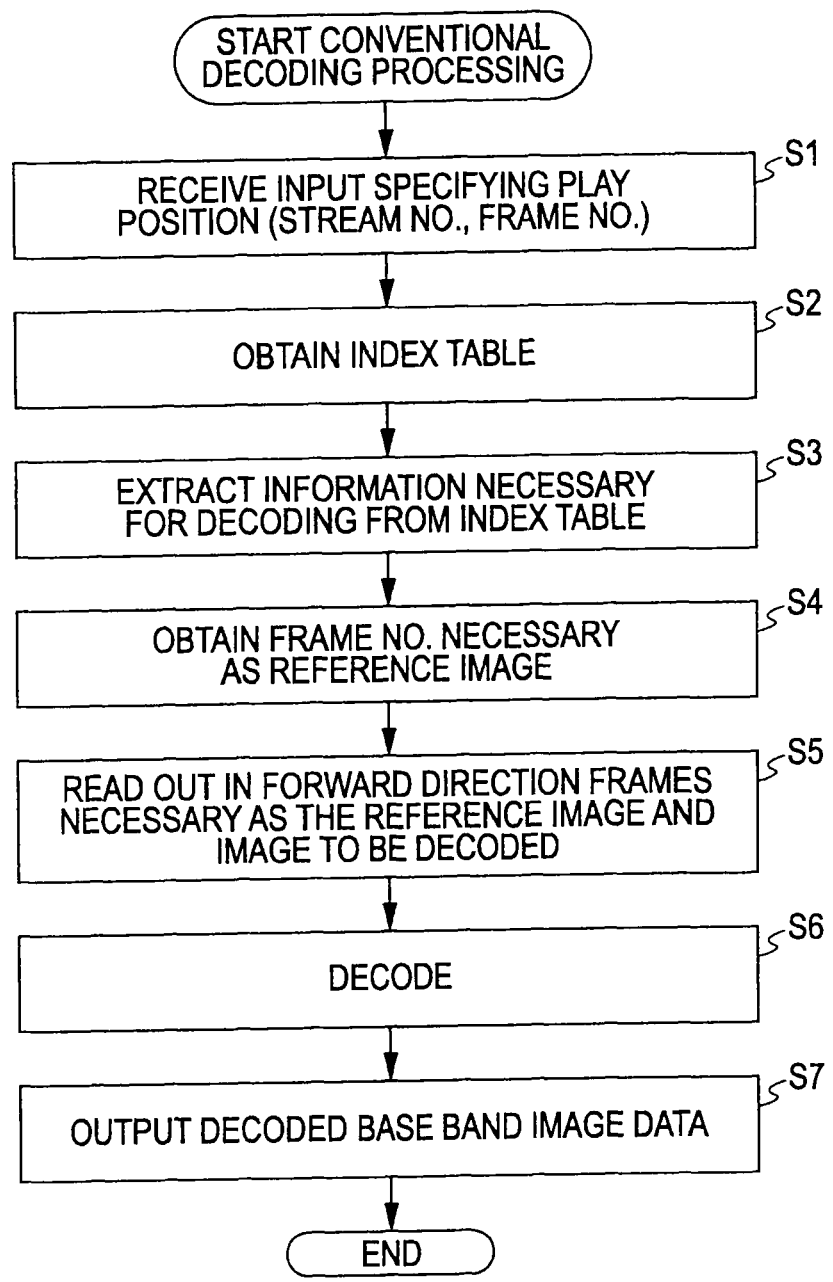
FIG. 2 is a flowchart for describing decoding processing according to the related art.
Figure 3:
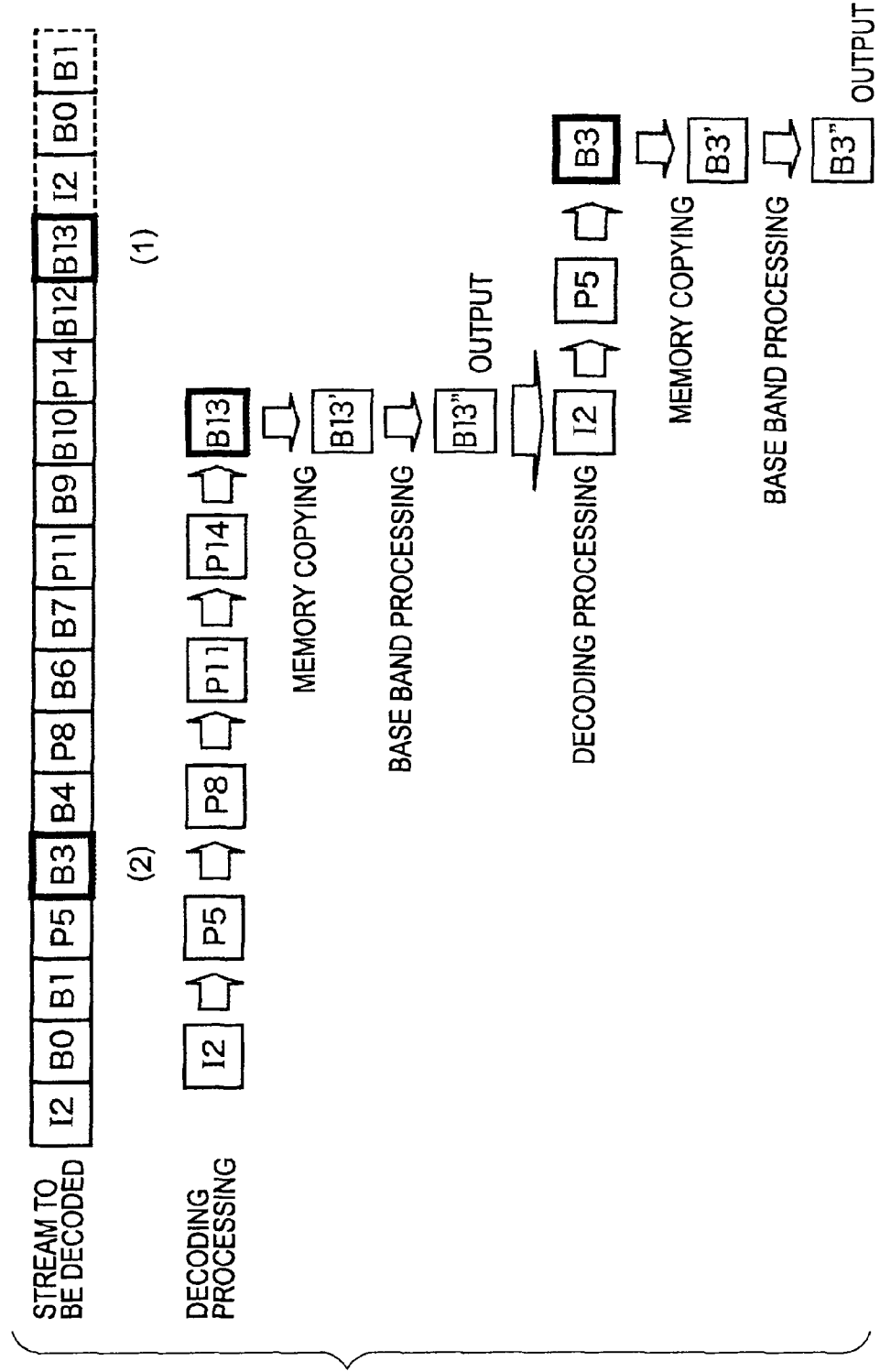
FIG. 3 is a diagram for describing scrub playback with a player device according to the related art.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims that does not necessarily mean that the element does not relate to other features of the claims.

A program or decoding method according to an embodiment of the present invention causes a computer to execute processing including the steps of inputting reproduction information (e.g., the processing of step S41 in FIG. 11), in which input of reproduction information indicating a reproduction state of an encoded stream (e.g., specification of a frame to be played, or playback speed or playback mode) is received, obtaining reference picture information (e.g., the processing of step S46 in FIG. 11), in which reference picture information indicating a reference picture necessary for performing decoding processing of a relevant picture in the encoded stream is obtained, based on the reproduction information input by the reproduction information input processing, determining (e.g., the processing of step S47 in FIG. 11) whether the reference picture is stored in a predetermined storage region (e.g., base band image data memory 223 of RAM 223 shown in FIG. 10), based on the reference picture information obtained by the reference picture information obtaining processing, obtaining and decoding the reference picture not stored in the storage region from the encoded stream (e.g., the processing of step S48 in FIG. 11), in the event that determination is made that the reference picture is not stored in the storage region by the determining processing, and controlling storage thereof to the storage region, and using the reference picture stored in the storage region to perform decoding processing (e.g., the processing of step S49 in FIG. 11) of the relevant picture in the encoded stream, thereby generating image data which is stored in the storage region.

Decoding processing may be executed by a plurality of decoding methods in the reference picture decoding processing and the decoding processing, with the processing of the program further comprising the step of first determining (e.g., the processing of step S44 in FIG. 11) for determining the decoding order and decoding method of the encoded stream based on the reproduction information input by the reproduction information input processing, wherein the reference picture decoding step and the decoding processing are executed based on the decoding order and decoding method determined by the processing of the first determining.

In the reference picture decoding processing and the decoding processing, one of a plurality of decoding processes corresponding to a plurality of encoding methods (e.g., dedicated decoding processing for a predetermined picture type, or decoding processing other than for MPEG) may be executable based on the determination made by the first determining.

The encoded stream may include intra-frame encoded pictures (e.g., I pictures) and inter-frame prediction-encoded pictures (e.g., P pictures and B pictures), wherein, in the event that the relevant picture in the encoded stream is an inter-frame prediction-encoded picture in the decoding processing, an intra-frame encoded picture which is temporally in the proximity of the relevant picture is decoded.

The processing of the program may further include a step of second determining (e.g., the processing of step S127 in FIG. 13, i.e., the processing shown in FIG. 14), with the decoding method of the encoded stream being determined based on the number of reference frames on the past side included in the reference picture information (e.g., value corresponding to depth information), and the number of frames regarding which decoding processing can be performed during display of an image corresponding to one frame (e.g., the number of decodable frames).

Figure 14:
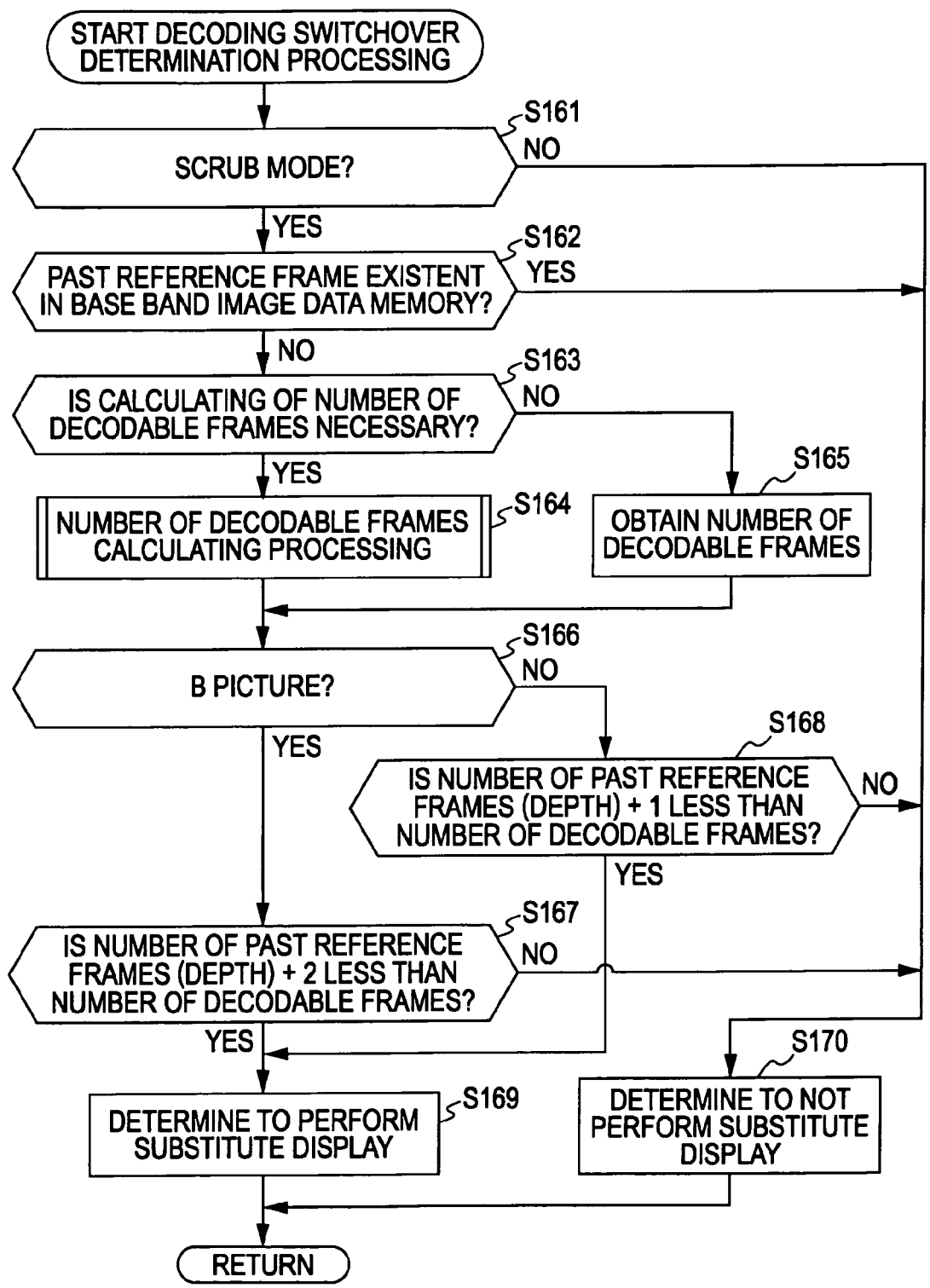
FIG. 14 is a flowchart for describing decoding switchover determining processing.

The processing of the program may further include a step of calculating the number of frames (e.g., number of decodable frames) regarding which decoding processing can be performed during the display time of an image corresponding to one frame (e.g., the processing of step S164 in FIG. 14).

The processing of the program may further include a step of calculating (e.g., the processing described with reference to FIG. 12) the number of reference frames on the past side included in the reference picture information (e.g., value corresponding to depth information).

According to another embodiment of the present invention, there is provided a decoding device (e.g., a player device shown in FIG. 4 or a personal computer 201 shown in FIG. 9) for performing decoding processing (e.g., specification of a frame to be played, or playback speed or playback mode) of an encoded stream, the device comprising inputting means (e.g., an operation input obtaining unit 21 shown in FIG. 4) for inputting reproduction information, in which input of reproduction information indicating an reproduction state of an encoded stream is received, reference picture information managing means (e.g., an index managing unit 24 shown in FIG. 4) for managing reference picture information indicating a reference picture necessary for performing decoding processing of a relevant picture in the encoded stream, decoding means (e.g., a decoding processing unit 76 shown in FIG. 4) for performing decoding processing of the encoded stream and generating image data, storing means for storing the image data generated by the decoding means, storage managing means (e.g., a base band memory managing unit 73 shown in FIG. 4) for managing the stored state of the image data stored by the storing means (e.g., base band image data memory 31 shown in FIG. 4), and decoding control means (e.g., a decoding control unit 72 shown in FIG. 4) for controlling decoding processing by the decoding means, by referencing the reference picture information managed by the reference picture information managing means, and the stored state managed by the storage managing means, wherein the decoding means performs decoding processing of the encoded stream by taking one of the image data stored by the storing means as a reference picture, and supplying the relevant picture that has been decoded to the storing means for storage.

The following is a description of an embodiment of the present invention with reference to the drawings.

Figure 4:
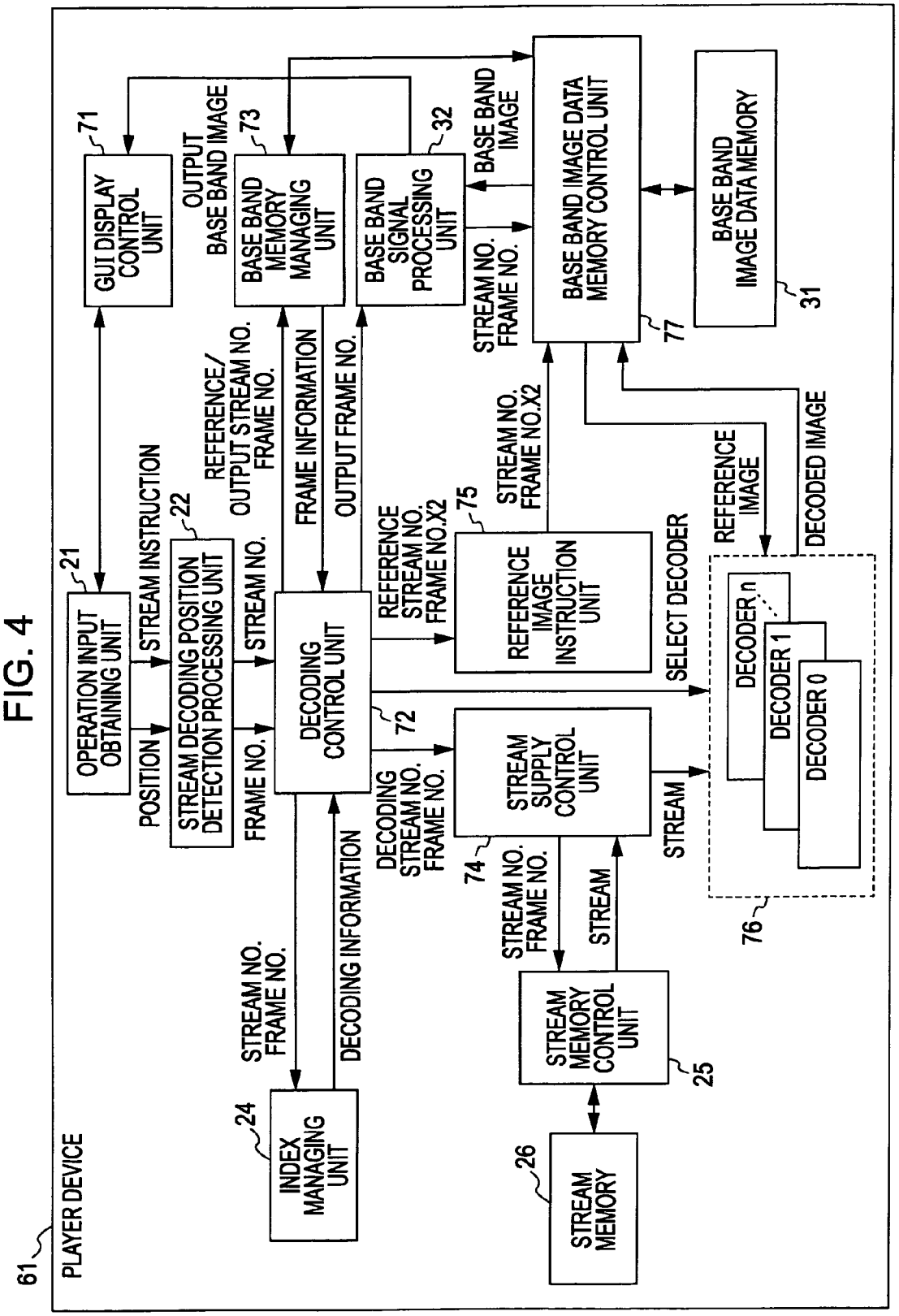
FIG. 4 is a block diagram illustrating the configuration of a player device to which the present invention has been applied.

FIG. 4 is a block diagram illustrating a configuration example of a player device 61 to which the present invention has been applied. Note that components which are the same as or equivalent to those shown in FIG. 1 illustrating the related art will be denoted with the same reference numerals, and description thereof will be omitted as appropriate.

That is to say, the player device 61 shown in FIG. 4 has basically the same configuration as the player device 1 described with reference to FIG. 1 other than being provided with a stream supply control unit 74 instead of the stream supply control unit 23, provided with a decoding processing unit 76 instead of the decoder 28, provided with a base band image data memory control unit 77 instead of the base band image data memory control unit 30, having the reference base band image memory 29 omitted, and being newly provided with a GUI display control unit 71, decoding control unit 72, base band memory managing unit 73, and reference image instructing unit 75.

Figure 5:
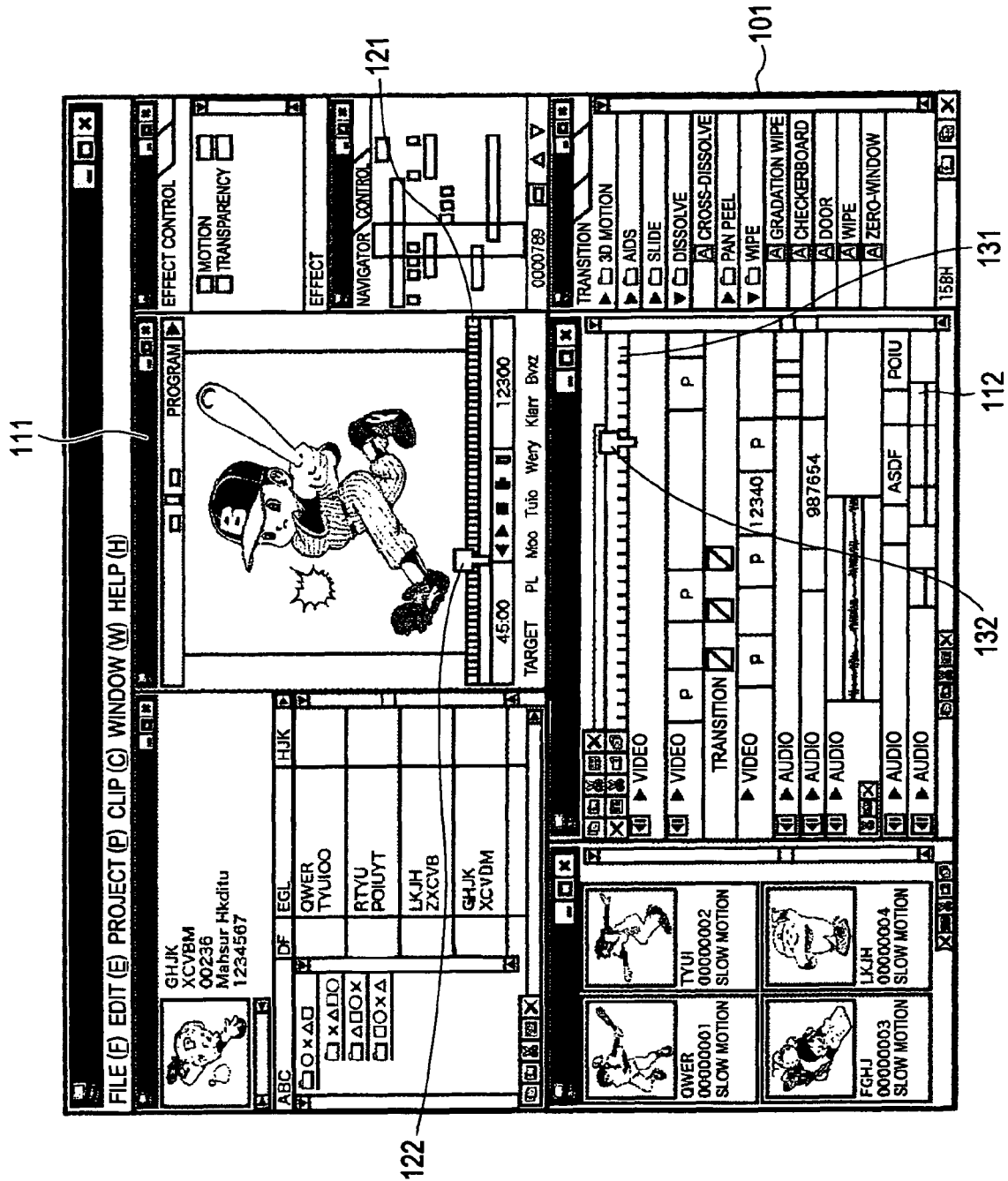
FIG. 5 is a diagram for describing an editing screen.

The GUI display control unit 71 is for providing a GUI (Graphical User Interface) for prompting operating input from the user, and controlling display of a screen for performing display output of processing results, and controls display of an editing screen such as that shown in FIG. 5, for example.

The editing screen 101 shown in FIG. 5 has various types of GUIs for detecting desired editing points while randomly playing multiple stream data, executing editing processing at desired editing points such as connecting different stream data one with another, and so forth.

For example, stream data selected by a user is decoded at the decoding processing unit 76, stored in the base band image data memory 31 via the base band image data memory control unit 77, and following predetermined processing having been preformed at the base band signal processing unit 32, is displayed in a playback window 111 under processing of the GUI display control unit 71. That is to say, the output base band image data for playback which has been processed at the base band signal processing unit 32 is supplied to the GUI display control unit 71, and is displayed on the playback window 111 of the editing screen 101 of which display is controlled by the GUI display control unit 71.

The playback position of the stream data is set by the position of a pointer 122 of a scrub bar 121 provided at the lower portion of the playback window 111 being moved based on user operation input. For example, a time line 131 is provided capable of notifying the user of the playback position of video streams and audio streams on the time axis, and the playback position can be specified by a pointer 132 on the timeline 131 being moved based on user operation input.

The operation input obtaining unit 21 obtains user operation input making reference to the editing screen 101 described with reference to FIG. 5. The operation input obtaining unit 21 receives, from the user, selection of stream to be decoded, and specification of playback start position, i.e., operations of the pointer 122 of the scrub bar 121 or pointer 132 of the time line 131, instruction of playback mode and playback speed and the like, and supplies these to the stream decoding position detection processing unit 22. The stream decoding position detection processing unit 22 obtains the Stream No. of the stream to be played and the Frame No. of the play start position, based on the selection of the stream to be decoded that is supplied from the operation input obtaining unit 21 and the specification of the play start position, and supplies these to the decoding control unit 72 along with instructions such as playback speed and the like.

The playback mode includes, for example, normal playback from a predetermined play position, fast forward, rewind, forward frame feed, freeze frame, and so forth, and the speed of fast forward and rewind, the intervals between frames in frame feed, and so forth, can each be set.

The decoding control unit 72 obtains an index table (FIG. 6) listing various types of information necessary for decoding a relevant stream stored in the index managing unit 24, based on the Stream No. of the stream to be played and the Frame No. at the play start position that have been supplied from the stream decoding position detection processing unit 22, and instructions such as playback speed and playback mode, and further obtains base band image data information stored in the base band image data memory 31 and managed by the base band memory managing unit 73. The decoding control unit 72 determines the decoder to be used for decoding and the decoding order, based on these information.

Figure 6:
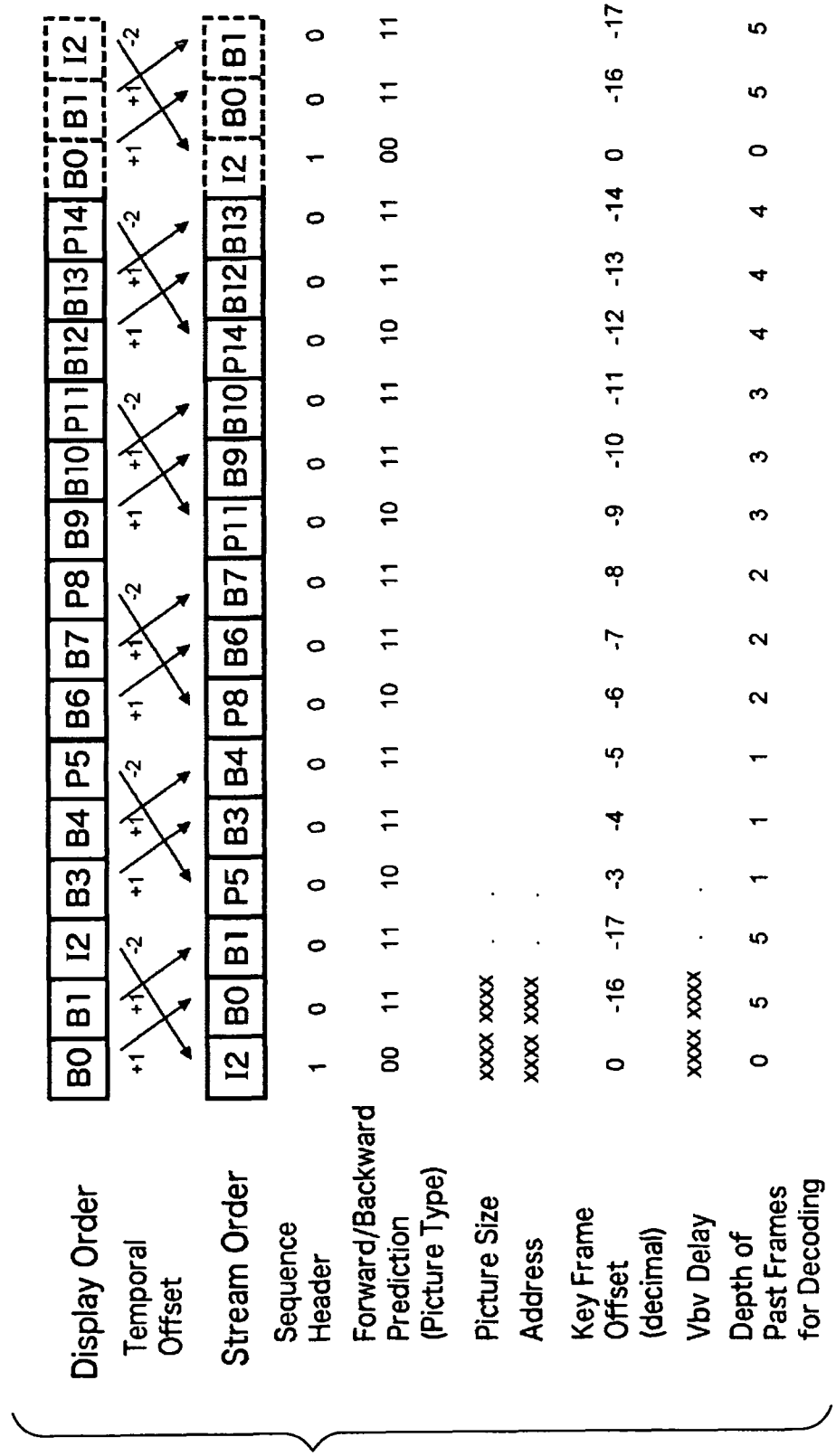
FIG. 6 is a diagram for describing an index table.

FIG. 6 shows an example of an index table stored in the index managing unit 24.

The index table shown in FIG. 6 lists the order of pictures in display order, the order of pictures in stream order, and the amount of offset (temporal offset) involved in converting the order of pictures from the display order to the stream order. Also, information indicating the position of a sequence header in the stream order is indicated in FIG. 6 by zeroes and ones, 1 indicating that there is a sequence header and 0 indicating that there is none. Also, information indicating whether or not there is a forward or backward reference image (forward/backward prediction (picture type)) is listed here.

Note that the information indicating whether or not there is a forward or backward reference image assumes that the supplied bit stream is OpenGOP in this example, with a forward prediction encoded frame (i.e., P picture) indicated by "10", a both-way prediction encoded frame (i.e., B picture) indicated by "11", and an intra-frame encoded frame (i.e., I picture) indicated by "00". In the event that the supplied bit stream is ClosedGOP, the two B pictures following intra-frame encoded data (i.e., I picture) only refer backward, and accordingly "01" is given.

The index table lists the picture size of each picture, and the address of the picture within the stream or within the recording region. Also, the index table lists information (key frame offset (decimal)) indicating the distance between a picture and a key frame picture (in this case, an I picture where intra-frame encoding processing is performed), and VbvDelay (VBV stands for Video Buffer Verifier) indicating the accumulation amount at a virtual input buffer of the decoder in terms of a 90 KHz clock. Further, the index table lists the depth of past frames for decoding, which is the number of frames (depth) between the frame to be played to the farthest frame.

That is to say, the decoding control unit 72 searches the position of an I frame (key frame) necessary for decoding the frame at the play start position that has been specified, and the address and picture size and the like of the steam stored in the stream memory 26, based on the index table. Also, the decoding control unit 72 determines quality necessary for decoding, based on information such as the play speed instructed by the user.

Specifically, the in order to maintain the display quality and number of frames and the like of the frames to be ultimately output, in accordance with the processing speed of the components within the player device 61 and the data rate of the stream handled, for example, the decoding control unit 72 controls the decoding order with one of the following methods (1) through (3).

(1) Frames are decoded in the order specified for playback, so that latency (standby) is minimized.

(2) In the event that the picture type of a frame instructed to be played is a B picture, a nearby I picture or P picture is decoded and output.

(3) only an I picture nearby the frame instructed to be played is decoded and output.

Specifically, an arrangement can be made wherein, for example, in the event that the decoding order can be controlled by the method (1), the method (1) is employed by the decoding control unit 72, and in the event that fast forward or rewinding of speeds high to a certain degree are instructed such that the method (1) cannot ensure the number of display frames to be ultimately output, the decoding order is controlled with the method (2), and in the event that the method (2) cannot ensure the number of display frames to be ultimately output either, the decoding order is controlled with the method (3).

Also, the decoding control unit 72 can select the almost appropriate of the multiple decoders included in the decoding processing unit 76 as the decoder for executing the decoding processing, in order to maintain the display quality and the number of display frames of the display frames to be ultimately output, based on the instructed playback mode, processing speed of the components within the player device 61, and the data rate of the stream handled, and so forth.

Specifically, in the event of controlling the decoding order with the above-described method (1) for example, the decoder control unit 72 may select a high-resolution decoder in the event that the display speed is slower than a certain level or sill images are to be displayed, i.e., in the event that the playback mode is such that the resolution of images display is sufficiently recognizable by the user. On the other hand, in the event of controlling the decoding order with the above-described method (1) again but in the event that the playback mode is such that the resolution of images display is not readily recognizable by the user such as the display speed being faster than a certain level, the decoder control unit 72 may select a low-resolution decoder.

Also, even in cases that playback at the same speed is instructed, in the event of controlling the decoding order with the method (1) for example, the decoding control unit 72 can select a low-resolution decoder such that the number of display frames to be ultimately output can be ensured. On the other hand, in the event of controlling the decoding order with the method (2), the decoding control unit 72 can select a high-resolution decoder since that the number of display frames to be ultimately output can be sufficiently ensured.

Further, the decoding control unit 72 can select a decoder dedicated for a particular picture type (a decoder dedicated for I pictures in this case), such as in the event of controlling the decoding order with the method (3) for example.

Also, the decoder control unit 72 can have decoders capable of decoding compressed streams compressed with compression formats other than MPEG, and for example, in the event that a compressed stream compressed with a compression format other than MPEG is supplied, a decoder capable of decoding that compressed stream can be selected and decoding processing executed.

Also, the decoding control unit 72 may switch the decoding order or selection of the decoder for each stream or each frame.

Further, the decoding control unit 72 determines a reference frame necessary for decoding a specified frame, based on index data, and determines whether or not the necessary reference frame has already been decoded, based on the base band image data information stored in the base band image data memory 31 obtained from the base band memory managing unit 73. The decoding control unit 72 determines the decoding order of the frames which need to be decoded and the decoder for executing the decoding, based on the determination results. The decoding control unit 72 then supplies the Stream No. of the stream to be decoded and the Frame No. of the frame to be decoded to the stream supply control unit 74, supplies the Stream No. of the stream to be decoded and the Frame No. of frames which need to be read out from the base band image data memory 31 as reference images (0 to 2 frames per playback frame) to the reference image instructing unit 75, and supplies the selection result of the decoder to be used for processing and the control signals for controlling the decoding processing to the decoding processing unit 76.

The base band memory managing unit 73 monitors the base band image data hold in the base band image data memory 31 via the base band image data memory control unit 77, and supplies frame information of the base band image data held in the base band image data memory 31 to the decoding control unit 72.

The stream supply control unit 74 request the stream memory control unit 25 for stream data necessary for decoding, based on the Stream No. of the stream to be played, and the Frame No. of the frame to be decoded, that have been supplied from the decoding control unit 72, and supplies the stream data supplied from the stream memory control unit 25 to the decoding processing unit 76.

The stream memory control unit 25 controls storage of stream data at the stream memory 26, and reads out stream data requested from the stream supply control unit 74 from the stream memory 26 and outputs this to the stream supply control unit 74.

The stream memory 26 is for storing steam data, and outputs predetermined stream data under control of the steam memory control unit 25.

The reference image instructing unit 75 requests for the base band image data memory control unit 77 to supply frames needing to be read out from the base band image data memory 31 as reference images to the decoding processing unit 76, based on the Stream No. of the stream to be decoded that is supplied from the decoding control unit 72 and the Frame No. of the frames needing to be read out from the base band image data memory 31 as reference images, and causes the base band image data to be used as reference images to be supplied to the decoding processing unit 76.

The decoding processing unit 76 is configured of multiple decoders (decoder 0 through decoder n), with the stream data supplied from the stream supply control unit 74 being decoded based on control of the decoding control unit 72, and decoded by a suitable decoder based on band image data being supplied to the base band image data memory control unit 77.

Specifically, the decoding processing unit 76 is configured including, for example, high-resolution decoders, low-resolution decoders, decoders dedicated for particular pictures, decoders capable of decoding stream data compressed by compression methods other the MPEG, and so forth, and the compressed stream data supplied from the stream supply control unit 74 is decoded by referencing the base band image data supplied from the base band image data memory control unit 77 as necessary, using the decoder selected based on the control of the decoding control unit 72.

The base band image data memory control unit 77 supplies the decoded base band image data supplied from the decoding processing unit 76 to the base band image data memory 31, receives request from the reference image instructing unit 75 for supply of frames necessary to be read out form the base band image data memory 31 as reference images, and reads out the specified reference images from the base band image data memory 31, and supplies this to the decoding processing unit 76.

Also, the base band image data memory control unit 77 reads out the base band image data of the frame indicated by the Stream No. and Frame No. requested from the base band signal processing unit 32, from the base band image data memory 31, and supplies this to the base and signal processing unit 32. Even in cases that variable speed playback has been instructed such as jog playback for example, the base band image data memory control unit 77 can read out frames based on user operation input from the base band image data memory 31, and supply to the base band signal processing unit 32 for playback and output.

The base band signal processing unit 32 subjects the supplied base band image data to various types of correction such as color correction and size correction, field control for slow playback, and so forth, so that the decoded image will be properly played and output, and outputs the generated output base band image data to the GUI display control unit 71.

As described above, with the player device 61 to which the present invention has been applied, base band image data decoded by one of the decoders of the decoding processing unit 76 is all stored in the base band image data memory 31, and the reference images also are read out from the base band image data memory 31. The reference base band image memory 29 in the player device 1 described with reference to FIG. 1 is controlled only by the memory control unit 41 of the decoder 28, and only the decoder 28 exchanges data. Also, the base band image data memory 31 in the player device 1 described with reference to FIG. 1 supplies the base band image data supplied form the decoder 28 to the base band signal processing unit 32, under control of the base band image data memory control unit 30.

In comparison with this, the base band image data memory 31 of the player device 61 to which the present invention has been applied exchanges reference image data with the decoding processing unit 76 under control of the base band image data memory control unit 77, and also supplies base band image data to the base band signal processing unit 32 as with the related art.

With the player device 61 to which the present invention has been applied, in the event that base band image data usable as reference image data is stored in the base band image data memory 31, the base band image data stored in the base band image data memory 31 is used as reference images, so frames for generating reference images are not newly supplied to the decoding processing unit 76. That is, there are cases wherein frames supplied to the decoding processing unit 76 do not need to be in the normal frame order.

Also, with the player device 61 to which the present invention has been applied, in the event that base band image data usable as reference image data is stored in the base band image data memory 31, the base band image data stored in the base band image data memory 31 is used as reference images, so there are cases wherein the decoding processing unit 76 does not decode the supplied time-sequence bit stream in that order (in the event that there are reference images, the corresponding frame is not decoded but skipped).

Accordingly, a base band memory managing unit 73 for monitoring the base band image data stored in the base band image data memory 31 is provided to the player device 61 to which the present invention has been applied, a decoding control unit 72 is provided for selecting the decoding order and the decoder, based on the state of the base band memory, and also provided is a reference image instruction unit 75 for passing instructions for supply of reference images to the decoding processing unit 76, to the base band image data memory control unit 77.

Figure 7:
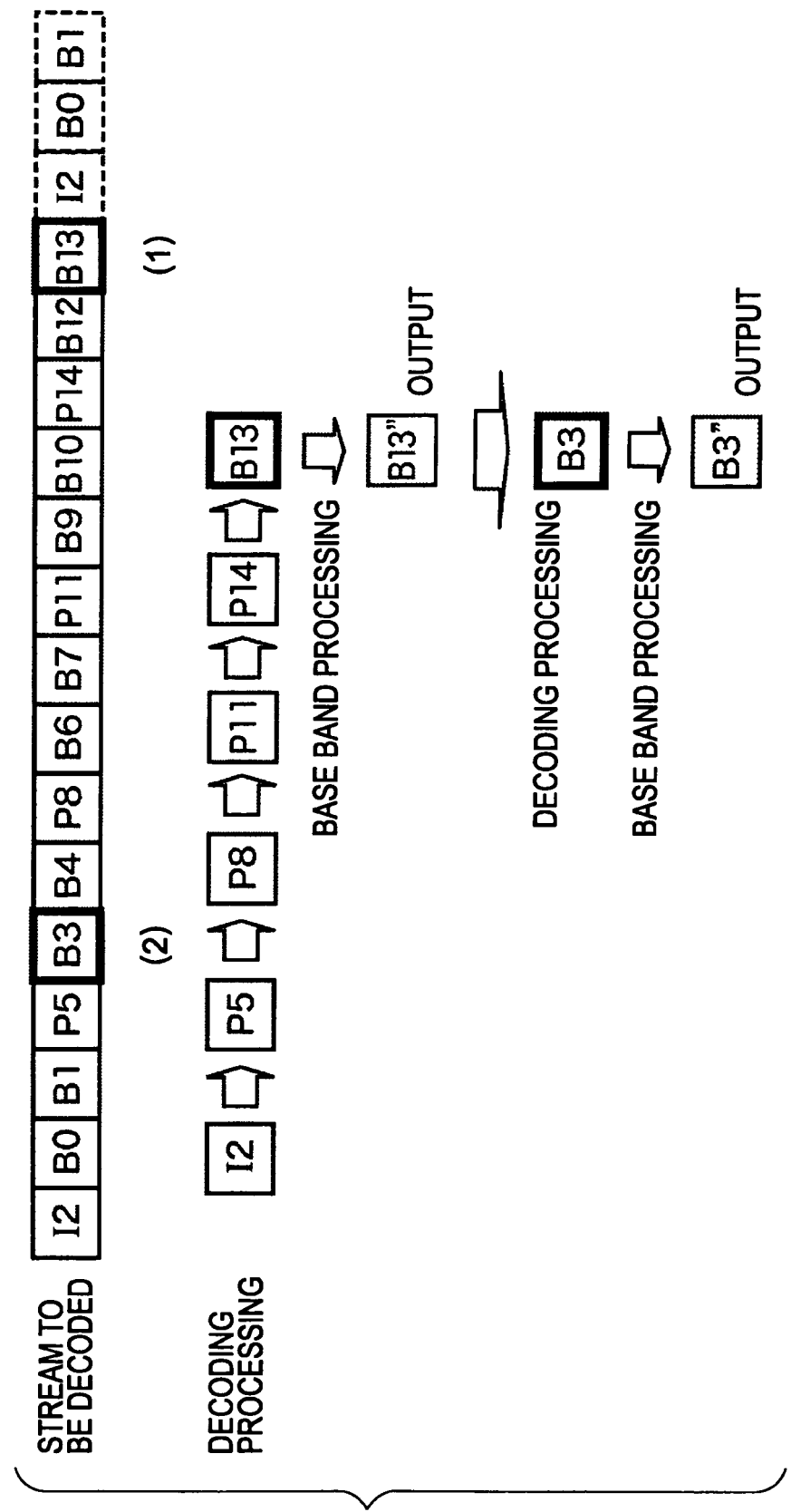
FIG. 7 is a diagram for describing scrub playback with the player device shown in FIG. 4.

Next, scrub playback wherein desired frames specified by the user are played will be described, with an example of a case of outputting the frame B13 and B 3 in order, with reference to FIG. 7.

The stream decoding position detection processing unit 22 receives from the operation input obtaining unit 21 input of the Stream No. of the stream to be decoded and the Frame Nos. of B13 and B3 specified as frames to be played and output, and also receives instructions such as playback speed and playback mode, which are supplied to the decoding control unit 72.

The decoding control unit 72 obtains the index table described with reference to FIG. 6 which is stored in the index managing unit 24, based on the Stream No. of the stream to be decoded and the Frame Nos. of B13 and B3 specified as frames to be played and output supplied from the stream decoding position detection processing unit 22, and also the instructions such as playback speed and playback mode, thereby obtaining various types of information necessary for decoding the corresponding stream, and further obtains information of the base band image data stored in the base band image data memory 31, managed by the base band memory managing unit 73. Here, description will proceed assuming that frames corresponding to reference images necessary for decoding B13 and B 3 specified as frames to be played and output have not been held within the base band image data memory 31.

The decoding control unit 72 determines the decoder to user for decoding and the decoding order. That is to say, in the event that the playback mode is consecutive playback of these two frames of still images, the decoding control unit 72 selects a high-resolution decoder from the decoder processing unit 76, decodes the frames I2, P5, P8, P11, and P14, which are frames necessary as reference images for decoding B13, decodes B13 using the reference images P11 and P14, and then next determines to decode B3 using the I2 and P5 already decoded and saved in the base band image data memory 31 for decoding of B13.

The decoding control unit 72 supplies the frame Nos. of the frames which need to be supplied to the decoding processing unit 76, i.e., the frames I2, P5, P8, P11, and P14, which are necessary as reference images for decoding B13 which is to be output first, and the frame Nos. of the frames B13 and B3 which are frames to be played and output to the stream supply control unit 74, along with the stream No.

The stream supply control unit 74 first requests the stream memory control unit 25 for the frames I2, P5, P8, P11, and P14, which are necessary as reference images for decoding B13 which is to be output first, and the frames B13 and B3 which are to be played and output, and sequentially supplies these to the decoding processing unit 76.

The decoder which has been selected by the decoding control unit 72 from the decoding processing unit 76 decodes the supplied data starting from the picture I2, based on control of the decoding control unit 72, supplies the base bands image data generated by decoding to the base band image data memory control unit 77, so as to save in the base band image data memory 31, and subsequently, at the time of decoding P5, P8, P11, and P14, receives supply of base band image data corresponding to the reference images out of the base band image data stored in the base band image data memory 31, via the base band image data memory control unit 77, so as to execute decoding base thereupon.

At the time of decoding B13 based on the control of the decoding control unit 72, the decoder which has been selected by the decoding control unit 72 from the decoding processing unit 76 receives supply of the base band image data corresponding to P11 and P14, decodes B13 using these as reference images, saves the base band image data corresponding to the decoded B13 in the base band image data memory 31 via the base band image data memory control unit 77, and then supplies this to the base band signal processing unit 32. At the base band signal processing unit 32, various types of correction (base band processing) is performed, and output base band image data is output.

Also, at the time of decoding B3 next based on the control of the decoding control unit 72, the decoder which has been selected by the decoding control unit 72 from the decoding processing unit 76 receives supply of the base band image data corresponding to I2 and P5 already stored in the base band image data memory 31, decodes B3 using these as reference images, saves the base band image data corresponding to the decoded B3 in the base band image data memory 31 via the base band image data memory control unit 77, and then supplies this to the base band signal processing unit. At the base band signal processing unit, various types of correction (base band processing) is performed, and output base band image data is output.

Thus, saving of decoded base band image data and saving of receiving images is performed with a single memory unit, so there is no need for memory copying for output processing, and also, there is no need for redundant decoding of the same frame to generate reference images, so playback frames can be decoded at high speeds in scrub playback.

Also, the memory which saves the reference images has been made to be controlled from a component other than the decoder in a manner independent from the decoder, so the degree of freedom of control of decoding order increases, further enabling switching of the input stream for each frame and switching the decoder for each frame, so various decoding algorithms can be handled.

Figure 8:
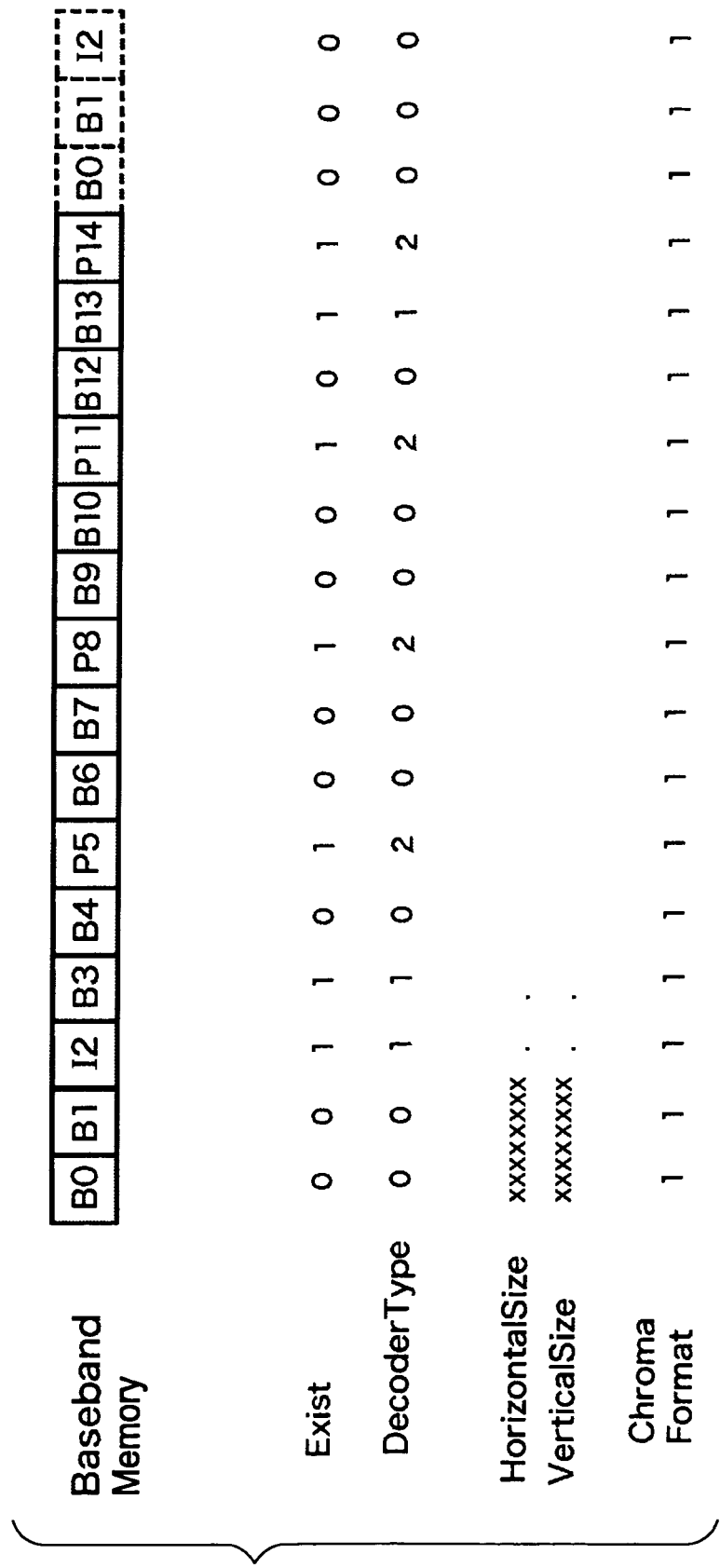
FIG. 8 is a diagram for describing information which the base band memory managing unit shown in FIG. 4 manages.

In order to perform the processing described with reference to FIG. 7, the base band memory managing unit 73 manages information such as shown in FIG. 8. That is to say, the base band memory managing unit 73 manages, in addition to a flag (Exist: indicating existing in a decoded form in the base band image data memory 31) indicating whether or not each frame exists in a decoded form in the base band image data memory 31, a value (Decoder Type: e.g., in the event of the case shown in FIG. 8 for example, a high-resolution decoder is indicated by 1, a low-resolution decoder by 2, and so forth) indicating which decoder of the decoding processing unit 76 the decoding has been performed by.

In the event of executing decoding using a high-resolution decoder, and base band image data to be used as a reference image is already decoded at low resolution and is hold in the base band image data memory 31, the decoding control unit 72 can be made to decode the corresponding compressed image frame with a high-resolution decoder rather than using this reference image data, so as to be used as a reference image, in order to prevent deterioration of the image.

Also, the base band memory managing unit 73 also manages horizontal size, vertical size, chroma format, and so forth, for each frame, and the base band signal processing unit 32 may be made to resize the supplied base band image signals based on this information, according to the output format.

The above-describe series of processing can be executed by hardware, or can be executed by software. In this case, the player device 61 is configured of a personal computer such as shown in FIG. 9.

Figure 9:
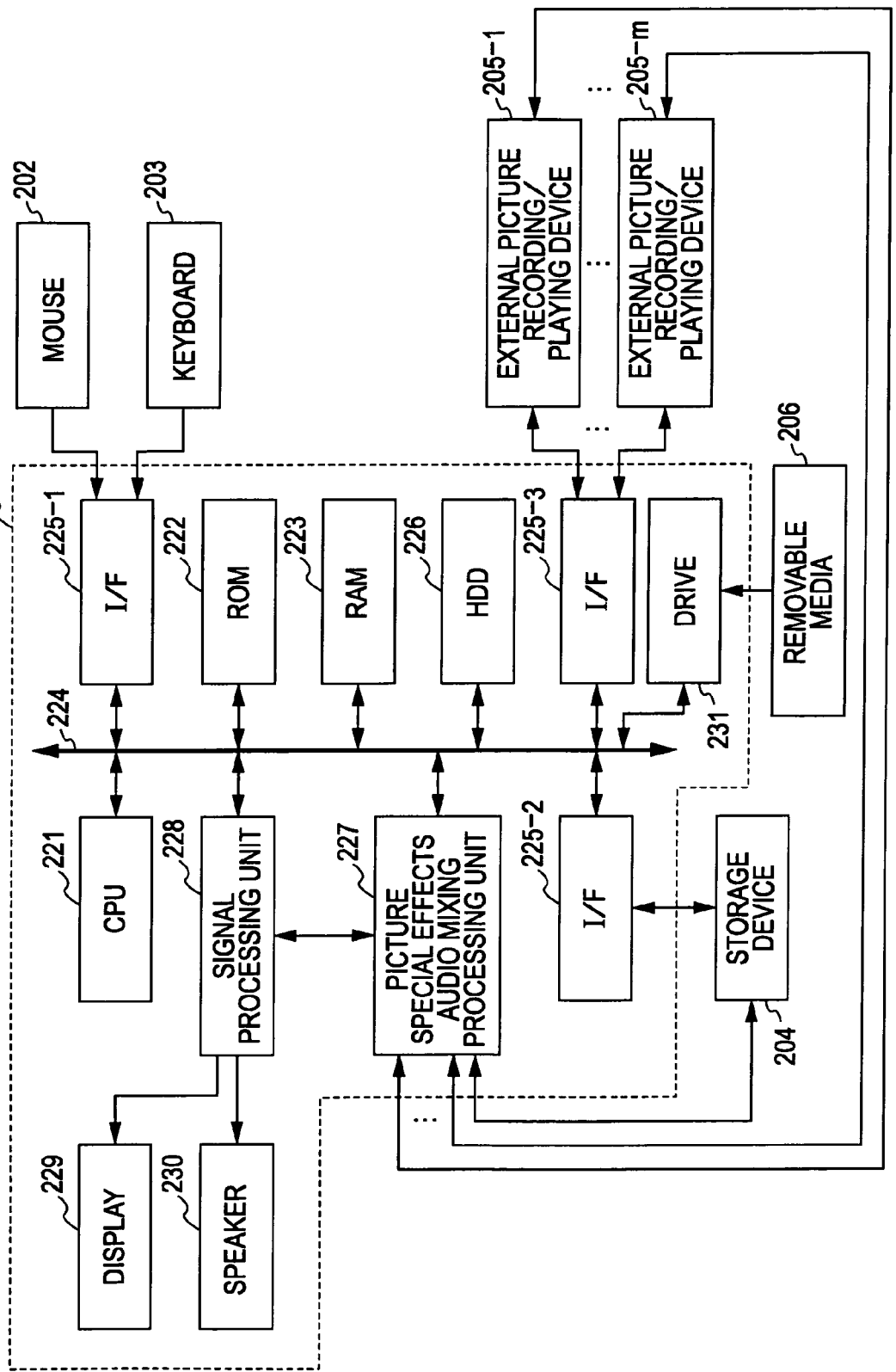
FIG. 9 is a block diagram illustrating the configuration of a personal computer.

In FIG. 9, a CPU (Central Processing Unit) 221 executes various types of processing following programs stored in ROM (Read Only Memory) 222 or programs loaded from an HDD (Hard Disk Drive) 226 to RAM (Random Access Memory) 223. The RAM 223 also stores data necessary for the CPU 221 to execute the various types of processing.

The CPU 221, ROM 222, and RAM 223 are mutually connected via a bus 224. Also connected to this bus 224 are interfaces (I/F) 225-1 through 225-3, the HDD 226, a picture special effects audio mixing processing unit 227, and signal processing unit 228.

Connected to the interface 225-1 are input devices such as a keyboard 202, mouse 203, and so forth. Connected to the interface 225-2 is a storage device 204, arranged so as to be capable of exchanging information. Also, connected to the interface 225-3 are external picture recording/playing devices 205-1 through 205-m, so as to be capable of exchanging information. Note that the external picture recording/playing devices 205-1 through 205-*m* will hereafter be collectively referred to as "external picture recording/playing device 205" as appropriate. The HDD 226 drives a hard disk, so as to be able to store various types of information.

The picture special effects audio mixing processing unit 227 is also connected to a signal processing unit 228 and the external picture recording/playing device 205, so as to take picture signals supplied from one of the storage device 204 and the external picture recording/playing device 205, or supplied from the HDD 226 via the bus 224, and subject these picture signals to special effects, mixing of audio, and so forth, and then supply these to the signal processing unit 228 for output, or supplying these to one of the storage device 204 and the external picture recording/playing device 205, for storage.

The signal processing unit 228 is connected to the display 229 and the speaker 230, and takes picture signals supplied from the picture special effects audio mixing processing unit 227 or the like for example, and supplies the picture signals to the display 229 for display and outputs the audio signals to the speaker 230 for audio output.

The display 229 is formed of, for example, a CRT (Cathode Ray Tube), LCD (Liquid Crystal Display), or the like, and displays pictures supplied from the signal processing unit 228. The speaker plays and outputs audio supplied from the signal processing unit 228.

Also connected to the bus 224 is a drive 231 if necessary, to which a removable medium 206 such as a magnetic disk, optical disk, magneto-optical disk, semiconductor memory, or the like, is mounted as appropriate, with computer programs read out therefrom being installed to the HDD 226 as necessary.

Figure 10:
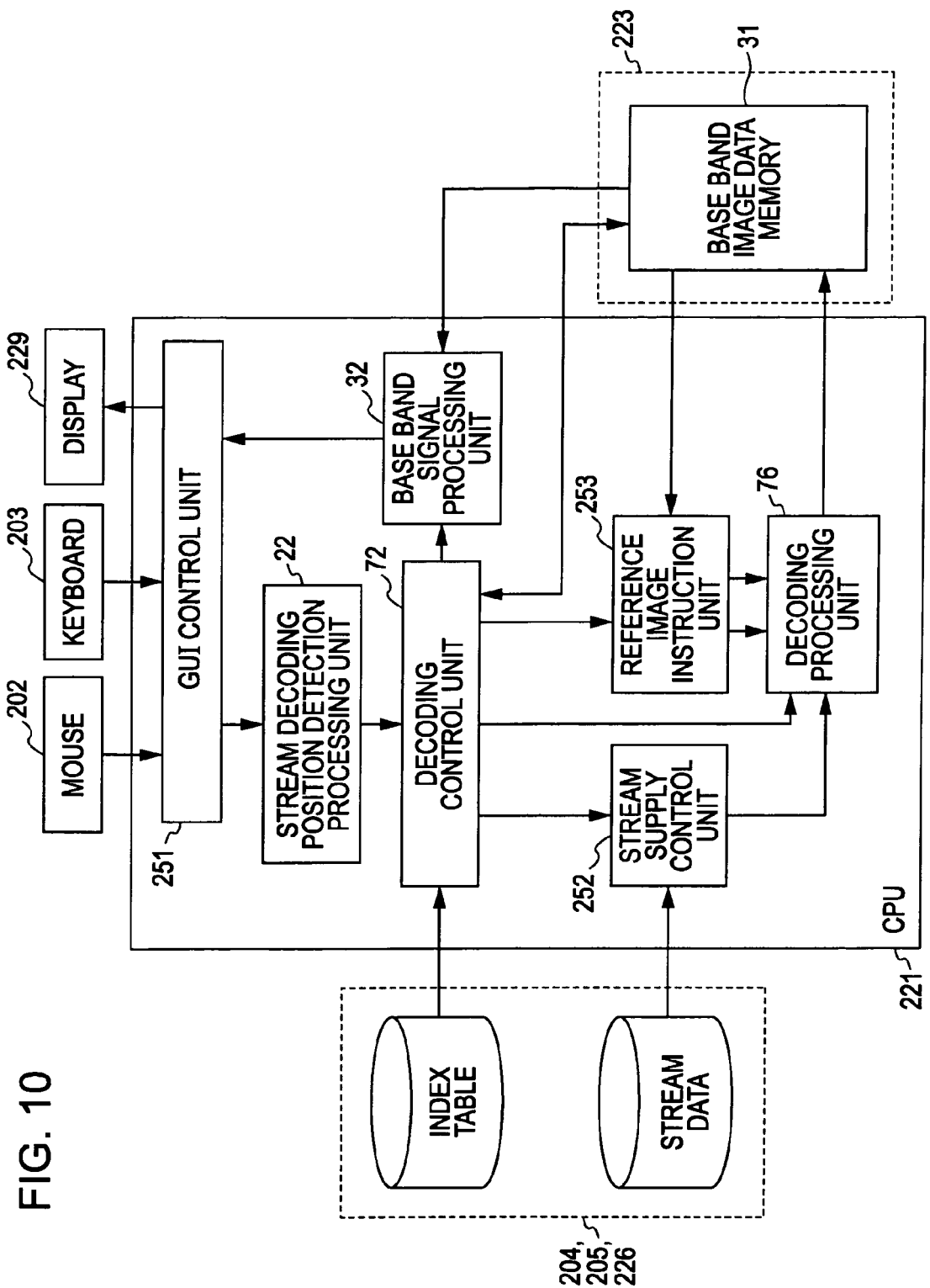
FIG. 10 is a function block diagram for describing functions realized by the personal computer shown in FIG. 9.

FIG. 10 is a functional block diagram illustrating an example of functions in the event of executing the processing to which the present invention has been applied, using software, on the personal computer 201 described with reference to FIG. 9.

Note that components which are the same as or equivalent to those in FIG. 4 or 9 are denoted with the same reference numerals, and description thereof will be omitted as appropriate.

The CPU 221 executes a predetermined program, whereby the personal computer 201 possesses the functions of a GUI control unit 251 having functions basically equivalent to those of the operation input obtaining unit 21 and GUI display control unit 71 shown in FIG. 4, a stream supply control unit 252 having functions basically equivalent to those of the stream supply control unit 74 and stream memory control unit 25 shown in FIG. 4, a reference image instructing unit 253 having functions basically equivalent to those of the reference image instructing unit 75 and base band image data memory control unit 77 shown in FIG. 4, and further has functions basically equivalent to those of the stream decoding position detection processing unit 22, the decoding control unit 72, the decoding processing unit 76, and the base band signal processing unit 32, all described with reference to FIG. 4.

The CPU 221 makes reference to the index table stored in the storage device 204, an external picture recording/playing device 205, or HDD 226, uses a predetermined region of the RAM 233 as base band image data memory 31 and makes reference to the base band image data stored in the base band image data memory 31, and determines the decoding order and decoding method of the frames included in a stream which the user has instructed, from the stream data stored in the storage device 204, an external picture recording/playing device 205, or HDD 226, based on user operations input from an input device such as the mouse 202 or keyboard 203.

The CPU 221 uses a predetermined region of the RAM 233 as base band image data memory 31, so the decoded base band image data is supplied to and stored in the RAM 223, and also the base band image data stored in the RAM 223 is used as reference images for decoding. The CPU 221 reads out the base band image data stored in the RAM 223, performs various types of correction such as color correction and size correction, field control for slow playback, and so forth, so that the decoded image will be properly played and output, and outputs the generated output base band image data to the display 229 for display.

That is to say, the CPU 221 uses a predetermined region of the RAM 223 as base band image data memory 31, and the decoded base band image data is stored therein without distinguishing between reference images and output signals, and the base band image data is used as reference images and output signals.

Next, decoding processing 1, which is executed with the player device 61 described with reference to FIG. 4 or the personal computer 201 described with reference to FIGS. 9 and 10, will be described with reference to the flowchart shown in FIG. 11.

In step S41, the stream decoding position detection processing unit 22 (the stream decoding position detection processing unit 22 of the CPU 221) receives input of specification of a play position (Stream No. and Frame No.) from the operation input obtaining unit 21 (the GUI control unit 251 of the CPU 221), and supplies this to the decoding control unit 72 (the decoding control unit 72 of the CPU 221).

In step S42, the decoding control unit 72 (the decoding control unit 72 of the CPU 221) obtains an index table corresponding to the supplied stream No. from the index managing unit 24 (storage device 204, external picture recording/playing device 205, or HDD 226).

In step S43, the decoding control unit 72 (the decoding control unit 72 of the CPU 221) extracts information necessary for decoding, such as picture type, information relating to reference images, data length, address in the memory, etc., from the index table.

In step S44, the decoding control unit 72 (the decoding control unit 72 of the CPU 221) determines the decoding order for playing and output, and the decoder (decoding method), based on user instructions.

Specifically, in the event that low-speed playback is instructed by the user, the decoding control unit 72 (the decoding control unit 72 of the CPU 221) can decode frames regarding which playback has been instructed in order using a high-resolution decoder, so that the latency is the shortest. However, in the event of fast forward or rewinding with a high speed of a certain level having been instructed, the decoding control unit 72 (the decoding control unit 72 of the CPU 221) and decode and output an I picture or P picture nearby the frame instructed for playback, or can decode using a low-resolution decoder, since the number of display frames to be ultimately output cannot be ensured with the method for decoding using a high-resolution decoder to decode the frames to be played in order. Further, in the event of a playback mode at high speed and image quality is not important, an I picture nearby the frame instructed for playback can be decoded and output using a decoder dedicated for I pictures.

In step S45, the decoding control unit 72 (the decoding control unit 72 of the CPU 221) makes reference to the information listed in the index table, and of the forward images necessary for decoding, detects the number of frames (depth) to the frame farthest from the playing frame (Depth of Past frames for Decoding).

In step S46, the decoding control unit 72 (the decoding control unit 72 of the CPU 221) makes reference to the information listed in the index table, and obtains the Frame No. of a frame necessary as a reference image for decoding the frame of the specified Frame No. (in the event that the frame specified as a frame for decoding is not an I picture, at least one frame including the immediately-prior I picture). In the event that playback output of the frame B13 is specified as described with reference to FIG. 7 for example, the decoding control unit 72 (the decoding control unit 72 of the CPU 221) obtains that I2, P5, P8, P11, and P 14 are necessary as reference images, and in the event that playback output of the frame B3 is specified, obtains that I2 and P5 are necessary as reference images.

In step S47, the decoding control unit 72 (the decoding control unit 72 of the CPU 221) makes reference to the base band image data stored in the base band image data memory 31 managed by the base band memory managing unit 73 (makes reference to the base band image data stored in the storage region of the RAM 223 used as the base band image data memory 31), and determines whether or not all necessary reference images exist in the base band image data memory 31 at the necessary image quality.

In the event that determination is made in step S47 that not all necessary reference images exist in the base band image data memory 31 at the necessary image quality, in other words, in the event that determination is made that there is one or more of the necessary reference images not existing in the base band image data memory 31 at the necessary image quality, in step S48 the decoding control unit 72 (the decoding control unit 72 of the CPU 221) decodes the reference images not present in the base band image data memory 31 with a corresponding decoder (decoding method).

That is to say, the decoding control unit 72 (the decoding control unit 72 of the CPU 221) causes the stream supply control unit 74 to read out, from the stream memory 26 via the stream memory 25, compressed images corresponding to the reference images not existing in the base band image data memory 31, causes this to be supplied to the decoding processing unit 76 for decoding, causes this to be supplied to the base band image data memory 31 via the base band image data memory control unit 77, and saved (causes the stream supply control unit 252 of the CPU 221 to read out stream data stored in the storage device 204, external picture recording/playing device 205, or HDD 226, supply to the decoding processing unit 76 for decoding, and supply to the region of the RAM 223 being used as the base band image data memory 31, so as to be saved). The processing then returns to step S47, and the subsequent processing is repeated.

In the event that determination is made in step S47 that all necessary reference images exist in the base band image data memory 31 at the necessary image quality, in step S49 the decoding processing unit 76 (the decoding processing unit 76 of the CPU 221) uses the reference images stored in the base band image data memory 31 (the storage region of the RAM 223 being used as the base band image data memory 31) under the control of the decoding control unit 72, decodes the frames to be played with the corresponding decoder (decoding method), and supplies to the base band image data memory 31 (the storage region of the RAM 223 being used as the base band image data memory 31).

In step S50, the base band signal processing unit 32 (the base band signal processing unit 32 of the CPU 221) obtains the base band image data that has been decoded by the decoding control unit 72 and stored in the base band image data memory 31 (the storage region of the RAM 223 being used as the base band image data memory 31), performs various types of correction (base band processing), outputs the generated output base band image data frames, and displays by the processing of the GUI display control unit 71 (outputs to and displays on the display 229 by the processing of the GUI control unit 251 of the CPU 221), and the processing ends.

With such processing, reference images are generated in scrub playback, so there is no need for redundant decoding of the same frames, and playback frames can be decoded at high speeds.

That is, by controlling the decoding order as described above, at the time of playback from a specified position such as in scrub playback (random playback), or at the time of so-called trick playback, latency of playback can be reduced, and desired frames can be played and output with minimal delay time.

Further, using the same memory for the reference image memory and the output image memory reduces the number of sets of memory in the overall device, and further, the number of times of memory copying for the decoded data to be output can be reduced, thereby reducing latency.

Also, the memory for saving the reference images is independent from the decoder and is controlled by a portion other than the decoder, thereby increasing the degree of freedom of decoding order control, and further enabling switching of the input stream for each frame and switching the decoder for each frame, so various decoding algorithms can be handled.

Also, due to such a configuration, the decoder or decoding method can be selected according to the processing capabilities of the device, and the playing speed and required image quality. For example, an arrangement may be made wherein, normally, high-resolution decoding is performed in the order of playback output, and in the event of handling certain playback output speeds or image quality, low-resolution decoding is performed, or just I picture or P picture decoding is performed without decoding B pictures, and further, decoding only particular picture types such as I picture or the like (intra-frame compression decoding).

Accordingly, optimal decoding algorithms and decoders (decoding methods) can be selected taking into consideration the balance between the image quality and decoding time of the images to be played and output, even with regard to complex playback instructions such as scrub playback, which the player devices according to the related art could not perform keeping up with high-speed playback output, and decoding with no waste and minimal delay time can be realized.

Further, with such a configuration, decoders capable of decoding streams compressed by MPEG for example, and decoders capable of decoding streams compressed by other methods, can be provided, and decoding can be performed by appropriately switching between the decoders.

Also, with arrangements to which the present invention is applied, base band image data decoded by multiple decoders or decoding methods is stored following decoding without distinguishing between reference image data and output data, so information relating to which decoding method the decoded base band image data has been decoded with is managed. The information relating to which decoding method decoding has been performed with is the Decoder Type flag information described with reference to FIG. 8.

For example, in the event that high-resolution decoding is to be performed, such as for low-speed playback or still image display, using base band image data decoded at low resolution as a reference image would lead to deterioration of the image quality, so reference is made to the information relating to which decoding method the base band image data has been decoded with, thereby ensuring that only base band image data decoded at high resolution is used as reference images.

Note that while description has been made primarily with reference to MPEG2 LongGOP including I pictures, P pictures, and B pictures, the present invention is also applicable to reproducing compression-encoded data decoded by interframe reference as well.

Thus, optimal decoding algorithms and decoders (decoding methods) can be selected taking into consideration the balance between the image quality and decoding time of the images to be played and output, such as for scrub playback for example, the decoding method can be selected according to the playing speed and required image quality, wherein for example, low-resolution decoding is performed, or just I picture or P picture decoding is performed without decoding B pictures, and further, decoding only particular picture types such as I picture or the like (intra-frame compression decoding), as necessary, thereby realizing decoding with no waste and minimal delay time.

Further, using the decoding depth information of the index table described with reference to FIG. 6 (Depth of Past frames for Decoding) enables decoding processing with the highest possible image quality and minimal delay time.

Next, a method for using the depth information of the index table (Depth of Past frames for Decoding) in the control of the decoding processing executed by the decoding control unit 72 in FIG. 4 or 10 will be described in detail.

As described above, the depth information of the index table described with reference to FIG. 6 (Depth of Past frames for Decoding) represents the number of times of decoding necessary for obtaining a reference frame on the past side. Only b pictures use future side frames for reference, and the number of future side reference frames of a B picture is one frame. That is to say, in order to obtain the total number of decoding necessary to get all reference frames for a B picture is to add 1 to the number of times of decoding at the past side. Accordingly, all the index table needs to hold is the past decoding depth.

That is to say, there is no need for reference frames at the past side for decoding the head I picture of the GOP, so the depth value is zero. Also, the depth value of each P picture is incremented by 1 each time a P picture comes up from the head of the GOP, and there is no need for reference frames at the past side for decoding the head of the stream or the second B picture for ClosedGOP, so the depth value is zero, while the depth value of the second B picture immediately following an I picture which is not at the head of the stream for OpenGOP is the depth value of the P picture immediately preceding the I picture plus 1, and the depth value of other B pictures is the same as the depth value of the P picture immediately preceding.

The decoding control unit 72 shown in FIGS. 4 and 10 can use the depth information of the index table (Depth of Past frames for Decoding), described with reference to FIG. 6, to control decoding processing.

Figure 12:
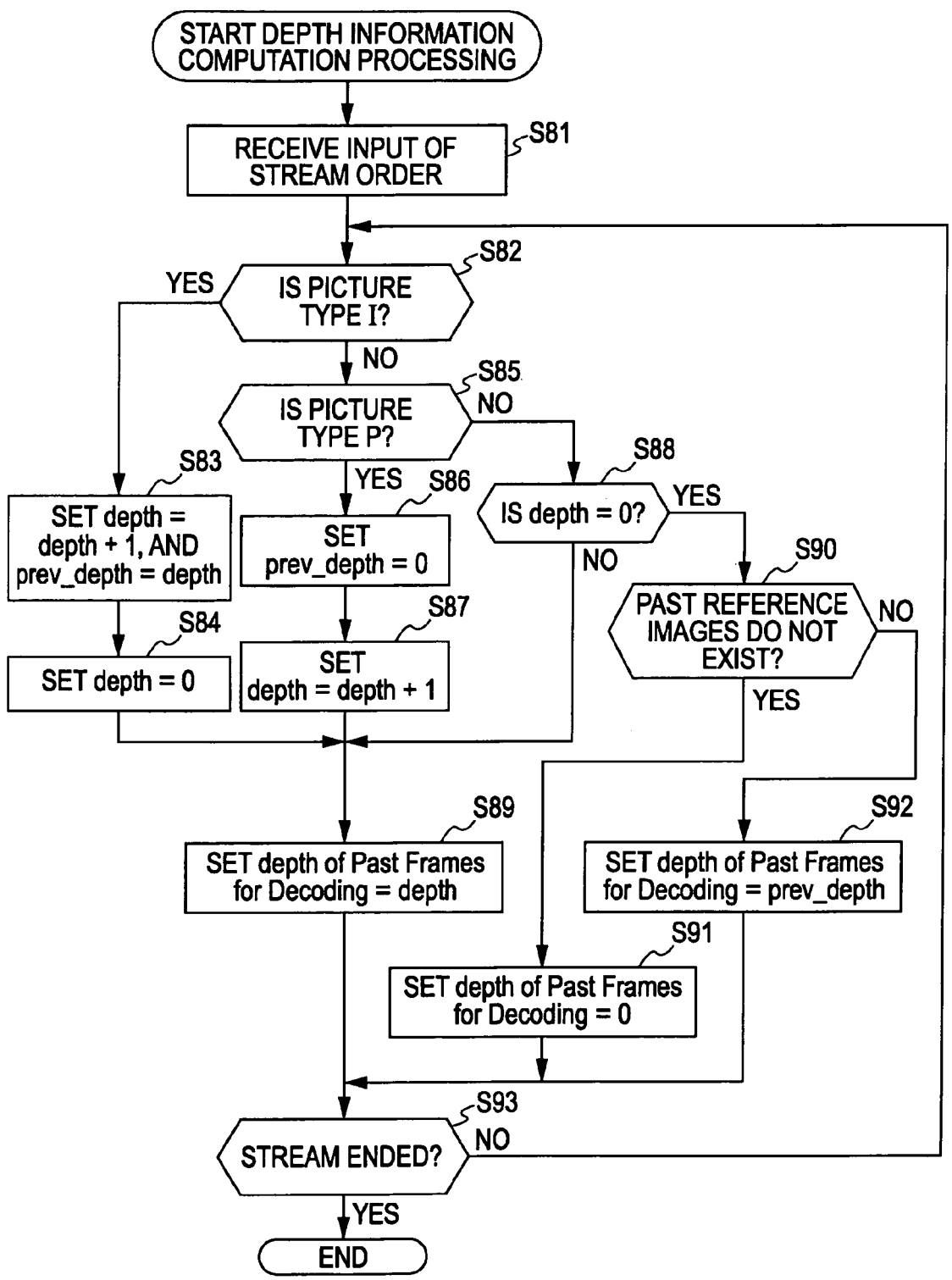
FIG. 12 is a flowchart for describing depth information computation processing.

Next, depth information calculating processing wherein depth information is generated by parsing from the head of the stream will be described with reference to the flowchart shown in FIG. 12.

Note that in the event that the playback processing is to be executed at the player device 61 described with reference to FIG. 4, for example, the depth information calculating processing may be executed at the index managing unit 24 which stores the index table, or may be executed at a device other than the player device 61 (e.g., a general personal computer, specifically, a personal computer 201 or the like including those not having the functions illustrated in the function block diagram described with reference to FIG. 10), with the generated index table being supplied to the player device 61 and stored in the index managing unit 24.

In the event that the playback processing is to be executed at the personal computer 201 described with reference to FIGS. 9 and 10, the depth information calculating processing may be executed at the CPU 221 (however, it should be noted that processing is executed using functions not shown in the function block diagram described with reference to FIG. 10), or may be executed at a device other than the personal computer 201 (e.g., a general personal computer, specifically, a personal computer 201 or the like including those not having the functions illustrated in the function block diagram described with reference to FIG. 10), with the generated index table being supplied to the personal computer 201 and stored in the HDD 226, or the generated index table may be stored in the storage device 204 or an external picture recoding/playing device 205, and supplied to the personal computer 201.

With the flowchart shown in FIG. 12, description will be made that the depth information calculating processing is executed at the CPU 221 of the personal computer 201 (however, it should be noted that processing is executed using functions not shown in the function block diagram described with reference to FIG. 10), however, this may be executed at a device other than the CPU 221 of the personal computer 201, as described above.

In step S81, the CPU 221 of the personal computer 201 receives input of the Stream Order of a stream for generating an index table.

In step S82, the CPU 221 determines whether or not the picture type of the next picture is I. In the event that determination is made in step S82 that the picture type of the next picture is not I, the flow proceeds to the later-described step S85.

In the event that determination is made in step S82 that the picture type of the next picture is I, in step S83 the CPU 221 sets the depth value which is the first counter for calculating the decoding depth such that depth=depth+1, and further sets the value of prev_depth, which is the second counter for calculating the decoding depth, such that prev_depth=depth.

Now, depth, which is the first counter for calculating the decoding depth is a counter used for calculating the decoding depth of P pictures in the GOP and also the second and subsequent B pictures from the head of the GOP. Also, prev_depth which is the second counter for calculating the decoding depth is a counter used for calculating the decoding depth of the second and subsequent B pictures from the head of the GOP.

In step S84, the CPU sets the value of depth, which is the first counter, to depth=0, and the flow proceeds to the later-described step S89.

In the event that determination is made in step S82 that the picture type of the next picture is not I, in step S85 the CPU 221 determines whether or not the picture type of the next picture is P. In the event that determination is made in step S85 that the picture type of the next picture is not P, the flow proceeds to the later-described step S88.

On the other hand, in the event that determination is made in step S85 that the picture type of the next picture is P, in step S86 the CPU 221 resets the value of prev_depth, which is the second counter for calculating the decoding depth, to prev_depth=0.

In step S87, the CPU 221 sets the value of depth, which is the first counter for calculating the decoding depth, such that depth=depth+1, and the flow proceeds to the later-described step S89.

In the event that determination is made in step S85 that the picture type of the next picture is not P, i.e., is a B picture, in step S88 the CPU 221 determines whether or not depth=0, in other words, whether or not the second B picture from the head of the GOP.

Following the processing of step S84 or S87, or in step S88, in the event that determination is made that depth=0 does not hold, in step S89 the CPU 221 sets the value of the decoding depth, Depth of Past Frames for Decoding, to Depth of Past Frames for Decoding=depth, and the flow proceeds to the later-described step S93.

Specifically, In the event that the picture type is I, the value of depth, which is the first counter for calculating the decoding depth, is depth=0 in step S84, so the value of the I picture decoding depth Depth of Past Frames for Decoding is 0, and in the event that the picture type is P, the value of depth, which is the first counter for calculating the decoding depth, is incremented by ones in step S87, so the P picture decoding depths Depth of Past Frames for Decoding are each values obtained by incrementing by one for each P picture from the head (I picture) of the GOP. In the event that the picture type is B but is a B picture other than the two B pictures at the head of the GOP, the value of the decoding depth Depth of Past Frames for Decoding is equal to that of the immediately preceding P picture.

In the event that determination is made in step S88 that depth=0, i.e., in the event that determination is made that the picture is the second B picture from the head of the GOP, in step S90, the CPU 221 determines whether or not past reference images exist for this B picture, in other words, determination is made regarding whether or not this B picture is one of the two B pictures, i.e. the B picture at the head of the stream or the B picture at the head of the ClosedGOP.

In the event that determination is made in step S90 that no past reference images exist, that is, that this B picture is one of the two B pictures, i.e., the B picture at the head of the stream or the B picture at the head of the ClosedGOP, in step S91 the CPU 221 sets the value of decoding depth Depth of Past Frames for Decoding to Depth of Past Frames for Decoding=0, and the flow proceeds to the later-described step S93.

In the event that determination is made in step S90 that a past reference image exists, that is, that this B picture is one of the two B pictures at the head of a GOP other than the head of the stream or the ClosedGOP, in step S92 the CPU 221 sets the value of decoding depth Depth of Past Frames for Decoding to Depth of Past Frames for Decoding=prev_depth, and the flow proceeds to the later-described step S93.

Specifically, the value of prev_depth is reset in step S86, i.e., upon a P picture arriving, and the value of prev_depth is depth+1 in step S83, i.e., upon an I picture arriving, so a B picture which is at the head of the GOP and the head of the stream, or of a GOP which is not the ClosedGOP, is a value obtained by incrementing the Depth of Past Frames for Decoding of the immediately preceding P picture by 1.

Following the processing of steps S89, S91, or S92, in step S93 the CPU 221 determines whether or not the stream has ended. In the event that determination is made in step S93 that the stream has not ended, the flow returns to step S82, and the subsequent processing is repeated. In the event that determination is made in step S93 that the stream has ended, the processing ends.

Due to such processing, the value of the Depth of Past Frames for Decoding is calculated for the index table described with reference to FIG. 6, and is used for decoding processing control.

Next, decoding processing 2, which is executed by the player device 61 described with reference to FIG. 4 or the personal computer 201 described with reference to FIGS. 9 and 10, using the value of the Depth of Past Frames for Decoding calculated by the depth information calculating processing shown in FIG. 12, will be described with reference to the flowchart in FIG. 13.

Figure 11:
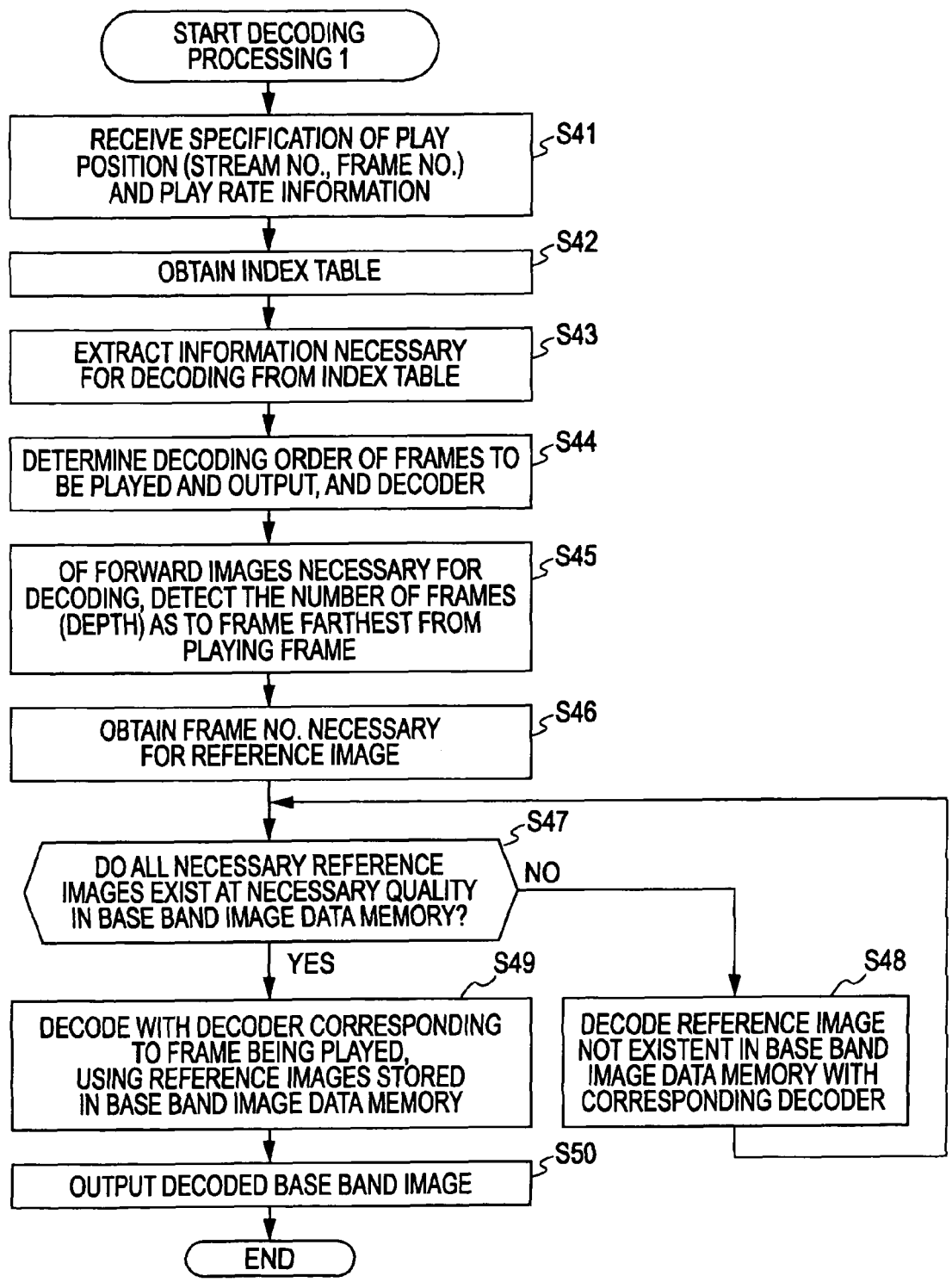
FIG. 11 is a flowchart for describing decoding processing 1.

In steps S121 through S126, processing basically the same as that in steps S41 through S43 in FIG. 11 is executed.

That is to say, the stream decoding position detection processing unit 22 (the stream decoding position detection processing unit 22 of the CPU 221) receives input of specification of a play position (Stream No. and Frame No.) from the operation input obtaining unit 21 (the GUI control unit 251 of the CPU 221), and supplies this to the decoding control unit 72 (the decoding control unit 72 of the CPU 221). The decoding control unit 72 (the decoding control unit 72 of the CPU 221) obtains an index table corresponding to the supplied stream No. from the index managing unit 24 (storage device 204, external picture recording/playing device 205, or HDD 226).

The decoding control unit 72 (the decoding control unit 72 of the CPU 221) extracts information necessary for decoding, such as picture type, information relating to reference images, data length, address in the memory, etc., from the index table, and determines the frame decoding order for playing and output, and the decoder (decoding method), based on user instructions.

Then, the decoding control unit 72 (the decoding control unit 72 of the CPU 221) makes reference to the information listed in the index table, and of the forward images necessary for decoding, detects the number of frames (depth) to the frame farthest from the playing frame (Depth of Past frames for Decoding), makes reference to the information listed in the index table, and obtains the Frame No. of a frame necessary as a reference image for decoding the frame of the specified Frame No. (in the event that the frame specified as a frame for decoding is not an I picture, at least one frame including the immediately-prior I picture).

Then, in step S127, the decoding switchover determining processing, which will be described later with reference to FIG. 14, is executed.

That is to say, in the case of normal playback mode, or in the event of scrub playback but a reference frame already exists in the base band image data memory 31, the subsequent decoding processing can be predicted to be short, so processing using depth information is not performed, and the normal decoding processing (the processing of steps S130 through S133) is performed. On the other hand, in the event of the scrub mode and there are no past reference images, i.e., in the event of random playback and the surrounding frames have not been decoded, the depth information listed in the index table is used to determine whether or not the processing can keep up with normal decoding, and whether to use normal decoding processing (the processing in steps S130 through S133) or substitute processing (the processing in step S129) for the decoding processing is decided.

In step S128, the decoding control unit 72 (the decoding control unit 72 of the CPU 221) determines whether or not executing of substitute display has been decided in the decoding switchover determining processing executed in step S127.

In the event that determination is made in step S128 that executing of substitute display has been decided, in step S129 the decoding control unit 72 (the decoding control unit 72 of the CPU 221) executes substitute display using low-resolution images or nearby images, and the processing ends.

Specifically, as for methods for substitution, for example, just I picture or P picture decoding is performed without decoding B pictures, or decoding is performed only for particular picture types such as I picture or the like (intra-frame compression decoding), or low resolution decoding is performed for the purpose of high-speed processing of the decoding itself, etc., as necessary, so optimal decoding algorithms and decoders (decoding methods) can be selected taking into consideration the balance between the image quality and decoding time of the images to be played and output.

Further, as another substituting method, P pictures and B pictures, or at least one frame of P pictures, temporarily decoded and re-encoded into an I picture, may be prepared separately as a proxy file, with this I picture image being displayed. Details of the proxy file will be described later.

In the event that determination is made in step S128 that not executing substitute display has been decided, processing basically the same as that in steps S47 through S50 in FIG. 11 is executed in steps S130 through S133.

That is to say, the decoding control unit 72 (the decoding control unit 72 of the CPU 221) makes reference to the base band image data stored in the base band image data memory 31 managed by the base band memory managing unit 73 (makes reference to the bas band image data stored in the storage region of the RAM 223 used as the base band image data memory 31), and determines whether or not all necessary reference images exist in the base band image data memory 31 at the necessary image quality.

In the event that determination is made that not all necessary reference images exist in the base band image data memory 31 at the necessary image quality, in other words, in the event that determination is made that there is one or more of the necessary reference images not existing in the base band image data memory 31 at the necessary image quality, the decoding control unit 72 (the decoding control unit 72 of the CPU 221) decodes the reference images not present in the base band image data memory 31 with a corresponding decoder (decoding method), the flow returns to step S130, and the subsequent processing is repeated.

In the event that determination is made that all necessary reference images exist in the base band image data memory 31 at the necessary image quality, the decoding processing unit 76 (the decoding processing unit 76 of the CPU 221) uses the reference images stored in the base band image data memory 31 (the storage region of the RAM 223 being used as the base band image data memory 31) under the control of the decoding control unit 72, decodes the frames to be played with the corresponding decoder (decoding method), and supplies to the base band image data memory 31 (the storage region of the RAM 223 being used as the base band image data memory 31).

The base band signal processing unit 32 (the base band signal processing unit 32 of the CPU 221) then obtains the base band image data that has been decoded by the decoding control unit 72 and stored in the base band image data memory 31 (the storage region of the RAM 223 being used as the base band image data memory 31), performs various types of correction (base band processing), outputs the generated output base band image data frames, and displays by the processing of the GUI display control unit 71 (outputs to and displays on the display 229 by the processing of the GUI control unit 251 of the CPU 221), and the processing ends.

Due to such processing, reference images are generated in scrub playback, so there is no need for redundant decoding of the same frames, and playback frames can be decoded at high speeds. Further, due to the later-described decoding switchover processing, in the event of the scrub mode with no past reference images for example, i.e., in the event of random playback and the surrounding frames have not been decoded or the like, the depth information listed in the index table is used to determine whether or not the processing can keep up with normal decoding, and whether to switch over the decoding to use substitute processing for the decoding processing is decided, and substitute display is performed as necessary.

That is, by controlling the decoding order as described above, at the time of playback from a specified position such as in scrub playback (random playback), or at the time of so-called trick playback, not only can latency of playback be reduced, and desired frames be played and output with minimal delay time, in cases wherein normal decoding cannot keep up, the decoding is switched over and substitute display is performed.

Next, the decoding switchover determining processing which is executed in step S127 in FIG. 13, will be described with reference to the flowchart shown in FIG. 14.

In step S161, the decoding control unit 72 (the decoding control unit 72 of the CPU 221) determines whether or not the current playback mode is the scrub mode. In the event that the current playback mode is determined not to be the scrub mode in step S161, the flow proceeds to the later-described step S170.

In the event that the current playback mode is determined to be the scrub mode in step S161, in step S162 the decoding control unit 72 (the decoding control unit 72 of the CPU 221) determines whether or not past reference frames exist in the base band image data memory 31. In the event that past reference frames are determined to exist in the base band image data memory 31, the flow proceeds to the later-described step S170.

In the event that past reference frames are determined to not exist, in step S163 the decoding control unit 72 (the decoding control unit 72 of the CPU 221) determines whether the number of decodable frames have been determined beforehand, or whether calculation of the number of decodable frames is necessary based on setting conditions such as whether specified from a higher order application.

Specifically, the number of decodable frames may be set beforehand (with the number of frames directly instructed) for example, or may be specified by a higher order application. For example, the number of decodable frames may be set according to the number of decoders used for decoding processing or CPUs or according to the clock frequency. In such cases, there is no need for calculation of the number of decodable frames, and all that is necessary is to obtain the specified number of decodable frames.

Conversely, in the event that only the time distribution T which can be given for decoding processing is specified from a higher order application for example, there is need to calculate the number of decodable frames.

Figure 15:
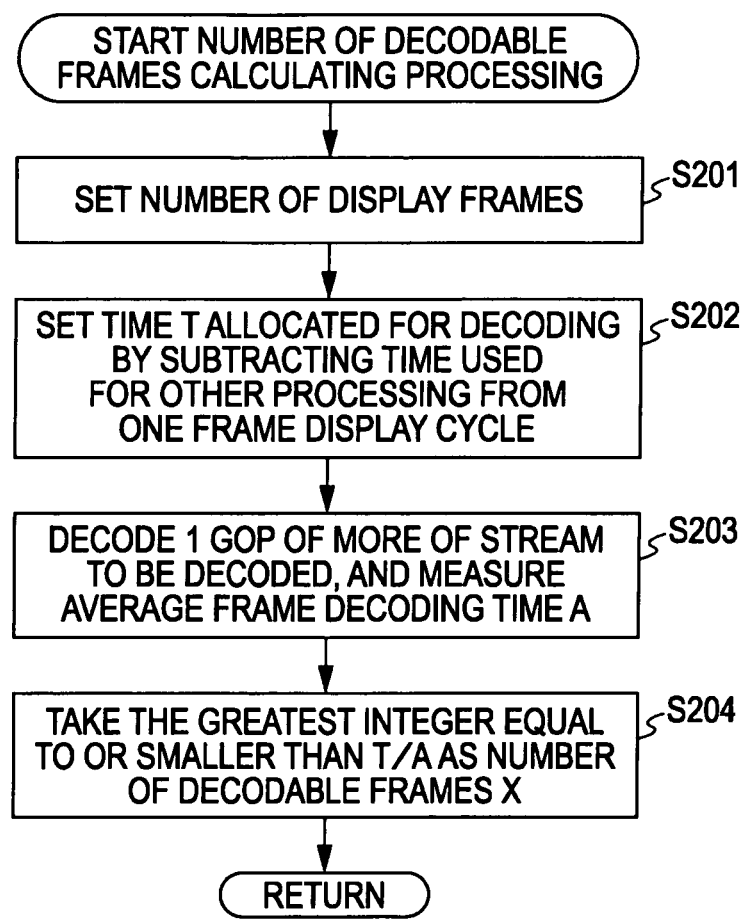
FIG. 15 is a flowchart for describing decodable frame number calculating processing.

In the event that determination is made in step S163 that there is the need to calculate the number of decodable frames, the number of decodable frames calculating processing described later with reference to FIG. 15 is executed in step S164.

In the event that determination is made in step S163 that there is no need to calculate the number of decodable frames, in step S165 the decoding control unit 72 (the decoding control unit 72 of the CPU 221) obtains the number of decodable frames specified by a higher order application or set beforehand.

Following the processing of step S164 or step S165, in step S166 the decoding control unit 72 (the decoding control unit 72 of the CPU 221) determines whether or not the frame to be processed is a B picture.

In the event that determination is made in step S166 that the frame to be processed is a B picture, in step S167 the decoding control unit 72 (the decoding control unit 72 of the CPU 221) makes reference to the depth information of the index table (value of Depth of Past Frames for Decoding), and determines whether or not number of past reference frames (depth)+2>number of decodable frames holds. Note that this number of past reference frames (depth)+2 is the number of times of decoding that is necessary for decoding the relevant B picture. Specifically, the number of times of decoding necessary for decoding the relevant B picture is the total of the number of frames of past reference images (value of Depth of Past Frames for Decoding), the one future side (frames temporally later) reference frame, and another one time for decoding itself.

In the event that determination is made in step S167 that number of past reference frames (depth)+2>number of decodable frames holds, the flow proceeds to the later-described step S169, while otherwise, i.e., in the event that determination is made in step S167 that number of past reference frames (depth)+2>number of decodable frames does not hold, the flow proceeds to the later-described step S170.

In the event that determination is made in step S166 that the frame to be processed is not a B picture, in step S168 the decoding control unit 72 (the decoding control unit 72 of the CPU 221) makes reference to the depth information of the index table (value of Depth of Past Frames for Decoding), and determines whether or not number of past reference frames (depth)+1>number of decodable frames holds. Note that this number of past reference frames (depth)+1 is the number of times of decoding that is necessary for decoding a relevant P picture or I picture in the event that no reference image frames exist at all. Specifically, the number of times of decoding necessary for decoding relevant P picture or I picture is the total of the number of frames (Depth of Past Frames for Decoding) of past reference images plus one time for decoding itself. The number of past reference frames (depth) for an I picture is zero, so the number of times of decoding necessary for decoding an I picture is always once.

In the event that determination is made in step S168 that number of past reference frames (depth)+1>number of decodable frames holds, the flow proceeds to the later-described step S169, while otherwise, i.e., in the event that determination is made in step S168 that number of past reference frames (depth)+1>number of decodable frames does not hold, the flow proceeds to the later-described step S170.

Figure 13:
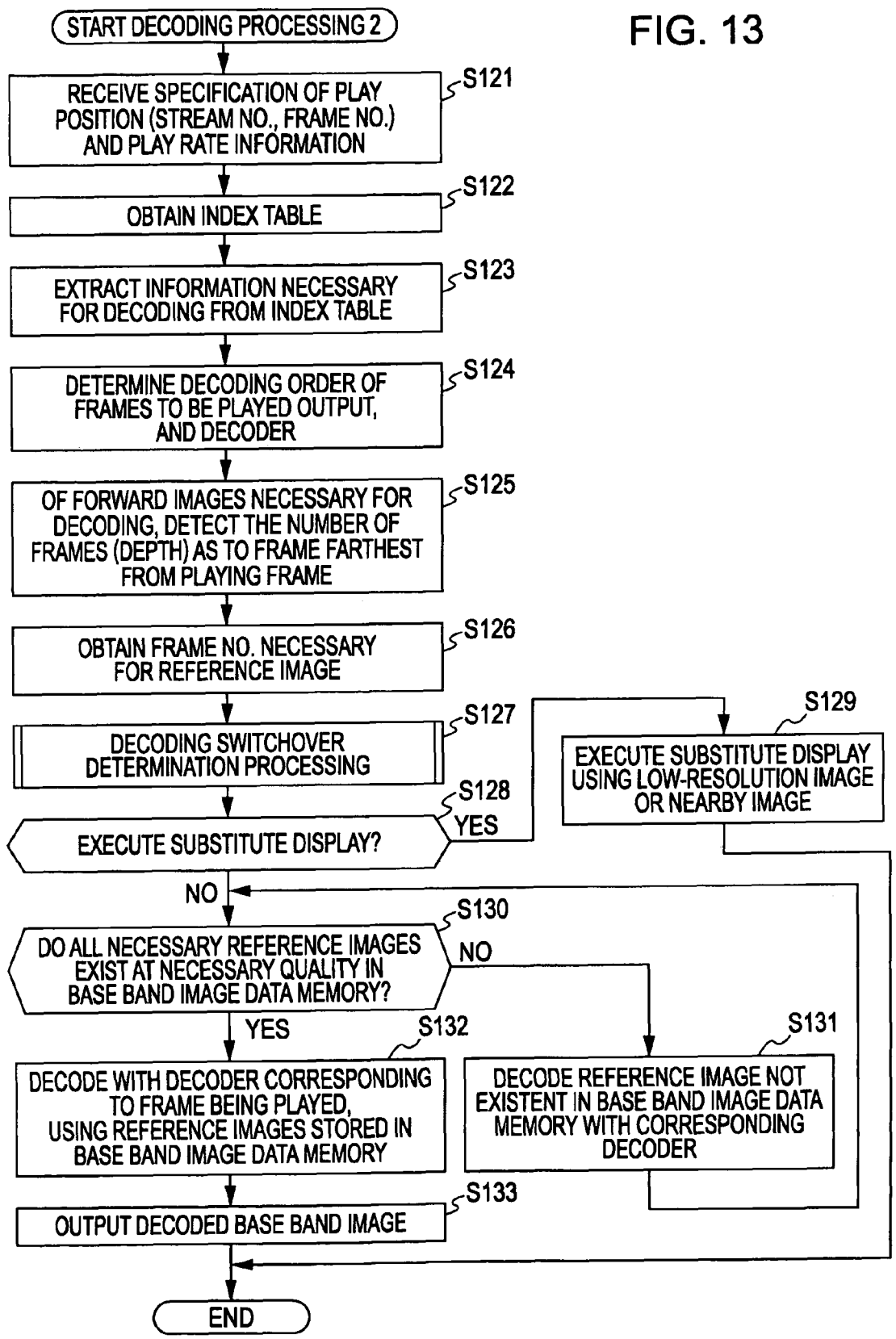
FIG. 13 is a flowchart for describing decoding processing 2.

In the event that determination is made in step S167 that number of past reference frames (depth)+2>number of decodable frames holds, or in step S168 that number of past reference frames (depth)+1>number of decodable frames holds, in step S169 the decoding control unit 72 (the decoding control unit 72 of the CPU 221) decides on performing substitute display, and the flow returns to step S127 in FIG. 13 and proceeds to step S128.

Now in addition to the above-described examples of substitute display, such as just I picture or P picture decoding being performed without decoding B pictures, or decoding being performed only for particular picture types such as I picture or the like (intra-frame compression decoding), or low resolution decoding being performed for the purpose of high-speed processing of the decoding itself, etc., as another substituting method, P pictures and B pictures, or at least one frame of P pictures, temporarily decoded and re-encoded into an I picture, may be prepared separately as a proxy file, with this I picture image being displayed, thereby enabling high-speed display of desired images in comparison with cases wherein substitute display is not performed. Details of the proxy file will be described later. Further, with other display methods as well, arrangements should be made such that optimal decoding algorithms and decoders (decoding methods) can be selected as necessary, taking into consideration the balance between the image quality and decoding time of the images to be played and output.

In the event that determination is made in step S167 that number of past reference frames (depth)+2>number of decodable frames does not hold, or in step S168 that number of past reference frames (depth)+1>number of decodable frames does not hold, in step S170 the decoding control unit 72 (the decoding control unit 72 of the CPU 221) decides that substitute display will not be performed, and the flow returns to step S127 in FIG. 13 and proceeds to step S128.

Due to such processing, determination is made regarding whether or not the processing can keep up with normal decoding, using the depth information listed in the index table, so whether or not to switchover decoding and perform substitute display is determined, and substitute display is performed as necessary.

Next, the number of decodable frames calculating processing executed in step S164 in FIG. 14 will be described with reference to the flowchart in FIG. 15.

In step S201, the decoding control unit 72 (the decoding control unit 72 of the CPU 221) sets the number of display frames per unit time, such as 30 frames per second, 15 frames per second, or the like.

In step S202, the decoding control unit 72 (the decoding control unit 72 of the CPU 221) sets the time T given for decoding processing for one frame by subtracting the time used for other processing from one frame display cycle.

Specifically, in the event that 13 ms are used per frame for processing other than decoding for example, in the case that 30 frames are to be displayed per second, 1/30=33 ms and 33−13=20 ms, so 20 ms is set as the time T given for decoding processing for one frame, and in the case that 15 frames are to be displayed per second, 1/15=66 ms and 66−13=53 ms, so 53 ms is set as the time T given for decoding processing for one frame.

In step S203, the decoding control unit 72 (the decoding control unit 72 of the CPU 221) decodes 1 GOP or more of the stream to be decoded, and measures the average decoding time A per frame.

In step S204, the decoding control unit 72 (the decoding control unit 72 of the CPU 221) computes T/A, takes the largest integer equal to or under T/A to be the number of decodable frames X, and the flow returns to step S164 in FIG. 14 and proceeds to step S166.

Due to such processing, the number of decodable frames X is calculated, and due to comparison being performed against the depth information listed in the index table, determination is made regarding whether the processing can keep up with normal decoding, so determination is made regarding whether to switchover the decoding to perform substitute display, and if necessary, substitute display is performed.

Thus, applying the present invention enables whether or not to perform decoding switchover, using the depth information. That is to say, in the case of normal playback mode, or in the event of scrub playback mode but a decoded reference frame already exists in the base band image data memory 31, the subsequent decoding processing can be predicted to be short, so processing using depth information is not performed, and the normal decoding processing is performed. On the other hand, in the event of the scrub mode and there are no past reference images, i.e., in the event of random playback and the surrounding frames have not been decoded, the number of decodable frames X is calculated or obtained and compared with the depth information listed in the index table, to determine whether or not the processing can keep up with normal decoding, thereby determining whether or not to perform decoding switchover.

The number of decodable frames may be such that the number of frames is specified, or such that the maximum value for decoding time is specified and the number of frames is calculated based thereupon. In the case of the number of frames being specified, a higher order application may directly specify the maximum number of decoding frames, or determination may be made based on a combination of multiple factoring parameters, such as the processing capability of the CPU or the like (information such as number or processing clock speed, from which the processing speed can be estimated), e.g., such as saying that in the case of a 3.6 GHz Dual Core CPU, the number of decodable frames is 5 frames, but in the case of a 2 GHz Single Core CPU, the number of decodable frames is 2 frames. On the other hand, in the event that time is specified, the value of T/A is calculated from the amount of time T which the application gives for decoding time and the average decoding time per frame A, thereby calculating the decodable number of frames.

Also, the number of decodable frames can be advantageously used with substitute display for example, in cases wherein decoding is executed using nearby I pictures and P pictures, or only using I pictures. That is to say, the number of decodable frames can be used for restricting the objects of substitution at the time of selecting nearby frames for decoding processing. For example, in the event that the number of decodable frames is 4, and there are 15 frames in 1 GOP (B0, B1, I2, B3, B4, P5, B6, B7, P8, B9, and so on through P14), I2, P5, P8, and P11 are decoded, and P14 is excluded from decoding even though a P picture, thereby enabling high-speed decoding processing such as in scrub playback or the like.

Thus, by applying the present invention, even with special playback such as scrub playback, the decoding method can be automatically switched over depending on the difficulty of decoding, so frames at the later half of the GOP can be displayed suitably. Also, the decoding method can be flexibly switched over according to decoder capabilities, and high scrub display capabilities can be maintained even when using a low-performance decoder.

Also, in the case of executing substitute display, in addition to the above-described examples of substitute display, such as just I picture or P picture decoding being performed without decoding B pictures, or decoding being performed only for particular picture types such as I picture or the like (intra-frame compression decoding), or low resolution decoding being performed for the purpose of high-speed processing of the decoding itself, etc., as another substituting method, P pictures and B pictures, or at least one frame of P pictures, temporarily decoded and re-encoded into an I picture, may be prepared separately as a proxy file, with this I picture image being displayed, with optimal decoding algorithms and decoders (decoding methods) being selected as necessary, taking into consideration the balance between the image quality and decoding time of the images to be played and output.

Next, the proxy file mentioned above as an example of substitute display will be described. A proxy file may be generated by the player device 61 or the personal computer 201, or may be generated by a converting device 311 configured independently from these devices.

The converting device 311 receives supply of a bit stream encoded by inter-frame reference encoding such as MPEG2 LongGOP stream, for example, I pictures (intra-frame encoded frames), P pictures (forward prediction encoded frames), and B pictures (both-way prediction encoded frames), encodes the P pictures of the supplied bit stream for conversion into I pictures, and accordingly can generate a proxy file used in the case of executing substitute display in step S129 shown in FIG. 13.

Figure 16:
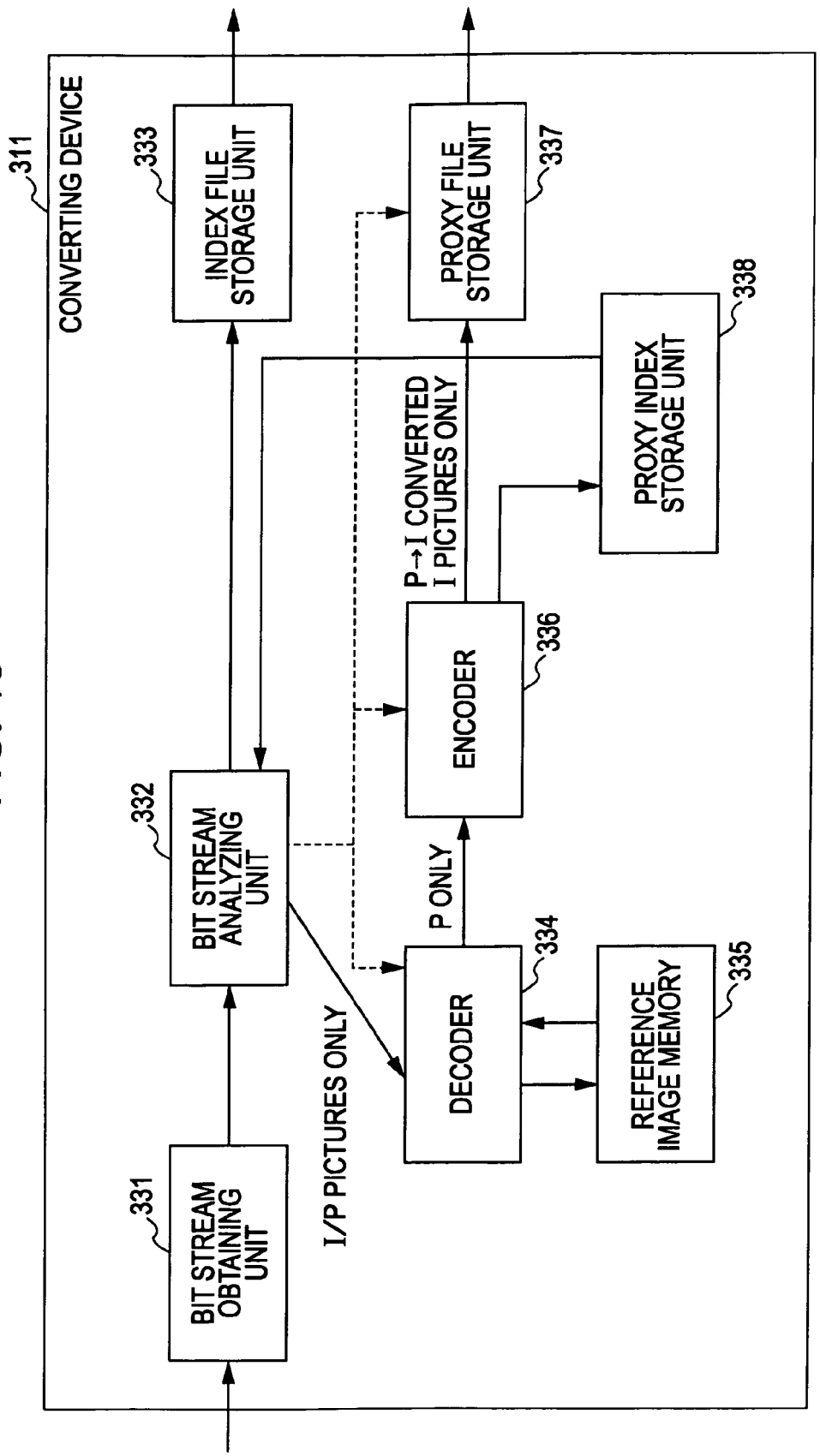
FIG. 16 is a block diagram illustrating the configuration of a converting device.

FIG. 16 is a block diagram illustrating a configuration example of the converting device 311. A bit stream obtaining unit 331 receives supply of a bit stream including I pictures, P pictures, and B pictures, and supplies this to a bit stream analyzing unit 332.

The bit stream analyzing unit 332 receives supply of the bit stream including I pictures, P pictures, and B pictures, and of these, supplies the I pictures and P pictures to a decoder 334. Also, the bit stream analyzing unit 332 controls the decoder 334, an encoder 336, and a proxy file storage unit 337.

The bit stream analyzing unit 332 may further analyze the supplied bit stream, analyze the results of processing executed by the encoder 336, generate the index file described with reference to FIG. 6, and supply this to the index file storage unit 333.

Figure 17:
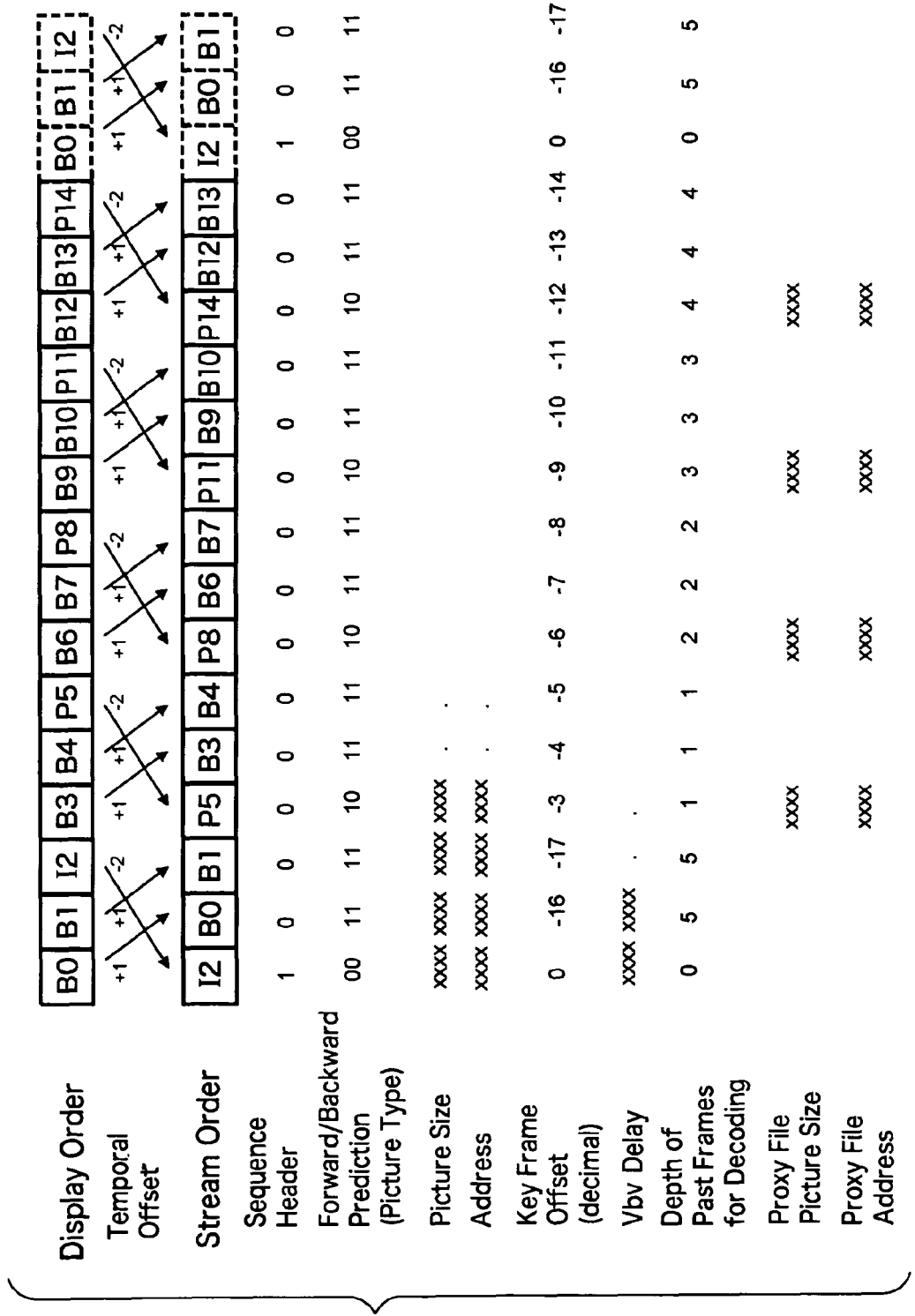
FIG. 17 is a diagram for describing an index file.

Further, in addition to the information described with reference to FIG. 6, the index file preferably includes picture size (Proxy File Picture Size) and the addresses of these frames (Proxy File Address), as encoding information relating to I pictures in the proxy file which are frames corresponding to the P pictures in the original stream but have been encoded by the encoder 336, as shown in FIG. 17 for example, based on the information stored in a later-described proxy index storage unit 338. This information is stored in the later-described proxy index storage unit 338 by the encoder 336.

The index file storage unit 333 stores the index file, described with reference to FIG. 17, supplied from the bit stream analyzing unit 332.

The decoder 334 decodes the I pictures and P pictures supplied from the bit stream analyzing unit 332, generates uncompressed base band images, and supplies the uncompressed base band image data corresponding to the P pictures to the encoder 336. At this time, in the event that the uncompressed base band images generated are going to become necessary as reference images of frames to be decoded later, the decoder 334 also supplies the generated uncompressed base band images to reference image memory 335 for storage, and in the event of decoding P pictures, makes reference to the reference images stored in the reference image memory 335 as necessary.

The encoder 336 encodes the uncompressed base band image data corresponding to the supplied P pictures as I pictures using intra-frame encoding, and supplies the generated I pictures to the proxy file storage unit 337. Also, the encoder 336 can set the compression rate and so forth, for example as parameters for compression processing (I picture generating).

Figure 18:
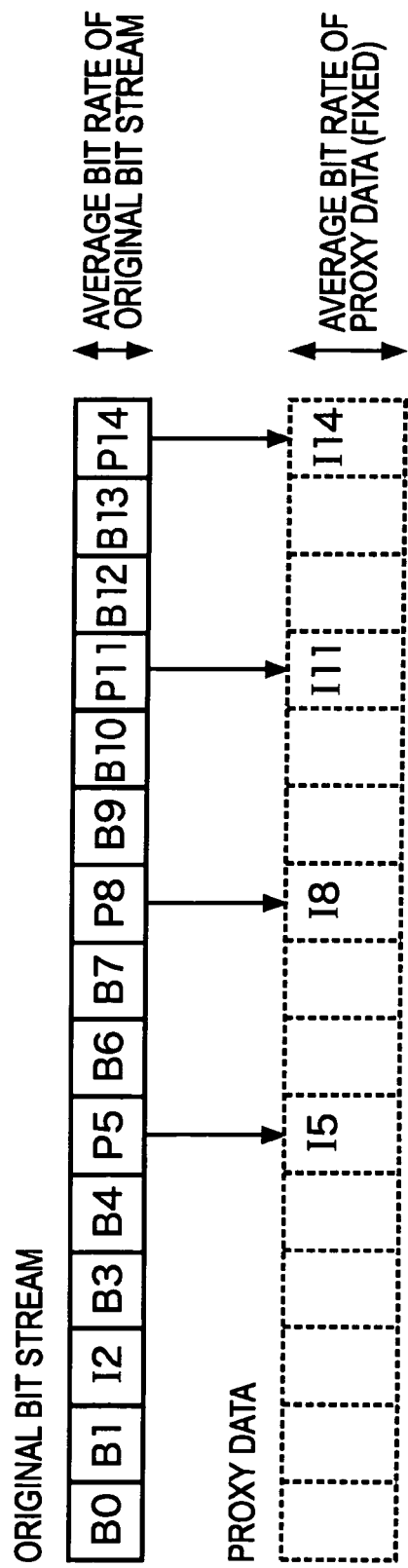
FIG. 18 is a diagram for describing a case wherein the bit range of an I picture is fixed.

Next, a case of fixing the bit rate for I pictures output from the encoder 336 will be described with reference to FIG. 18.

In the event of the encoder 336 fixing the bit rate of output I pictures, the I pictures are generated such that the bit rate is a predetermined bit rate corresponding to the storage capacity of the proxy file storage unit 337, for example. Generally, P pictures using forward reference have less information than I pictures, so image quality is more readily maintained by arranging for the bit rate of recompressing P pictures and encoding into I pictures to be a greater bit rate than the pre-conversion (P picture) bit rate, which is advantageous. Also, an arrangement may be made wherein this bit rate is settable by the user.

Figure 19:
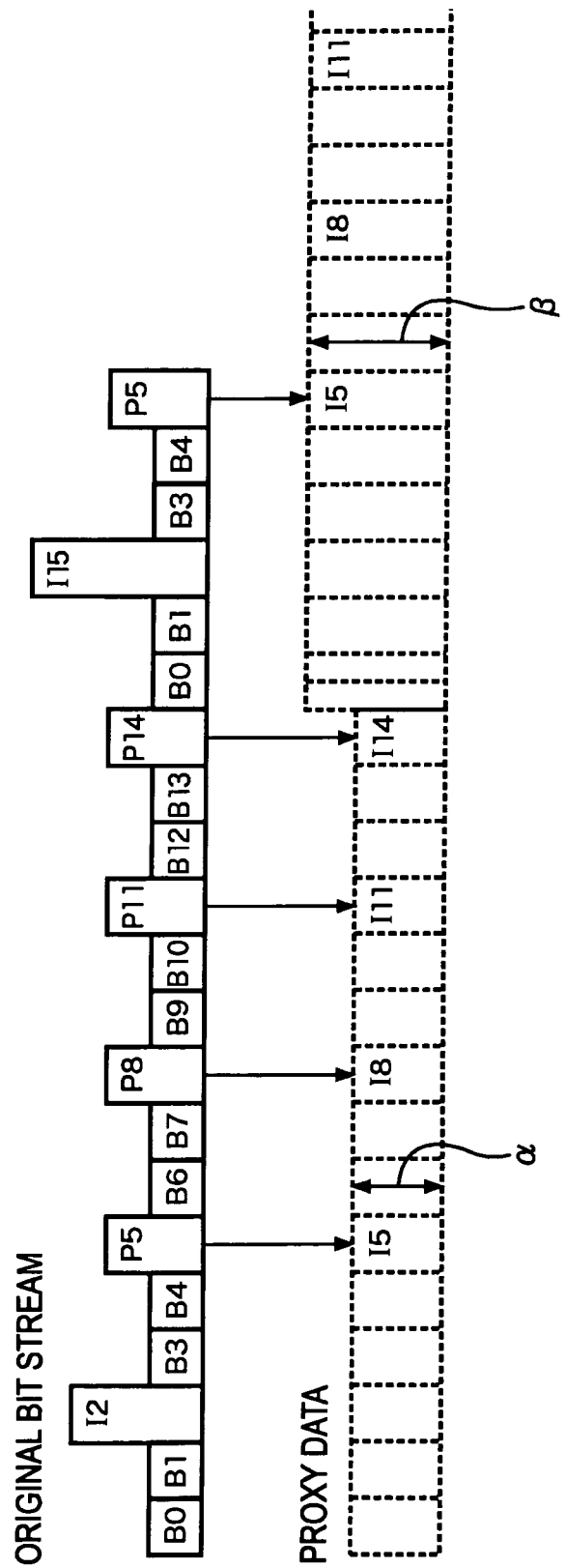
FIG. 19 is a diagram for describing a case wherein the bit range of an I picture is variable.

Next, a case of a variable bit rate for I pictures output from the encoder 336 will be descried with reference to FIG. 19.

The encoder 336 obtains the rate of the I pictures (the head I picture in each GOP) in the original bit stream from the bit stream analyzing unit 332 or the decoder 334, and generates I pictures so as to have a bit rate matching that value. Generally, the bit rate of I pictures in an original compressed stream reflect the complexity in the picture of that GOP. Accordingly, image quality deterioration can be prevented by varying the bit rate of the I pictures generated by conversion from P pictures, corresponding to the bit rate of the head I pictures reflecting the complexity of the picture in the GOP.

The proxy file storage unit 337 then generates and stores a proxy file (i.e., a representation data file), based on the I picture data supplied from the encoder 336 and generated as described with reference to FIGS. 18 and 19 and supplied from the encoder 336.

The proxy index storage unit 338 obtains from the encoder 336 picture size (Proxy File Picture Size) and the addresses of these frames (Proxy File Address), as encoding information relating to the generated I picture each time uncompressed base band image data corresponding to a supplied P picture is encoded with the intra-frame encoding as an I picture and an I picture is generated, as a proxy index, in the form of a proxy index, which is stored and also supplied to the bit stream analyzing unit 332.

Next, a case of decoding P pictures in an original bit stream will be described, with reference to FIGS. 20A and 20B. For example, in the event of playback output for the frame P11 in an MPEG2 LongGOP bit stream, an arrangement according to the related art required that the frame 12 which is the head I picture of the GOP in which P 11 is included is decoded, following which the frames P5 and P8 are decoded and reference frame image data is generated, and finally the target frame P11 can be decoded, as shown in FIG. 20A.

Conversely, with a case of playback output of the frame P11 using a proxy file, the frame I11 which is the I picture subjected to intra-frame compression corresponding to the frame P11 is extracted from the proxy file and decoded, and playback output is performed, as shown in FIG. 20B.

Accordingly, in the event of using the proxy file to play and output the frame P11 again using the proxy file, decoding needs to be performed only once, as compared with the four times with the related art, so the specified frame can be played and output at high speed.

Next, a case of decoding B pictures in an original bit stream will be described, with reference to FIGS. 21A and 21B.

For example, in the event of playback output for the frame B12 in an MPEG2 LongGOP bit stream, an arrangement according to the related art required that the frame 12 which is the head I picture of the GOP in which B12 is included is decoded, following which the frames P5, P8, P11, and P14 are decoded and reference frame image data is generated, and finally the target frame B12 can be decoded, as shown in FIG. 21A.

Conversely, with a case of playback output of the frame B12 using a proxy file, as shown in FIG. 21B, the frames I11 and I14 which are the I pictures subjected to intra-frame compression corresponding to the frames P11 and P14 necessary as reference images for the frame B12 are decoded, these are used as reference images to decode the target B12 for playback output.

Accordingly, in the event of using the proxy file to output the frame B12 again using the proxy file, decoding needs to be performed only three times, as compared with the six times with the related art, so the specified frame can be played and output at high speed.

The above-describe series of processing can be executed by hardware, or can be executed by software. In this case, functions the same as those of the converting device 311 for example can be realized with the personal computer 201 described with reference to FIG. 9.

Figure 22:
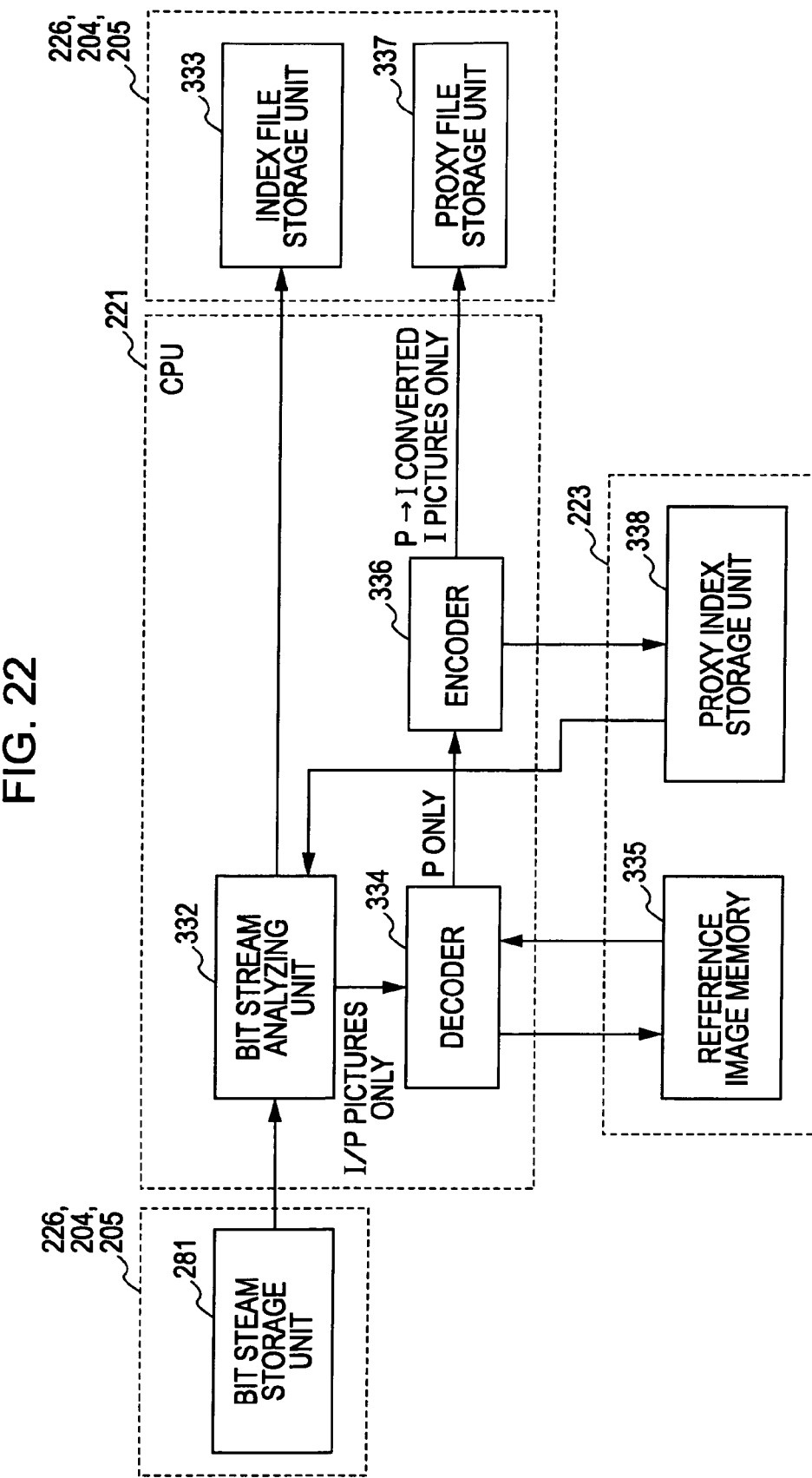
FIG. 22 is a function block diagram for describing functions realized by the personal computer shown in FIG. 9.

FIG. 22 is a functional block diagram for describing an example of the functions in a case wherein functions the same as those of the converting device 311 are realized with software in the personal computer 201 described with reference to FIG. 9. Note that in FIG. 22, components which are the same as or equivalent to those in FIG. 9 or 16 are denoted with the same reference numerals, and description thereof is omitted as appropriate.

Due to the CPU 221 executing predetermined programs, the personal computer 201 has functions the same as those of the bit stream analyzing unit 332, decoder 334, and encoder 336, shown in FIG. 16.

Based on user operations input from an input device such as the mouse 202 or keyboard 203 or the like, the CPU 221 decodes the I pictures and P pictures in a but stream recorded in a bit stream storage unit 281 corresponding to one of the regions of the storage device 204, external picture recording/playing device 205, or HDD 226, using the region of the RAM 223 corresponding to the reference image memory 335, and encodes only the P pictures as I pictures, thereby generating a proxy file, which is stored in a proxy file storage unit 337 corresponding to one of the regions of the storage device 204, external picture recording/playing device 205, or HDD 226.

Further, each time uncompressed base band image data corresponding to a P picture is encoded as an I picture by intra-frame encoding to generate an I picture, the CPU 221 saves the picture size (Proxy File Picture Size) and the addresses of these frames (Proxy File Address), as encoding information relating to the generated I picture, in the region of the RAM 223 corresponding to the proxy index storage unit 338 as a proxy index, and further analyzes the bit stream and generates an index file by obtaining the proxy index saved in the proxy index storage unit 338 to be stored in the index file storage unit 333 corresponding to one of the regions of the storage device 204, external picture recording/playing device 205, or HDD 226.

The decoding control unit 72 of the player device 61 obtains the index file stored in the index file storage unit 333 corresponding to one of the regions of the storage device 204, external picture recording/playing device 205, or HDD 226, via a predetermined transfer medium. Also, when executing substitute display in step S129 shown in FIG. 13 using a proxy file, the decoding control unit 72 or decoding processing unit 76 obtains the proxy file stored in the proxy file storage unit 337 corresponding to one of the regions of the storage device 204, external picture recording/playing device 205, or HDD 226, via a predetermined transfer medium, and thereby executes decoding processing.

Also, note that in the event that the personal computer 201 described with reference to FIG. 9 for example further has functions for executing the decoding processing described with reference to FIG. 10 in addition to the functions shown in FIG. 22, the decoding control unit 72 of the personal computer 201 shown in FIG. 10 obtains the index file stored in the index file storage unit 333 corresponding to one of the regions of the storage device 204, external picture recording/playing device 205, or HDD 226. Also, when executing substitute display in step S129 shown in FIG. 13 using a proxy file, the decoding control unit 72 or decoding processing unit 76 obtains the proxy file stored in the proxy file storage unit 337 corresponding to one of the regions of the storage device 204, external picture recording/playing device 205, or HDD 226, thereby executing decoding processing.

Next, the proxy file generating processing 1 executed by the converting device 331 described with reference to FIG. 16 or at the CPU 221 of the personal computer described with reference to FIGS. 9 and 22, will be described with reference to the flowchart shown in FIG. 23.

In step S221, the bit stream obtaining unit 331 (CPU 221) obtains the original bit stream, and supplies this to the bit stream analyzing unit 332 (the bit stream analyzing unit 332 of the CPU 221).

In step S222, the bit stream analyzing unit 332 (the bit stream analyzing unit 332 of the CPU 221) reads in the I pictures from the supplied original bit stream.

In step S223, the bit stream analyzing unit 332 (the bit stream analyzing unit 332 of the CPU 221) analyzes the read in picture. That is to say, the bit stream analyzing unit 332 obtains the information of the relevant picture in the index file described with reference to FIG. 17.

In step S224, the bit stream analyzing unit 332 (the bit stream analyzing unit 332 of the CPU 221) determines whether or not the picture read in is an I picture or P picture. In the event that determination is made in step S224 that the picture is neither an I picture nor a P picture, i.e., is a B picture, the processing proceeds to the later-described step S230.

In the event that determination is made in step S224 that the picture is one of an I picture or a P picture in step S225, the bit stream analyzing unit 332 (the bit stream analyzing unit 332 of the CPU 221) supplies the read I picture or P picture to the decoder 334. The decoder 334 decodes the supplied I picture or P picture, and stores this in reference image memory 335.

In step S226, the decoder 334 (the decoder 334 of the CPU 221) determines whether or not the decoded picture is a P picture. In the event that determination is made in step S226 that the decoded picture is not a P picture, i.e., is an I picture, the processing proceeds to the later-described step S230.

In the event that determination is made in step S226 that the decoded picture is a P picture, in step S227 the decoder 334 (the decoder 334 of the CPU 221) supplies an uncompressed image frame corresponding to the decoded P picture to the encoder 336 (the encoder 336 of the CPU 221). The encoder 336 encodes the supplied uncompressed image frame as an I picture, and supplies to the proxy file storage unit 337 (a proxy file storage unit 337 corresponding to a region of one of the storage device 204, external picture recording/playing device 205, or HDD 226).

In step S228, the proxy file storage unit 337 (proxy file storage unit 337 corresponding to a region of one of the storage device 204, external picture recording/playing device 205, or HDD 226) stores the proxy file configured of the encoded and generated I picture.

In step S229, the encoder 336 supplies the index information of the picture size (Proxy File Picture Size) and the addresses of these frames (Proxy File Address), as encoding information relating to the generated I picture, i.e., a proxy index, to the proxy index storage unit 338. The proxy index storage unit 338 stores the proxy index of the relevant picture.

In the event that determination is made in step S224 that the picture read in is neither an I picture nor a P picture, i.e., is a B picture, or in the event that determination is made in step S226 that the decoded picture is not a P picture, i.e., is an I picture, or following processing of step S229 ending, in step S230 the bet stream analyzing unit 332 (CPU 221) determines whether or not processing of all pictures has ended. In the event that determination is made in step S230 that processing of all pictures has not ended, the flow returns to step S222, and the subsequent processing is repeated.

In the event that determination is made in step S230 that processing of all pictures has ended, the bit stream analyzing unit 332 (the bit stream analyzing unit 332 of the CPU 221) generates the index file described with reference to FIG. 17, based on the analysis results of each of the pictures, and the frames encoded as I pictures by the encoder 336 that are stored in the proxy index storage unit 338, i.e., the picture size (Proxy File Picture Size) and addresses (Proxy File Address) of the frames converted from P pictures into I pictures, supplies this to the index file storage unit 333 (index file storage unit 333 corresponding to a region of one of the storage device 204, external picture recording/playing device 205, or HDD 226) for storage, and the processing ends. Due to such processing, a proxy file of I pictures generated by P pictures in the original bit stream being decoded and then encoded as I pictures, and an index file listing information relating to the I pictures included in the original bit stream and the proxy file (P pictures in the original bit stream) are generated.

Thus, the converting device 331 receives supply of compressed bit stream and analyzes this to generate an index file, and also converts the P pictures into I pictures to generate a proxy file.

Also, the personal computer 201 to which the present invention has been applied can have the same functions as those of the converting device 311 by executing predetermined programs.

With the converting device 311, only the I pictures and P pictures are decoded from the supplied original bit stream, and only the frames corresponding to the P picture are encoded again as I pictures, thereby generating a proxy file.

At this time, the data rate of the I pictures of the generated proxy file may be of a fixed rate or may be varied according to the frame rate of the head I picture in the GOP corresponding to the original bit stream (i.e., may be a varied rate).

The index file generated at the converting device 311 includes not only information necessary for decoding the original bit stream, but also includes information relating to the picture size and addresses and the like of the I pictures included in the proxy file, i.e., of the frames which were P pictures in the original bit stream but then encoded as I pictures.

Using the proxy file for decoding a stream enables the decoding time during random playback to be reduced.

Also, performing PI conversion wherein P pictures are converted into I pictures and switching between the pre-conversion stream and the converted portions thereof so as to perform decoding processing as described above enables the decoding time to be reduced and random access capabilities to be improved. However, the process for converting the P picture portions of the original stream into I pictures before editing or playback takes time. For example, if we say that there are 5 P pictures in a 15-frame stream in 1 GOP, it takes time to decode all of the 5 frames and convert into I pictures (re-encode following decoding).

Accordingly, the bit stream analyzing unit 332 shown in FIG. 16 may be arranged to not convert all P pictures into I pictures at the time of performing PI conversion, but rather control the decoder 334, encoder 336, and proxy file storage unit 337, so as to convert only a part of the P pictures into I pictures as necessary, so as to generate a proxy file and store the proxy file.

The processing time for PI conversion is dependent on the number of P pictures to be converted into I pictures (to be encoded following decoding), so reducing the number of pictures to be converted enables the amount of processing time (time for generating proxy files) to be shortened. The bit stream analyzing unit 332 preferably takes a level wherein the longest number of frames for decoding the post-conversion stream does not exceed the capabilities of the decoder, as a judgment standard for determining the number of pictures for conversion. The longest number of frames necessary for decoding the post-conversion stream (hereafter referred to as "number of decodable frames") also differs according to whether the playback mode is scrub playback or normal playback, for example.

Specifically, the number of decodable frames may be set beforehand (with the number of frames directly specified), for example, or may be specified by a higher order application. For example, the number of decodable frames may be set according to the number of decoders and CPUs used for decoding processing or by the clock frequency. In such cases, the bit steam analyzing unit 332 does not need to calculate the number of decodable frames, and simply obtains the specified number of decodable frames.

Conversely, in the event that only time allocation T given from the higher order application for decoding processing (e.g., 20 ms) is specified, the bit steam analyzing unit 332 needs to calculate the number of decodable frames.

Also, at this time, the bit steam analyzing unit 332 preferably selects P pictures to be converted into I pictures such that the converted P pictures are not consecutive, as much as possible, so as to reduce the number of P pictures converted into I pictures as to the number of decodable frames.

Next, a PI conversion variation in a case of 15 frames per GOP, and the number of P pictures N=4 (IBBPBBPBBPBBPBB) will be described with reference to FIG. 24.

For example, in the event that no PI conversion is performed, the valid sequence (the picture types for the 5 frames of I pictures and P pictures excluding the B pictures) is IPPPP, and the longest decoding time is the time necessary for decoding 7 frames in a case of OpenGOP and a GOP which is not the head of the stream, in a case of decoding the two B pictures following the I picture in the stream order (e.g., B0 B1 in FIG. 20 or 21).

As described above, in the event of performing PI conversion of all four P pictures, the valid sequence is IIIII, so the longest decoding time is the time necessary for decoding three frames of any of the B pictures.

Conversely, in the event of not converting all of the P pictures which can be converted by reducing these to a certain number changes the longest decoding time of random decoding as shown in FIG. 24. That is to say, in the event of performing PI conversion of only one of the four P pictures, the valid sequences is IPIPP or IPPIP due to selecting the P pictures to be converted into I pictures so that the P pictures for conversion are not consecutive as much as possible, so the longest decoding time is the time required for decoding 5 frames. Also, in the event of performing PI conversion of only two of the four P pictures, the valid sequences is IPIIP, IIPIP, or IPIPI due to selecting the P pictures to be converted into so that the P pictures for conversion are not consecutive as much as possible, so the longest decoding time is the time required for decoding 4 frames.

Note that in the event of performing PI conversion for only one of the four P pictures, so that the P pictures for conversion are not consecutive as much as possible i.e., only the case of the valid sequence shown in FIG. 24, and in the event of performing PI conversion for only two of the four P pictures, the longest decoding time which is the shortest is the case wherein the P pictures are selected for conversion into I pictures so that the P pictures are not consecutive for two frames in a row in the post-conversion sequence, and in the event of performing PI conversion for only one of the P pictures, the shortest is the case wherein the P pictures are selected for conversion so that the P pictures are not consecutive for three frames in a row in the post-conversion sequence.

Next, FIGS. 25A through 29B will be used to describe specific decoding processing wherein not all of the P pictures for conversion are converted but reduced to a certain number.

A case of decoding processing wherein only one of the four P pictures is subjected to PI conversion for a valid sequence of IPIPP will be described with reference to FIGS. 25A and 25B.

Figure 25A:
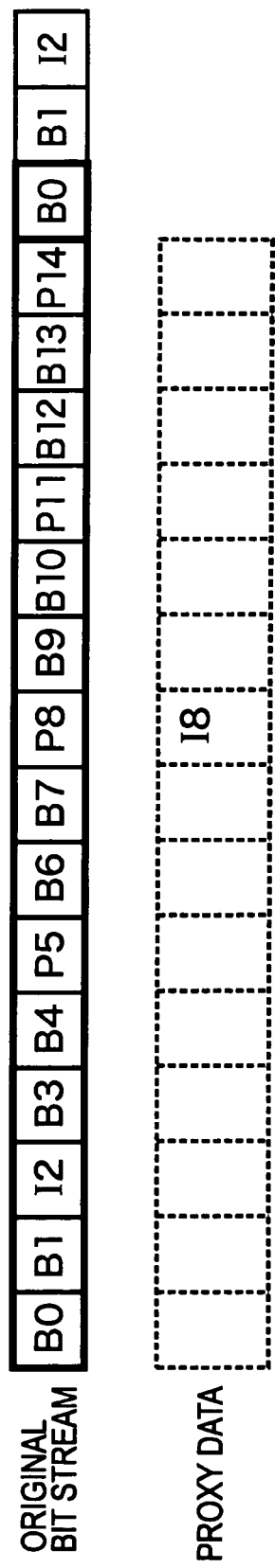
FIGS. 25A and 25B are diagrams for describing minimal decoding.
Figure 25B:
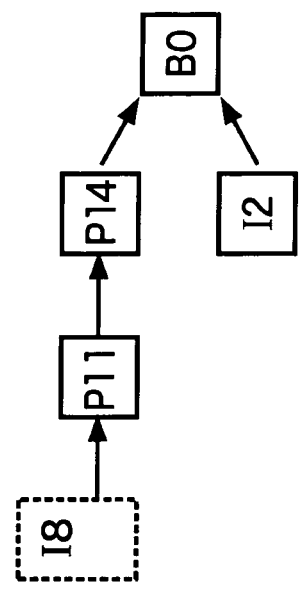

As shown in FIG. 25A, in a case of converting the picture P8 of the four P pictures included in the 15 frames arrayed in the display order of B0, B1, I2, B3, B4, P5, B6, B7, P8, B9, and so on, into an I picture, and preparing an I8 picture for the proxy file, the longest decoding time is a case wherein B0 or B1 is decoded, and as shown in FIG. 25B, in addition to the reference images I8, P11, P14, and I2, B0 or B1 (B0 is shown in FIG. 25B) require decoding, for a total of 5 pictures needing decoding.

A case of decoding processing wherein only one of the four P pictures is subjected to PI conversion for a valid sequence of IPPIP will be described with reference to FIGS. 26A and 26B.

Figure 26A:
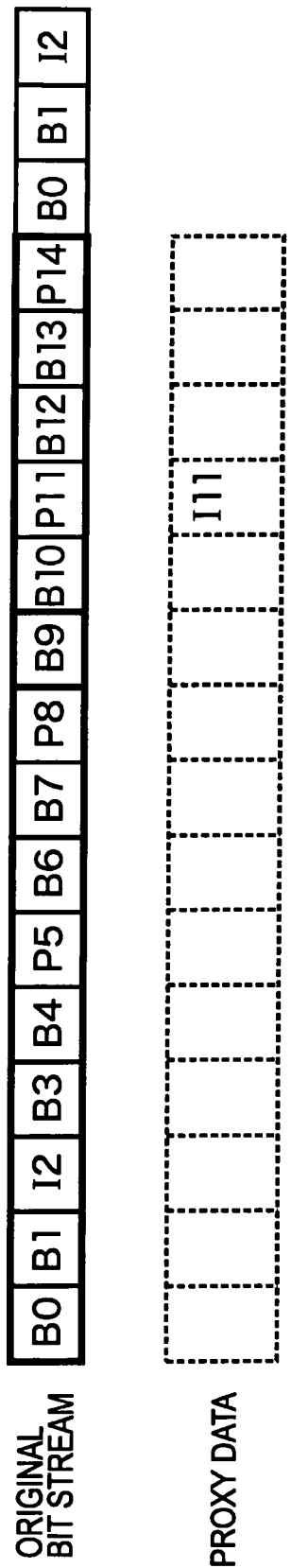
FIGS. 26A and 26B are diagrams for describing minimal decoding.
Figure 26B:
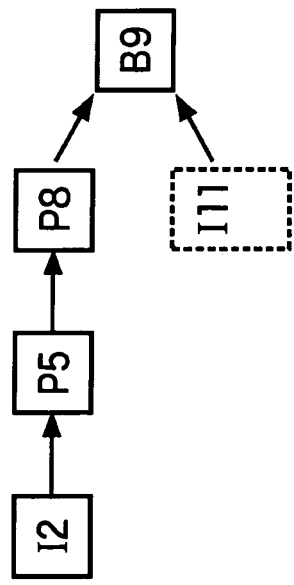

As shown in FIG. 26A, in a case of converting the picture P11 of the four P pictures included in the 15 frames arrayed in the display order of B0, B1, I2, B3, B4, P5, B6, B7, P8, B9, and so on, into an I picture, and preparing an I11 picture for the proxy file, the longest decoding time is a case wherein B9 or B10 is decoded, and as shown in FIG. 26B, in addition to the reference images I2, P5, P8, and I11, B9 or B10 (B9 is shown in FIG. 26B) require decoding, for a total of 5 pictures needing decoding.

Note that the longest decoding time is not always 5 pictures worth in all cases of performing PI conversion of one of the four P pictures. That is to say, the case of 5 pictures with for the longest decoding time is only cases wherein there are no instances of three consecutive post-conversion P pictures, as shown in FIGS. 25A through 26B. In all other cases, for example, such as in cases wherein the post-conversion sequence is IIPPP or IPPPI or the like, there are cases wherein the longest decoding time requires 6 pictures worth, thereby reducing the effects of PI conversion.

Next, a case of decoding processing wherein two of the four P pictures are subjected to PI conversion for a valid sequence of IPIIP will be described with reference to FIGS. 27A and 27B.

As shown in FIG. 27A, in a case of converting the pictures P8 and P11 of the four P pictures included in the 15 frames arrayed in the display order of B0, B1, I2, B3, B4, P5, B6, B7, P8, B9, and so on, into I pictures, and preparing I8 and I11 pictures for the proxy file, the longest decoding time is a case wherein B6 or B7, or B0 or B1 is decoded, and as shown in FIG. 26B, in addition to the reference images I2, P5, and I8, B6 or B7 (B6 is shown in FIG. 27B) require decoding, for a total of 4 pictures needing decoding, or, is a case wherein, in addition to the reference images I11, P14, and I2, B0 or B1 (B0 is shown in FIG. 27B) require decoding, for a total of 4 pictures needing decoding.

In the same way, a case of decoding processing wherein two of the four P pictures are subjected to PI conversion for a valid sequence of IIPIP will be described with reference to FIGS. 28A and 28B, and a case of decoding processing wherein two of the four P pictures are subjected to PI conversion for a valid sequence of IPIPI will be described with reference to FIGS. 29A and 29B.

Figure 28A:
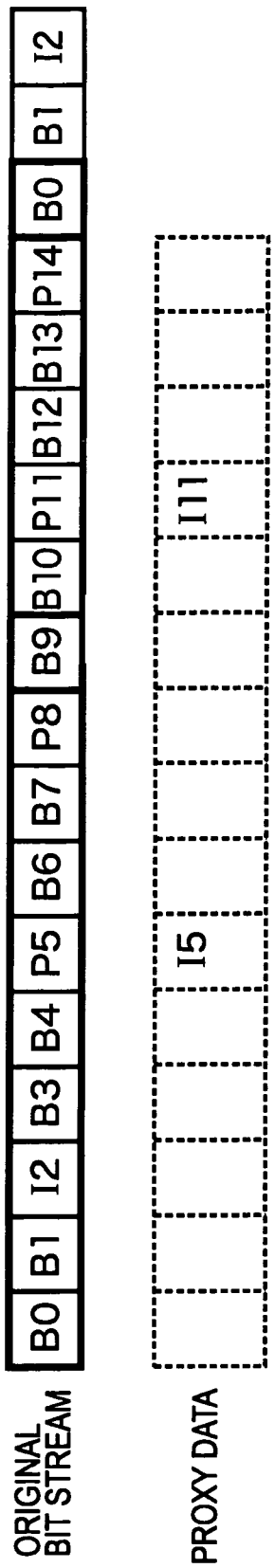
FIGS. 28A and 28B are diagrams for describing minimal decoding.
Figure 28B:
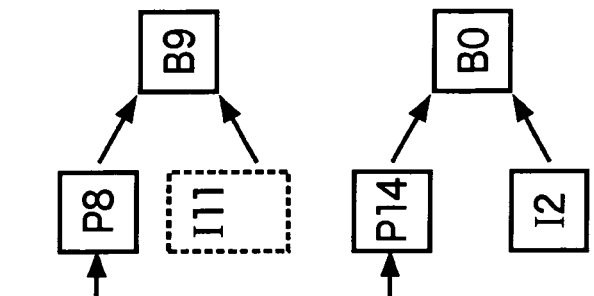

As shown in FIG. 28A, in a case of converting the pictures P5 and P11 of the four P pictures included in the 15 frames arrayed in the display order of B0, B1, I2, B3, B4, P5, B6, B7, P8, B9, and so on, into I pictures, and preparing I5 and I11 pictures for the proxy file, the longest decoding time is a case wherein B9 or B10, or wherein B0 or B1 are decoded, and as shown in FIG. 28B, in addition to the reference images I5, P8, and I11, B9 or B10 (B9 is shown in FIG. 28B) require decoding, for a total of 4 pictures needing decoding, or, is a case wherein, in addition to the reference images I11, P14, and I2, B0 or B1 (B0 is shown in FIG. 28B) require decoding, for a total of 4 pictures needing decoding.

Further, as shown in FIG. 29A, in a case of converting the pictures P8 and P14 of the four P pictures included in the 15 frames arrayed in the display order of B0, B1, I2, B3, B4, P5, B6, B7, P8, B9, and so on, into I pictures, and preparing I8 and I14 pictures for the proxy file, the longest decoding time is a case wherein B6 or B7 or wherein B12 or B13 are decoded, and as shown in FIG. 29B, in addition to the reference images I2, P5, and I8, B6 or B7 (B6 is shown in FIG. 29B) require decoding, for a total of 4 pictures needing decoding, or, is a case wherein, in addition to the reference images I8, P11, and I14, B12 or B13 (B12 is shown in FIG. 293) require decoding, for a total of 4 pictures needing decoding.

In this case as well, the longest decoding time is not always 4 pictures worth in all cases of performing PI conversion of two of the four P pictures. That is to say, the case of 4 pictures worth for the longest decoding time is only cases wherein there are no instances of two consecutive post-conversion P pictures, as shown in FIGS. 27A through 29B. In all other cases, for example, such as in cases wherein the post-conversion sequence is IIPPI or IPPII or the like, the effects of PI conversion are reduced.

Now, while description has been made with regard to cases in FIGS. 25A through 29B wherein the number of B pictures between I pictures and P pictures is two, the number of reference images necessary for decoding continuous B pictures is the same even in the case wherein the number of B pictures between I pictures and P pictures is two or more, so it is needless to say that the longest decoding time for each case is the same.

Figure 30:
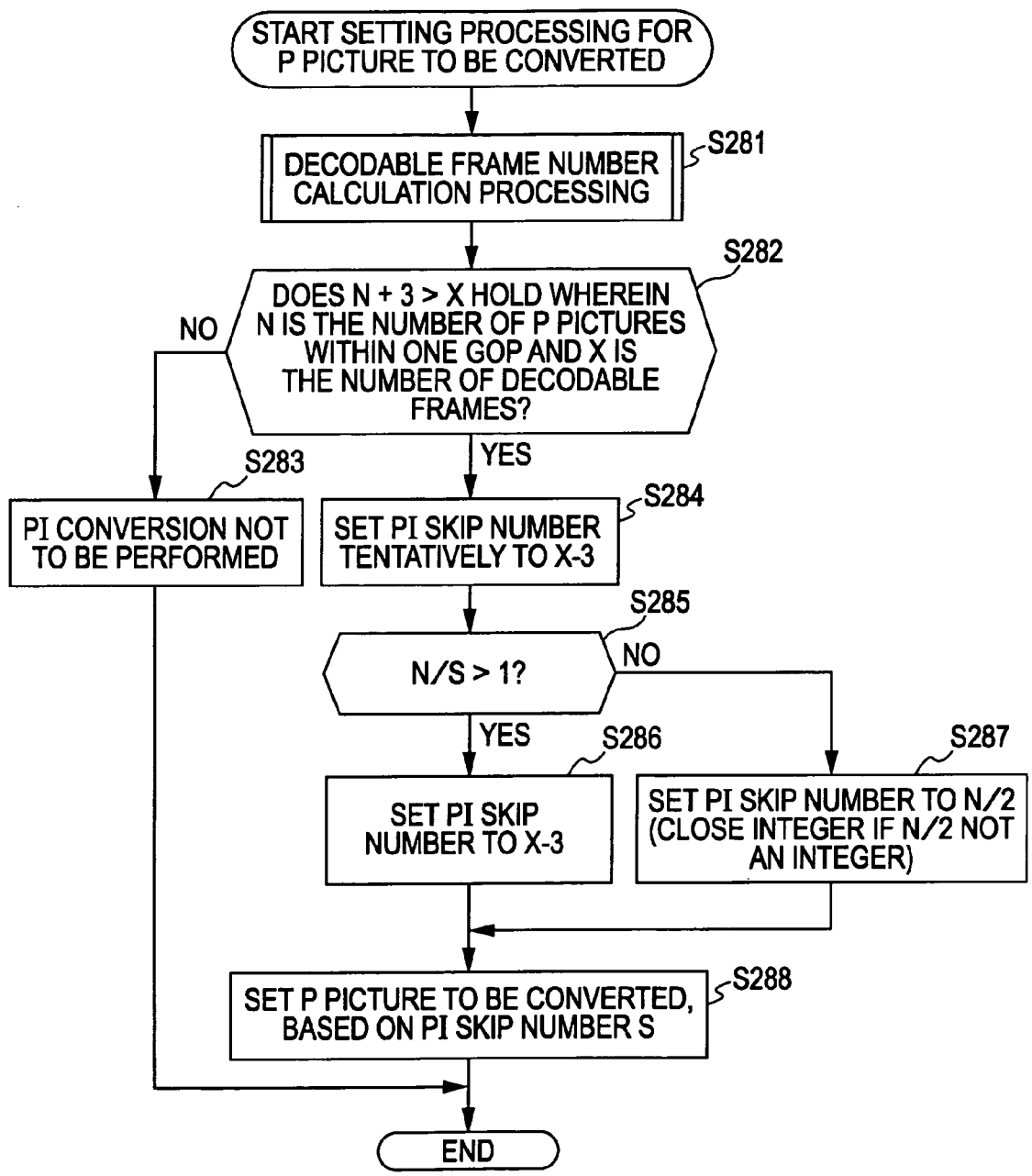
FIG. 30 is a flowchart for describing setting processing of a P picture to be converted.

Next, setting processing for P pictures to be converted will be described with reference to the flowchart in FIG. 30.

In step S281, number of decodable frames calculation processing which is the same as that described with reference to FIG. 15 is executed, and the number of decodable frames is obtained.

Note that in the event that the number of decodable frames has been set beforehand or specified by a higher order application, the bit stream analyzing unit 332 of the converting device 311 does not execute the number of decodable frames calculating processing in step S281 but simply obtains the number of decodable frames determined beforehand or specified by the higher order application.

In step S282, the bit stream analyzing unit 332 of the converting device 311 determines whether or not N+3>X holds, wherein the number of P pictures within one GOP in the bit stream obtained by the bit stream obtaining unit 331 is N, and the number of decodable frames is X.

In the event that determination is made in step S282 that N+3>X does not hold, in step S283 the bit stream analyzing unit 332 ends processing since PI conversion is not to be performed.

In the event that N+3<X holds, the amount of time necessary for frame decoding processing which is the longest for a bit stream with no PI conversion is shorter than the time necessary for decoding the frames of the number of decodable frames X. That is to say, in such a case, there is no need to perform PI conversion.

In the event that determination is made in step S282 that N+3>X holds, that is to say, in the event that judgment is made that the amount of time necessary for frame decoding processing which is the longest for a bit stream with no PI conversion is longer than the time necessary for decoding the frames of the number of decodable frames X, in step S284, the bit steam analyzing unit 332 tentatively sets the PI skip number S, which is the greatest consecutive occurrences of P pictures in the post-PI-conversion sequence wherein the decoding processing can keep up, to X−3.

In step S285, the bit stream analyzing unit 332 determines whether or not N/S>1 holds in the event that S=X−3. In the event that N/S>1 is determined to hold in step S285, the bit stream analyzing unit 332 sets the PI skip number S to X−3 in step S286.

In the event that N/S>1 is determined to not hold in step S285, the bit stream analyzing unit 332 sets the PI skip number S to N/2 (the nearest integer if not an integer) in step S287.

Following the processing of step S286 or step S287, in step S288 the bit stream analyzing unit 332 sets the P pictures for conversion based on the PI skip number S, and the processing ends.

Due to such processing, the PI skip number, which is the greatest consecutive number of P pictures wherein the decoding processing for the post-PI-conversion sequence can still keep up, is determined based on the number of decodable frames and the number of P pictures within one GOP, and the P pictures for conversion into I pictures are determined based on this. Thus, by the number of P pictures for Pi conversion being reduced as much as possible, the time for generating a proxy file can be reduced as compared with a case wherein all P pictures are converted into I pictures.

Next, a specific setting example of P pictures converted into I pictures, i.e., the relation between the number of decodable frames X and PI skip number S in the case that the number of P pictures in one GOP is N=11, and the setting of P pictures for conversion into I pictures, will be described with reference to FIG. 31.

For example, in the case of X=4 and S=1, post-PI-conversion P pictures must not be consecutive, so in the post-PI-conversion sequence, IPIPIPIPIP is the sequence. Also, in the case of X=5 and S=2 for example, only two post-PI-conversion P pictures can be consecutive, so in the post-PI-conversion sequence, IPPIPPIPPIPP is the sequence. Also, in the case of X=6 and S=3 for example, only three post-PI-conversion P pictures can be consecutive, so in the post-PI-conversion sequence, IPPPIPPPIPPP is the sequence.

Also, in the case of X=7 and S=4 for example, up to four post-PI-conversion P pictures can be consecutive, so in the post-PI-conversion sequence, IPPPPIPPPPIP may be used as the sequence, or in a case wherein the number of consecutive P pictures is four or less and the number converted to I pictures is two or less, other sequences (e.g., IPPPPIPPPPIPP) may be used. However, the number of consecutive P pictures is preferably small, so in the case of X=7, S=4, a valid sequence of IPPPIPPPIPPP as with the case of X=6, S=3 is more preferable since the number of PI conversion pictures is the same and the longest decoding time can be reduced further.

Also, in the case of X=8 and S=5 for example, up to five post-PI-conversion P pictures can be consecutive, so in the post-PI-conversion sequence, IPPPPPIPPPPP is the sequence. Also, in the case of X=9 and S=5 for example, N/S>1 is determined in the above step S285, so the bit stream analyzing unit 332 sets the PI skip number S to N/2 (the nearest integer if not an integer), so S=5. Also note that in the case of 14 (=N+3)>X≧10, N/S>1 is determined in the above step S285, so the bit stream analyzing unit 332 sets the PI skip number to S=5. At this time, the post-PI-conversion sequence is IPPPPPIPPPPP.

Also, in the event that X≧14 (=N+3), determination is made that there is no need for PI conversion.

Next, the proxy file generating processing 2 executed by the converting device 331 described with reference to FIG. 16 or at the CPU 221 of the personal computer described with reference to FIGS. 9 and 22, will be described with reference to the flowchart shown in FIG. 32.

Figure 23:
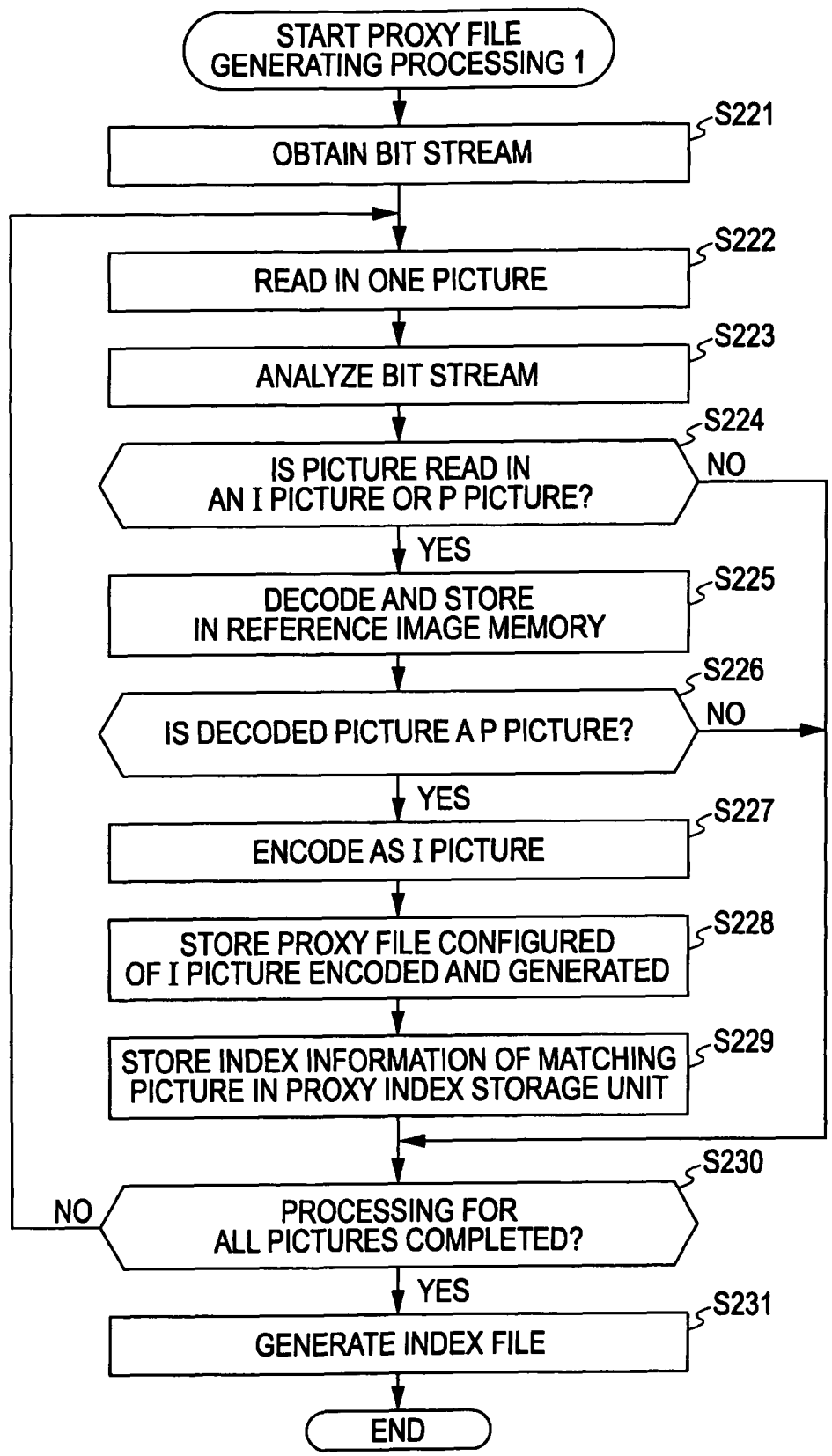
FIG. 23 is a flowchart for describing proxy file generating processing 1.

In steps S331 through S336, processing the same as that of the steps S221 through S226 described with reference to FIG. 23 are executed.

That is to say, the bit stream obtaining unit 331 (CPU 221) obtains the original bit stream, and supplies this to the bit stream analyzing unit 332 (the bit stream analyzing unit 332 of the CPU 221). The bit stream analyzing unit 332 (the bit stream analyzing unit 332 of the CPU 221) reads in and analyzes one picture from the supplied original bit stream. That is to say, the bit stream analyzing unit 332 obtains the information of the relevant picture in the index file described with reference to FIG. 17.

The bit stream analyzing unit 332 (the bit stream analyzing unit 332 of the CPU 221) then determines whether or not the picture read in is an I picture or P picture. In the event that determination is made that the picture is neither an I picture nor a P picture, i.e., is a B picture, the processing proceeds to the later-described step S341.

In the event that determination is made that the picture is one of an I picture or a P picture, the bit stream analyzing unit 332 (the bit stream analyzing unit 332 of the CPU 221) supplies the read I picture or P picture to the decoder 334. The decoder 334 decodes the supplied I picture or P picture, and stores this in reference image memory 335.

The decoder 334 (the decoder 334 of the CPU 221) then determines whether or not the decoded picture is a P picture. In the event that determination is made that the decoded picture is not a P picture, i.e., is an I picture, the processing proceeds to the later-described step S341.

In the event that determination is made in step S336 that the decoded picture is a P picture, in step S337 the decoder 334 (the decoder 334 of the CPU 221) determines whether or not the P picture is P picture needing conversion, i.e., P picture regarding which setting has been made for conversion into an I picture in the above-described setting processing, under control of the bit stream analyzing unit 332. In the event that determination is made in step S337 that the P picture is not a P picture requiring conversion, the flow proceeds to the later-described step S341.

In the event that determination is made in step S337 that the P picture is a P picture requiring conversion, in step S338 the decoder 334 (the decoder 334 of the CPU 221) supplies an uncompressed image frame corresponding to the decoded P picture to the encoder 336 (the encoder 336 of the CPU 221). The encoder 336 encodes the supplied uncompressed image frame as an I picture, and supplies to the proxy file storage unit 337 (a proxy file storage unit 337 corresponding to a region of one of the storage device 204, external picture recording/playing device 205, or HDD 226).

In step S339, the proxy file storage unit 337 (proxy file storage unit 337 corresponding to a region of one of the storage device 204, external picture recording/playing device 205, or HDD 226) stores the proxy file configured of the encoded and generated I picture.

In step S340, the encoder 336 supplies the index information of the picture size (Proxy File Picture Size) and the addresses of these frames (Proxy File Address), as encoding information relating to the generated I picture, i.e., a proxy index, to the proxy index storage unit 338. The proxy index storage unit 338 stores the proxy index of the picture.

In the event that determination is made in step S334 that the picture is neither an I picture nor a P picture, i.e., is a B picture, or in the event that determination is made in step S336 that the decoded picture is not a P picture, i.e., is an I picture, or in the event that determination is made in step S337 that the P picture is not a P picture requiring conversion, or following processing of step S340 ending, in step S341 the bet stream analyzing unit 332 (CPU 221) determines whether or not processing of all pictures has ended. In the event that determination is made in step S341 that processing of all pictures has not ended, the flow returns to step S332, and the subsequent processing is repeated.

In the event that determination is made in step S341 that processing of all pictures has ended, in step S342 the bit stream analyzing unit 332 (the bit stream analyzing unit 332 of the CPU 221) generates the index file described with reference to FIG. 17, based on the analysis results of each of the pictures, and the frames encoded as I pictures by the encoder 336 that are stored in the proxy index storage unit 338, i.e., the picture size (Proxy File Picture Size) and addresses (Proxy File Address) of the frames converted from P pictures into I pictures, supplies this to the index file storage unit 333 (index file storage unit 333 corresponding to a region of one of the storage device 204, external picture recording/playing device 205, or HDD 226) for storage, and the processing ends.

Due to such processing, a proxy file of I pictures generated by P pictures in the original bit stream being decoded and then encoded as I pictures, and an index file listing information relating to the I pictures included in the original bit steam and the proxy file (P pictures in the original bit stream) are generated.

Now, while a proxy file has been described as being usable in a case wherein substitution display is performed in the processing of step S129 in FIG. 13, it is needless to say that a proxy file is usable in a case wherein determination has been made in the processing of step S44 in FIG. 11 or step S124 of FIG. 13 to execute decoding processing using nearby I pictures or P pictures, or using I pictures alone. Further, even in cases wherein substitute display is not executed but rather reference image decoding is executed for playback output of a desired frame, the time required for decoding can be reduced by using proxy files as appropriate, thereby enabling high-speed decoding in scrub playback and so forth.

While description has been made here primarily regarding MPEG2 LongGOP made up of I pictures, P pictures, and B pictures, the present invention is applicable to cases of playing compression encoded data which is decoded by inter-frame reference.

The above-described series of processing can be executed by hardware as described above, or may be executed by software. In the event of executing the sequence of processing with software, a program making up the software is installed into a computer built into dedicated hard ware, or into a general-purpose computer for example, which is capable of executing various types of functions by installation of various types of programs, from networks or recording media.

The recording media is not restricted to removable media 206 distributed to the user separately from the device proper so as to provide the user with the program as shown in FIG. 9, such as magnetic disks (including floppy disks), optical disks (including CD-ROM (Compact Disk-Read Only Memory) and DVD (Digital Versatile Disk)) magneto-optical disks (including MD (Mini-Disk)), semiconductor memory, and so forth, and also includes ROM 222 or the hard disk in the HDD 226 and so forth, in which the program is recorded, and built into the device proper for being provided to the user in that state.

Also, it should be noted that with the present specifications, the steps described in the program stored in the recording media may of course be performed in the time-sequence of the order described, but do not necessarily need to be performed in the time-sequence of the order described, and includes processing which is performed in parallel or independently as well.

It should be further understood that in the present specification, the term "system" refers to the collective configuration of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. A non-transitory computer readable storage medium having stored therein a program that when executed by a computer causes the computer to execute processing including the steps of:
   inputting reproduction information during random playback, in which input of reproduction information indicating a reproduction state of an encoded stream is received, wherein the random playback corresponds to playback including arbitrary movement between two playback positions;
   obtaining reference picture information, in which reference picture information indicating a reference picture necessary for performing decoding processing of a relevant picture in said encoded stream is obtained, based on said reproduction information input by said inputting of said reproduction information;
   determining whether said reference picture is already decoded and stored in a predetermined storage region, based on said reference picture information obtained by said obtaining of said reference picture information;
   obtaining and decoding said reference picture not already decoded and stored in said storage region from said encoded stream, in response to a determination that said reference picture is not already decoded and stored in said storage region by said determining, and controlling storage thereof to said storage region; and
   using said reference picture stored in said storage region to perform decoding processing of the relevant picture in said encoded stream, thereby generating image data which is stored in said storage region.

2. The non-transitory computer readable storage medium according to claim 1, in which decoding processing is executed by a plurality of decoding methods in said reference picture decoding processing and said decoding processing, the processing of said program further comprising the step of first determining for determining decoding order and decoding method of said encoded stream based on said reproduction information input by said reproduction information input processing, wherein said reference picture decoding step and said decoding processing are executed based on the decoding order and decoding method determined by the processing of said first determining.

3. The non-transitory computer readable storage medium according to claim 2, wherein determination is made in said determining processing regarding whether or not said reference picture decoded by said decoding method determined by said first determining processing is stored in said storage region.

4. The non-transitory computer readable storage medium according to claim 2, wherein, in said reference picture decoding processing and said decoding processing, one of a plurality of decoding processes with different resolution is executable based on the determination made by said first determining.

5. The non-transitory computer readable storage medium gram according to claim 2, wherein, in said reference picture decoding processing and said decoding processing, one of a plurality of decoding processes corresponding to a plurality of encoding methods is executable based on the determination made by said first determining.

6. The non-transitory computer readable storage medium according to claim 2, wherein said encoded stream includes I pictures, P pictures, and B pictures;
   and wherein, in the event that the relevant picture in said encoded stream is a B picture, an I picture or a P picture which is temporally in the proximity of said relevant picture is decoded.

7. The non-transitory computer readable storage medium according to claim 2, wherein said encoded stream includes intra-frame encoded pictures and inter-frame prediction-encoded pictures;
   and wherein, in the event that the relevant picture in said encoded stream is an inter-frame prediction-encoded picture in said decoding processing, an intra-frame encoded picture which is temporally in the proximity of said relevant picture is decoded.

8. The non-transitory computer readable storage medium according to claim 2, further including a step of second determining, wherein the decoding method of said encoded stream is determined based on a number of reference frames on a past side included in said reference picture information, and a number of frames regarding which decoding processing can be performed during display of an image corresponding to one frame.

9. The non-transitory computer readable storage medium according to claim 8, further comprising the step of calculating the number of frames regarding which decoding processing can be performed during a display time of an image corresponding to one frame.

10. The non-transitory computer readable storage medium according to claim 8, further comprising the step of calculating the number of reference frames on the past side included in said reference picture information.

11. A decoding device for performing decoding processing of an encoded stream, said device comprising:
inputting means for inputting reproduction information during random playback, in which input of reproduction information indicating a reproduction state of an encoded stream is received, wherein the random playback corresponds to playback including arbitrary movement between two playback positions;
reference picture information managing means for managing reference picture information indicating a reference picture necessary for performing decoding processing of a relevant picture in said encoded stream;
decoding means for performing decoding processing of said encoded stream and generating image data;
storing means for storing said image data generated by said decoding means;
storage managing means for managing the stored state of said image data stored by said storing means; and
decoding control means for controlling decoding processing by said decoding means, by referencing said reference picture information managed by said reference picture information managing means, and said stored state managed by said storage managing means and determining whether said reference picture is already decoded and stored in the storage means based on said reference picture information and said stored state;
wherein said decoding means performs decoding processing of said encoded stream by taking one of said image data stored by said storing means as the reference picture, and supplying said reference picture that has been decoded to said storing means for storage.

12. A decoding method of a decoding device for decoding an encoded stream using a predetermined storage region where image data is stored, said method including the steps of:
inputting reproduction information during random playback, in which input of reproduction information indicating a reproduction state of said encoded stream is received, wherein the random playback corresponds to playback including arbitrary movement between two playback positions;
obtaining reference picture information, in which reference picture information indicating a reference picture necessary for performing decoding processing of a relevant picture in said encoded stream is obtained, based on said reproduction information input by said inputting of said reproduction information;
determining whether said reference picture is already decoded and stored in a predetermined storage region, based on said reference picture information obtained by said obtaining of said reference picture information;
obtaining and decoding said reference picture not already decoded and stored in said storage region from said encoded stream, in response to a determination that said reference picture is not already decoded and stored in said storage region by said determining, and controlling storage thereof to said storage region; and
using said reference picture stored in said storage region to perform decoding processing of the relevant picture in said encoded stream, thereby generating image data which is stored in said storage region.

13. A decoding device for performing decoding processing of an encoded stream, said device comprising:
an operation input obtaining unit configured to input reproduction information during random playback, in which input of reproduction information indicating a reproduction state of an encoded stream is received, wherein the random playback corresponds to playback including arbitrary movement between two playback positions;
an index managing unit configured to manage reference picture information indicating a reference picture necessary for performing decoding processing of a relevant picture in said encoded stream;
a decoding processing unit configured to perform decoding processing of said encoded stream and generating image data;
a storage unit configured to store said image data generated by said decoding processing unit;
a base band memory managing unit configured to manage the stored state of said image data stored by said storage unit; and
a decoding control unit configured to control decoding processing of said decoding processing unit by referencing said reference picture information managed by said index managing unit and said stored state managed by said base band memory managing unit and determining whether said reference picture is already decoded and stored in the storage unit based on said reference picture information and said stored state,
wherein decoding processing unit performs decoding processing of said encoded stream by taking one of said image data stored by said storage unit as a reference picture, and supplying said relevant picture that has been decoded to said storage unit for storage.

* * * * *